US012689193B2

(12) United States Patent
Larsen et al.

(10) Patent No.: US 12,689,193 B2
(45) Date of Patent: Jul. 21, 2026

(54) METHODS AND APPARATUS FOR ROUTING WIRES OF PRE-ASSEMBLED WIRE HARNESS ON FORM BOARD

(71) Applicant: The Boeing Company, Arlington, VA (US)

(72) Inventors: Ty A. Larsen, Everett, WA (US);
Bradley J. Mitchell, Bothell, WA (US);
Damien O. Martin, Everett, WA (US);
Cindy X. Li, Everett, WA (US); Jeffrey A. McCaskey, Everett, WA (US);
Grace L. Duncan, Seattle, WA (US);
Lars E. Blacken, Bothell, WA (US)

(73) Assignee: The Boeing Company, Arlington, VA (US)

( * ) Notice: Subject to any disclaimer, the term of this patent is extended or adjusted under 35 U.S.C. 154(b) by 686 days.

(21) Appl. No.: 18/115,543

(22) Filed: Feb. 28, 2023

(65) Prior Publication Data

US 2024/0291250 A1      Aug. 29, 2024

(51) Int. Cl.
*H02G 1/06* (2006.01)
*B25J 9/12* (2006.01)
(Continued)

(52) U.S. Cl.
CPC ................ *H02G 1/06* (2013.01); *B25J 9/123* (2013.01); *B25J 9/1664* (2013.01); *B64D 47/00* (2013.01); *B64D 2221/00* (2013.01)

(58) Field of Classification Search
CPC ............ H01B 13/012; H01B 13/01209; H01B 13/01254; H01B 13/01236;
(Continued)

(56) References Cited

U.S. PATENT DOCUMENTS 10,675,768 B2 *   6/2020   Ozog ........................ B25J 18/02
11,404,183 B2 *   8/2022   Mitchell ............ H01B 13/0214
(Continued)

FOREIGN PATENT DOCUMENTS

WO      WO-2024176219 A1 *   8/2024   .......... B25J 15/0491

*Primary Examiner* — Patrick H Mackey
(74) *Attorney, Agent, or Firm* — Yee & Associates, P.C.

(57)                ABSTRACT
Methods and apparatus for automated routing of wires of a wire harness on a form board. A wire harness comprising a wire end connector and a multiplicity of groups of wires is supported and carried by a carrier end effector mounted to an end of a first robotic arm. The wire groups are accessed and then routed on the form board by a routing end effector mounted to an end of a second robotic arm. Initially a wire gripper of the routing end effector is opened. The second robotic arm is then controlled to move the routing end effector so that respective first portions of all wire groups are accessible for gripping by the wire gripper. Then the wire gripper is closed to grip the first portions of wires. Then the second robotic arm is controlled to move the routing end effector to place second portions of the wires of all wire groups in a first elastic retainer wire routing device attached to the form board. Thereafter, the routing end effector routes the first group of wires through a second elastic retainer wire routing device and then routes the second group of wires through a third elastic retainer wire routing device.

20 Claims, 46 Drawing Sheets

(51) Int. Cl.
*B25J 9/16* (2006.01)
*B64D 47/00* (2006.01)

(58) Field of Classification Search
CPC ... H01B 13/01245; B25J 9/123; B25J 9/1664;
H02G 1/06
See application file for complete search history.

(56) References Cited

U.S. PATENT DOCUMENTS

| 11,489,309 B2 | 11/2022 | Martin et al. | |
|---|---|---|---|
| 11,776,713 B2 * | 10/2023 | Aramaki | H01B 13/01209 |
| | | | 29/745 |
| 11,975,661 B2 * | 5/2024 | Marquez | H01R 43/28 |
| 2018/0040394 A1 * | 2/2018 | Shimizu | H01B 13/01209 |
| 2021/0125749 A1 | 4/2021 | Martin et al. | |
| 2021/0125751 A1 | 4/2021 | Mitchell et al. | |
| 2021/0125752 A1 | 4/2021 | Mitchell et al. | |
| 2021/0183541 A1 * | 6/2021 | Mitchell | H01B 13/01209 |

* cited by examiner

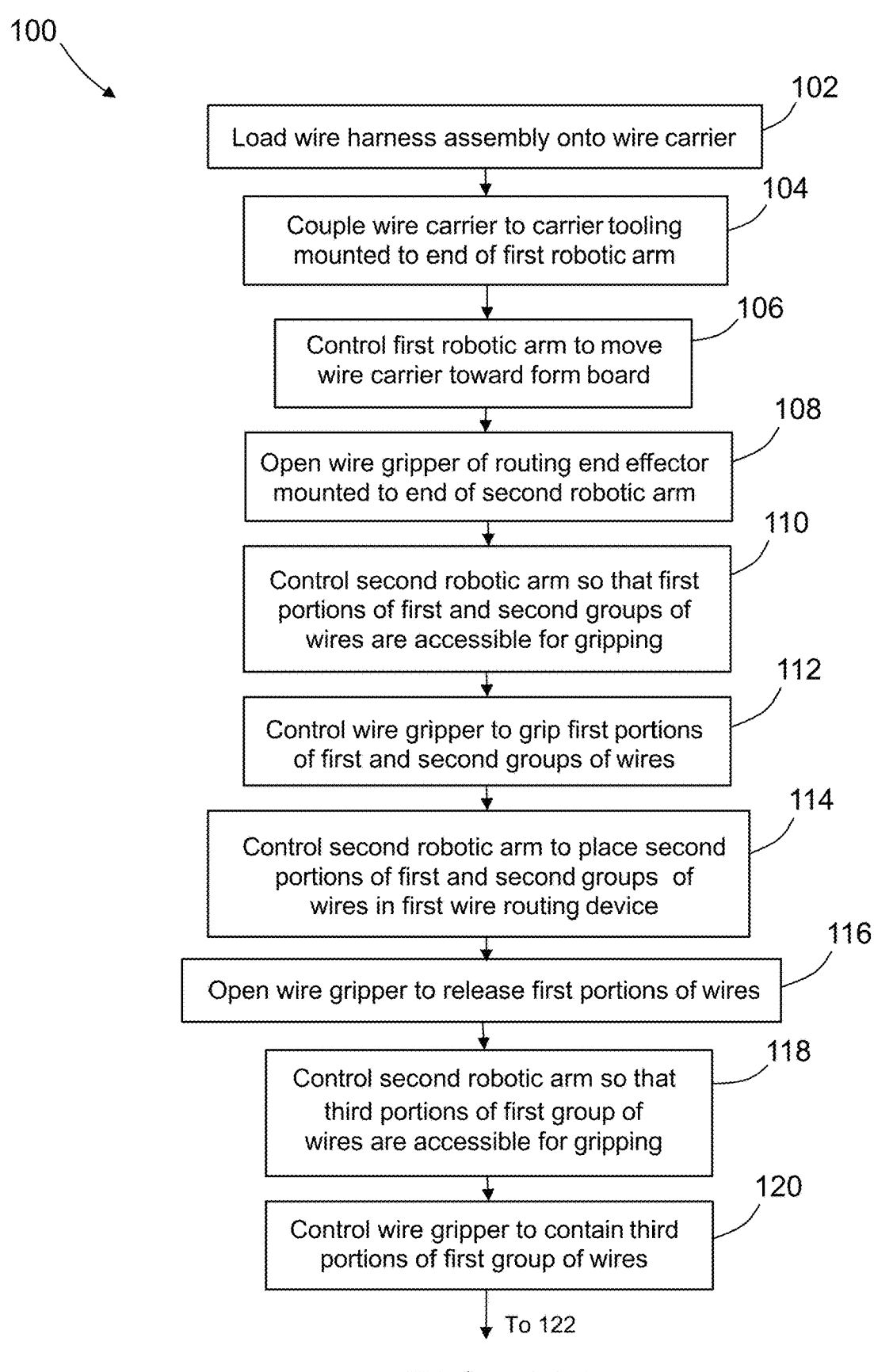

100

Load wire harness assembly onto wire carrier — 102

Couple wire carrier to carrier tooling mounted to end of first robotic arm — 104

Control first robotic arm to move wire carrier toward form board — 106

Open wire gripper of routing end effector mounted to end of second robotic arm — 108

Control second robotic arm so that first portions of first and second groups of wires are accessible for gripping — 110

Control wire gripper to grip first portions of first and second groups of wires — 112

Control second robotic arm to place second portions of first and second groups of wires in first wire routing device — 114

Open wire gripper to release first portions of wires — 116

Control second robotic arm so that third portions of first group of wires are accessible for gripping — 118

Control wire gripper to contain third portions of first group of wires — 120

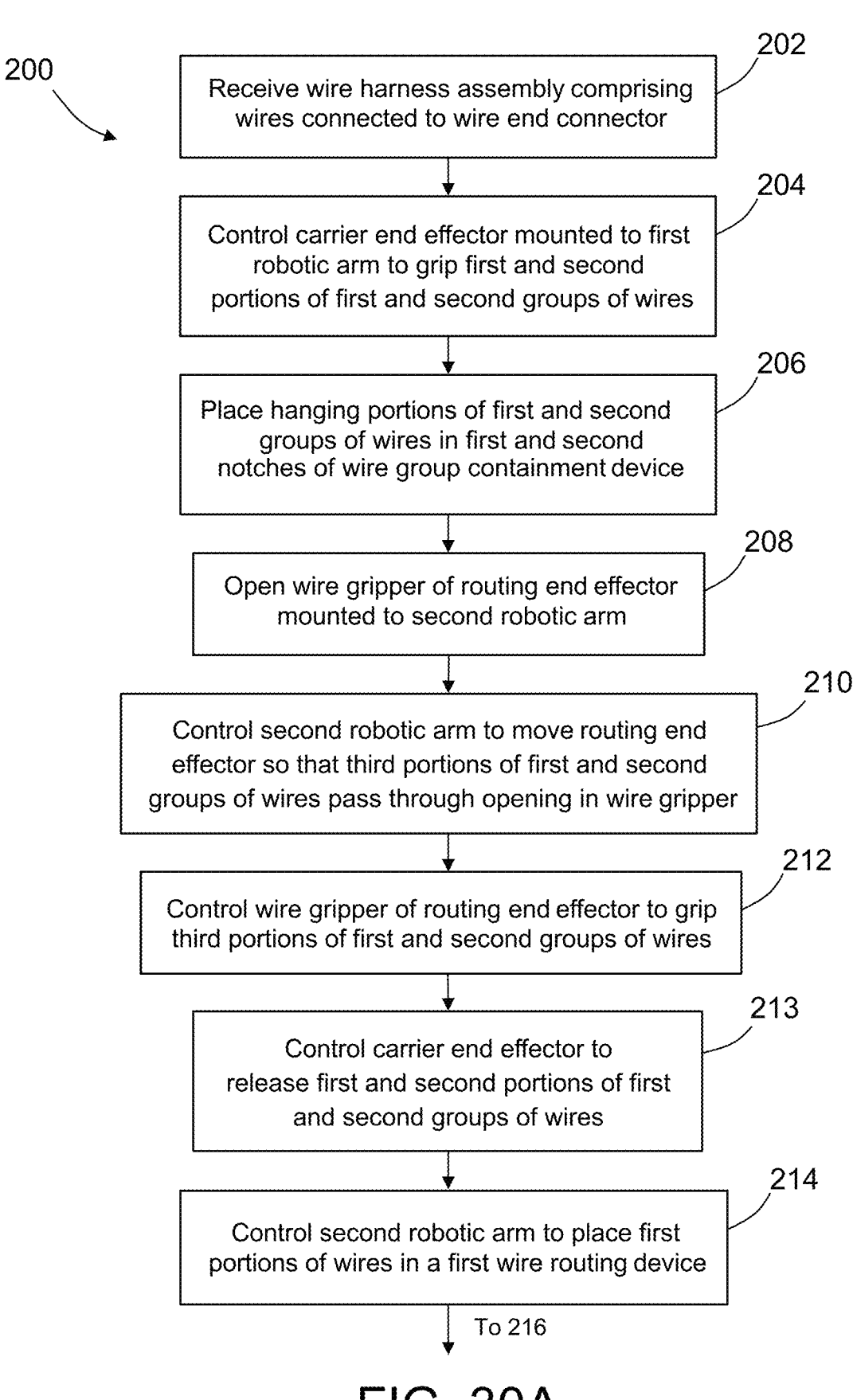

200

202
Receive wire harness assembly comprising wires connected to wire end connector 204
Control carrier end effector mounted to first robotic arm to grip first and second portions of first and second groups of wires 206
Place hanging portions of first and second groups of wires in first and second notches of wire group containment device 208
Open wire gripper of routing end effector mounted to second robotic arm 210
Control second robotic arm to move routing end effector so that third portions of first and second groups of wires pass through opening in wire gripper 212
Control wire gripper of routing end effector to grip third portions of first and second groups of wires 213
Control carrier end effector to release first and second portions of first and second groups of wires 214
Control second robotic arm to place first portions of wires in a first wire routing device To 216

FIG. 30A

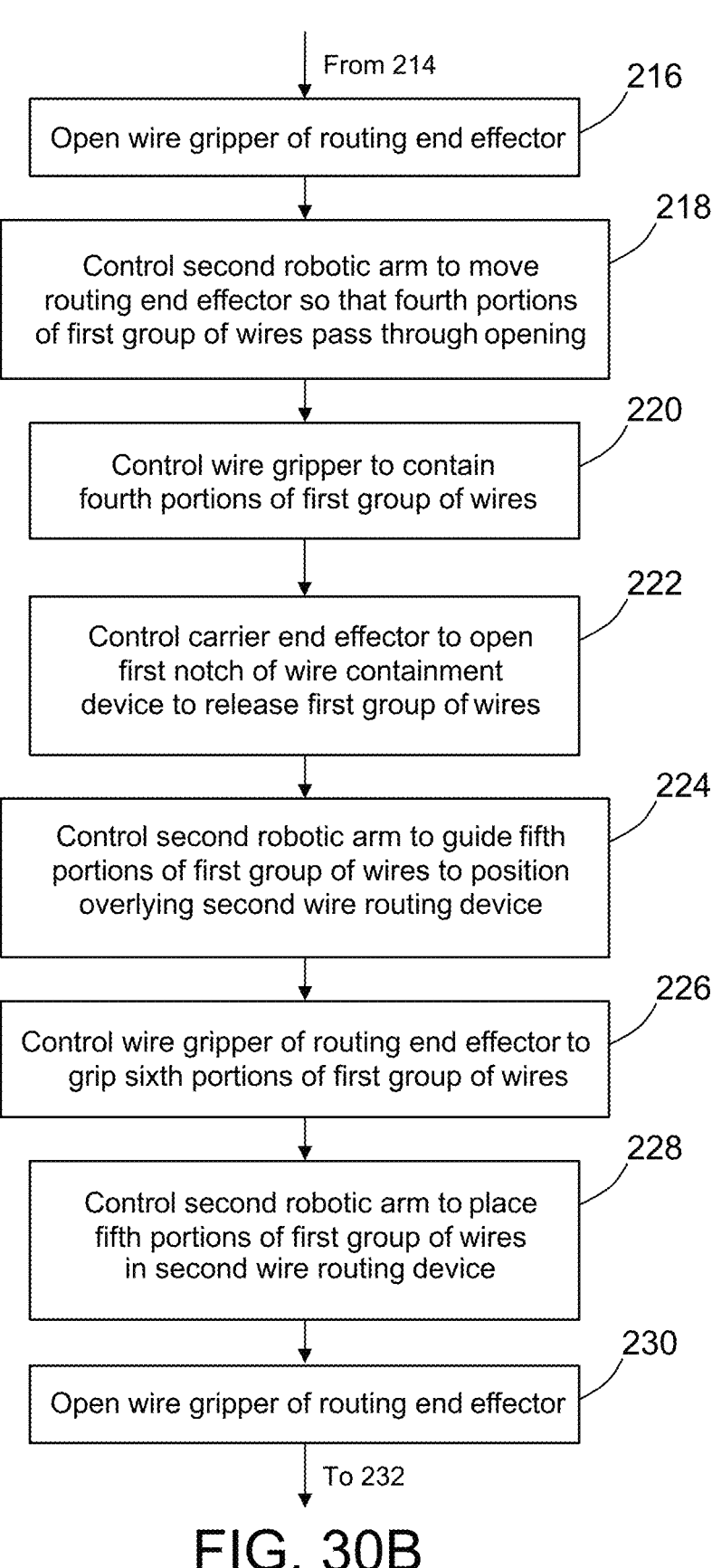

From 214

216
Open wire gripper of routing end effector

218
Control second robotic arm to move
routing end effector so that fourth portions
of first group of wires pass through opening 220
Control wire gripper to contain
fourth portions of first group of wires 222
Control carrier end effector to open
first notch of wire containment
device to release first group of wires 224
Control second robotic arm to guide fifth
portions of first group of wires to position
overlying second wire routing device 226
Control wire gripper of routing end effector to
grip sixth portions of first group of wires 228
Control second robotic arm to place
fifth portions of first group of wires
in second wire routing device 230
Open wire gripper of routing end effector To 232

FIG. 30B

METHODS AND APPARATUS FOR ROUTING WIRES OF PRE-ASSEMBLED WIRE HARNESS ON FORM BOARD

This application is related to U.S. patent application Ser. No. 18/115,514 co-filed on Feb. 28, 2023, entitled "Methods and Apparatus for Routing Wires of Pre-assembled Wire Harness on Form Board," and issued as U.S. Pat. No. 12,327,987 on Jun. 10, 2025.

BACKGROUND

The present invention relates to the field of wire harness fabrication, and in particular to the assembly of wire bundles of varying configurations on harness form boards (hereinafter "form boards"). The terms "wire bundle" and "wire harness" are used as synonyms herein.

Vehicles, such as large aircraft, have complex electrical and electromechanical systems distributed throughout the fuselage, hull, and other components of the vehicle. Such electrical and electromechanical systems require many bundles of wire, cables, connectors, and related fittings to connect the various electrical and electromechanical components of the vehicle. For example, a large aircraft may have over 1000 discrete wire bundles. Often these discrete wire bundles are grouped into assemblies known as wire bundle assembly groups, which may comprise as many as 40 wire bundles and 1000 wires. Wire bundles are typically assembled outside of the aircraft.

In accordance with a typical method for assembling wire bundles, form boards are used to stage a wire bundle into its installation configuration. Typically each wire bundle of a given configuration fabricated in a wire shop requires a customized form board for layup. The form board typically includes a plurality of fixed form board devices which together define the given wire bundle configuration. During wire bundle assembly, the constituent wires are routed along paths defined by the positions and orientations (hereinafter "locations") of the fixed form board devices. However, the precise position of a particular wire, as that wire is passed through or around a form board device, may vary in dependence on the particular bunch configuration of already routed wires within or in contact with the same form board device.

Robots are used to assemble electrical wire harnesses using wire segments cut to length and configured prior to bundling. For example, a layup robot may be used to insert one socketed or pinned end of a wire into an end connector on a form board and then route the wire through its correct path on the form board as dictated by affixed form board devices that control shape. The second end of the wire is then inserted into another connector. These operations may be repeated for additional wires of the wire harness being assembled. Innovation in the field of automated wire harness assembly has the potential to improve the efficiency of production of wire harnesses in the aerospace and automotive industries.

SUMMARY

The subject matter disclosed in some detail herein is directed to methods and apparatus for automated routing of wires onto harness form boards. Rather than using a robot configured to insert one end of an individual wire into a wire end connector on a form board and then route the individual wire along its correct path, the technology proposed herein employs a robot which is configured to manipulate and route groups of wires having ends which are already inserted in a wire end connector. More specifically, a wire harness is pre-assembled using an existent machine that populates all wires in a first end connector. This connector and harness are then provided to the robotic cell to route as a single piece rather than as individual wires. The goal is to increase the speed of the automated forming method by using first end connector assembly machines that have already been deployed and tested.

The wire-routing robot disclosed in detail herein includes a manipulator arm (referred to hereinafter as a "robotic arm") and a wire-routing end effector (hereinafter "routing end effector") mounted to a distal end of the manipulator arm. The routing end effector is configured for routing groups of wires (rather than routing wire by wire) along respective paths through form board devices mounted to a harness form board. The routing end effector is moved along a planned path under the control of a robot controller. The robot controller is a computer or processor configured with executable computer code stored in a non-transitory tangible computer-readable storage medium. An end effector path is provided with a set of processes that enable rapid, and even fully automatic, development of robot motion controls for routing wires on harness form boards.

In addition, the system proposed herein may include a wire harness-carrying robot that supports the pre-assembled wire harness in positions where the wire-routing robot may access groups of wires for routing in sequence. One embodiment of a wire harness-carrying robot disclosed herein includes a robotic arm, a carrier end effector comprising a shaft mounted to a distal end of a robotic arm, a connector staging device mounted to the top end of the shaft, and a wire group containment device mounted to an intermediate portion of the shaft. The wire group containment device is rotatable about the shaft to enable the routing end effector to grasp (a.k.a. "grip") the correct wire group in sequence at the same access point, thereby enabling the routing end effector to repeat the same motion.

In the alternative, the wire harness carrier (hereinafter "wire carrier") may be a passive device held by carrier tooling mounted to the distal end of a robotic arm. In accordance with one embodiment of this concept, the wires are separated and placed into a carrier board. This board is designed to keep the groups of wires properly separated, but also is designed to protect the wires and associated end connector as the wire harness is moved throughout the production process. The robotic system then uses two (or more) robots, wherein one robot is able to identify and grab the carrier board and then present the wire harness to the wire-routing robot which can grip and route the groups of wires out of the carrier board. Working together, the routing end effector will punch the wires into wire clips on the form board, while the robotic arm holding the carrier board will follow slightly behind to help prevent tangling as the wires play out.

Although various embodiments of methods and apparatus for robot motion control and wire dispensing during automated routing of wire groups onto harness form boards are described in some detail later herein, one or more of those embodiments may be characterized by one or more of the following aspects.

One aspect of the subject matter disclosed in detail below is a method for routing wires of a wire harness on a form board, the method comprising: (a) supporting a wire harness comprising a wire end connector and a multiplicity of wires having ends inserted in the wire end connector; (b) opening a wire gripper of a routing end effector mounted to an end of a robotic arm; (c) controlling the robotic arm while the wire gripper is open to move the routing end effector so that respective first portions of all wires of the multiplicity of wires are accessible for gripping by the wire gripper; (d) controlling the wire gripper to grip the first portions of the wires of the multiplicity of wires; and (e) controlling the robotic arm to move the routing end effector to place second portions of the wires of the multiplicity of wires in a first elastic retainer wire routing device attached to the form board with the wire end connector hanging from the first elastic retainer wire routing device, wherein the second portions are disposed between the wire end connector and the respective first portions. Steps (b) through (e) are performed in response to commands from a computer.

In accordance with some embodiments, the method described in the immediately preceding paragraph further comprises the following steps: (f) opening the wire gripper; (g) controlling the robotic arm while the wire gripper is open to move the routing end effector so that respective third portions of a first group of wires of the multiplicity of wires are accessible for gripping by the wire gripper; (h) controlling the wire gripper to contain the third portions of the wires of the first group of wires in a containment state; (i) controlling the robotic arm while the wire gripper is in the containment state to move the routing end effector to position fourth portions of the wires of the first group of wires over a second elastic retainer wire routing device attached to the form board; (j) controlling the wire gripper to grip fifth portions of the wires of the first group of wires; (k) controlling the robotic arm while the wire gripper is gripping the fifth portions of the wires to move the routing end effector to place the fourth portions of the wires of the first group of wires in the second elastic retainer wire routing device. Thereafter, the foregoing steps are repeated for the second group of wires as follows: (l) opening the wire gripper; (m) controlling the robotic arm while the wire gripper is open to move the routing end effector so that respective third portions of a second group of wires of the multiplicity of wires are accessible for gripping by the wire gripper; (n) controlling the wire gripper to contain the third portions of the wires of the second group of wires; (o) controlling the robotic arm while the wire gripper is in the containment state to move the routing end effector to position fourth portions of the wires of the second group of wires over a third elastic retainer wire routing device attached to the form board; (p) controlling the wire gripper to grip fifth portions of the wires of the second group of wires; and (q) controlling the robotic arm while the wire gripper is gripping to move the routing end effector to place the fourth portions of the wires of the second group of wires in the third elastic retainer wire routing device. Steps (f) through (q) are performed in response to commands from the computer.

Another aspect of the subject matter disclosed in detail below is method for routing wires of a wire harness on a form board, the method comprising: (a) receiving a wire harness comprising a wire end connector and a multiplicity of groups of wires having ends inserted in the wire end connector; (b) actuating a carrier end effector mounted to an end of a first robotic arm to grip first and second portions of the wires of the multiplicity of groups of wires using first and second pairs of wire gripper fingers of the carrier end effector, wherein the first portions of the wires are respectively disposed between the wire end connector and the second portions of the wires, and wherein the multiplicity of groups of wires comprise first and second groups of wires; (c) opening a wire gripper of a routing end effector mounted to an end of a second robotic arm; (d) controlling the second robotic arm while the wire gripper is open to move the routing end effector so that respective third portions of the wires pass through an opening in the wire gripper, wherein the third portions of the wires are disposed between the first and second portions of the wires; (e) controlling the wire gripper to grip the third portions of the wires; (f) controlling the carrier end effector to release the first and second portions of the wires; and (g) controlling the second robotic arm while the wire gripper is gripping to move the routing end effector to place the first portions of the wires in a first elastic retainer wire routing device attached to the form board.

In accordance with some embodiments, the method described in the immediately preceding paragraph further comprises the following steps performed subsequent to step (b): placing a hanging portion of the first group of wires in an open first notch in a wire group containment device of the carrier end effector; controlling the carrier end effector to close the first notch; placing a hanging portion of the second group of wires in an open second notch in a wire group containment device of the carrier end effector; and controlling the carrier end effector to close the second notch. The method further comprises: controlling the carrier end effector to open the first notch to release the wires of the first group of wires prior to step (g); and controlling the carrier end effector to open the second notch to release the wires of the second group of wires prior to step (m).

A further aspect of the subject matter disclosed in detail below is a method for routing wires of a wire harness on a form board, the method comprising: (a) loading a wire harness onto a wire carrier, wherein the wire harness comprises a wire end connector and wires of first and second groups of wires having ends connected to the wire end connector; (b) coupling the wire carrier to carrier tooling mounted to an end of a first robotic arm while the wire carrier carries the wire harness; (c) controlling the first robotic arm to move the wire carrier and wire harness toward the form board; (d) opening a wire gripper of a routing end effector mounted to an end of a second robotic arm; (e) controlling the second robotic arm while the wire gripper is open to move the routing end effector so that respective first portions of the first and second groups of wires are accessible for gripping; (f) controlling the wire gripper to grip the first portions of the first and second groups of wires; and (g) controlling the second robotic arm while the wire gripper is gripping to move the routing end effector to place second portions of the first and second groups of wires in a first elastic retainer wire routing device attached to the form board.

Yet another aspect of the subject matter disclosed in detail below is a routing end effector comprising: a housing assembly comprising a hook housing that forms a distal end of the housing assembly, wherein the hook housing comprises internal surfaces which define a channel and a pair of concave curved external surfaces which define a cradle at the distal end of the housing assembly; a stop block affixed to the hook housing and disposed within the channel, wherein the stop block comprises a convex curved external surface disposed adjacent to the cradle; a linear actuator which is supported by the housing assembly, wherein the linear actuator comprises a linearly displaceable member; and a hook which is coupled to the linearly displaceable member, wherein the hook is linearly displaceable in conjunction with the linearly displaceable member in a range from an open position at which a curved section of the hook projects forward of the cradle to a closed position at which the curved section of the hook does not project forward of the cradle. The stop block, cradle, and hook are configured and arranged such that, as the hook approaches the closed position, the convex curved external surface of the stop block and the curved section of the hook grip any intervening segments of wires which are spanning the cradle.

A further aspect of the subject matter disclosed in detail below is a routing end effector comprising: a housing assembly comprising a hook housing that forms a distal end of the housing assembly, wherein the hook housing comprises internal surfaces which define a channel and a pair of concave curved external surfaces which define a cradle at the distal end of the housing assembly; a stop block affixed to the hook housing and disposed within the channel, wherein the stop block comprises a convex curved external surface disposed adjacent to the cradle; a first pneumatic actuator comprising a first cylinder affixed to the housing assembly and a first piston rod which is linearly displaceable relative to the first cylinder; a second pneumatic actuator comprising a second cylinder which is linearly displaceable relative to the housing assembly and a second piston rod which is linearly displaceable relative to the second cylinder; an actuator coupler which couples the second cylinder to the first piston rod; and a hook which is coupled to the second piston rod. The hook is linearly displaceable in conjunction with the second piston rod in a range from an open position at which the hook projects forward of the hook housing to a closed position at which the hook is disposed inside the channel of the hook housing. The stop block, cradle, and hook are configured and arranged such that, as the hook approaches the closed position, the convex curved external surface of the stop block and the curved section of the hook grip any intervening segments of wires which are spanning the cradle.

Yet another aspect of the subject matter disclosed in detail below is an apparatus for automated routing of wires of a wire harness assembly on a form board, the apparatus comprising: a robotic arm having a distal end; a routing end effector rotatably coupled to the distal end of the robotic arm; and a robot controller configured to control movement of the robotic arm and rotation of the routing end effector relative to the robotic arm. The routing end effector comprises: a housing assembly comprising a hook housing that forms a distal end of the housing assembly, wherein the hook housing comprises internal surfaces which define a channel and a pair of concave curved external surfaces which define a cradle at the distal end of the housing assembly; a linear actuator which is supported by the housing assembly, wherein the linear actuator comprises a linearly displaceable member; a stop block affixed to the hook housing and disposed within the channel, wherein the stop block comprises a convex curved external surface disposed adjacent to the cradle; and a hook which is coupled to the linearly displaceable member. The hook is linearly displaceable in conjunction with the linearly displaceable member in a range from an open position at which the hook projects forward of the hook housing to a closed position at which the hook is disposed inside the channel of the hook housing. The robot controller is further configured to control linear displacement of the hook by sending activation commands to the linear actuator. The stop block, cradle, and hook are configured and arranged such that as the hook approaches the closed position, the convex curved external surface of the stop block and the curved section of the hook grip any intervening segments of wires which are spanning the cradle.

In accordance with one embodiment of the apparatus described in the immediately preceding paragraph, the robot controller is further configured to control linear displacement of the hook to adopt any one of three states comprising: an open state in which the linearly displaceable member of the linear actuator is extended to the open position and a gap exists between the hook housing and a free end of the hook; a closed state in which the linearly displaceable member of the linear actuator is retracted toward the closed position so that any intervening wire segments are gripped; and a containment state in which the linearly displaceable member of the linear actuator is disposed at an intermediate position between the open and closed positions so that any captured wire segments are contained.

A further aspect of the subject matter disclosed in detail below is a carrier end effector comprising: a shaft having a top end and having a bottom end; a wire end connector staging device mounted to the top end of the shaft; and a wire group containment device mounted to an intermediate portion of the shaft. The wire end connector staging device comprises a pair of pneumatic grippers. The wire group containment device comprises a lane housing mounted to and surrounding the intermediate portion of the shaft, wherein the lane housing has a multiplicity of lanes which open at the outer periphery of the lane housing and extend radially inward. The wire group containment device further comprises a containment fence which partly covers the outer periphery of the lane housing except at a slot which allows a wire group to be removed from a selected lane when the slot is aligned with the selected lane, wherein the containment fence is pivotable in one direction through a predetermined angle about the shaft when the containment fence is not latched to prevent pivoting.

In accordance with one embodiment of the carrier end effector described in the immediately preceding paragraph, the containment fence comprises a multiplicity of ratchet steps, and the wire group containment device further comprises a release pawl that latches the containment fence to prevent further pivoting in the one direction when a tip of the release pawl drops into a ratchet step after each advance of the containment fence. Optionally, the wire group containment device further comprises a constant force spring that urges the containment fence to pivot about the shaft in the one direction when the release pawl is unlatched.

Other aspects of methods and apparatus for automated routing of groups of wires on a form board are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 12A and 12B are flowcharts representing steps of an automated method for routing wires of a wire harness on a form board using a robotic system comprising the components identified in FIG. 7.

FIGS. 30A-30C are flowcharts representing steps of an automated method for routing wires of a wire harness on a form board using a robotic system comprising the components depicted in FIGS. 15, 20, and 23.

Reference will hereinafter be made to the drawings in which similar elements in different drawings bear the same reference numerals.

DETAILED DESCRIPTION

For the purpose of illustration, methods and apparatus for robot motion control and wire dispensing during automated routing of wires onto harness form boards will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The automated wire routing process disclosed herein may be performed by a robotic system that includes multiple articulated robots. Each articulated robot may be implemented using, for example, without limitation, a jointed manipulator arm. Depending on the implementation, each articulated robot may be configured to provide movement and positioning of at least one tool center point corresponding to that robot with multiple degrees of freedom. As one illustrative example, each articulated robot may take the form of a manipulator arm (hereinafter "robotic arm") capable of providing movement with up to six degrees of freedom or more.

Before describing various embodiments of methods and apparatus for automated routing of wires onto harness form boards, a typical form board with affixed wire routing devices will now be described to enable understanding of the context in which the proposed robotic system is designed to operate.

Figure 1:
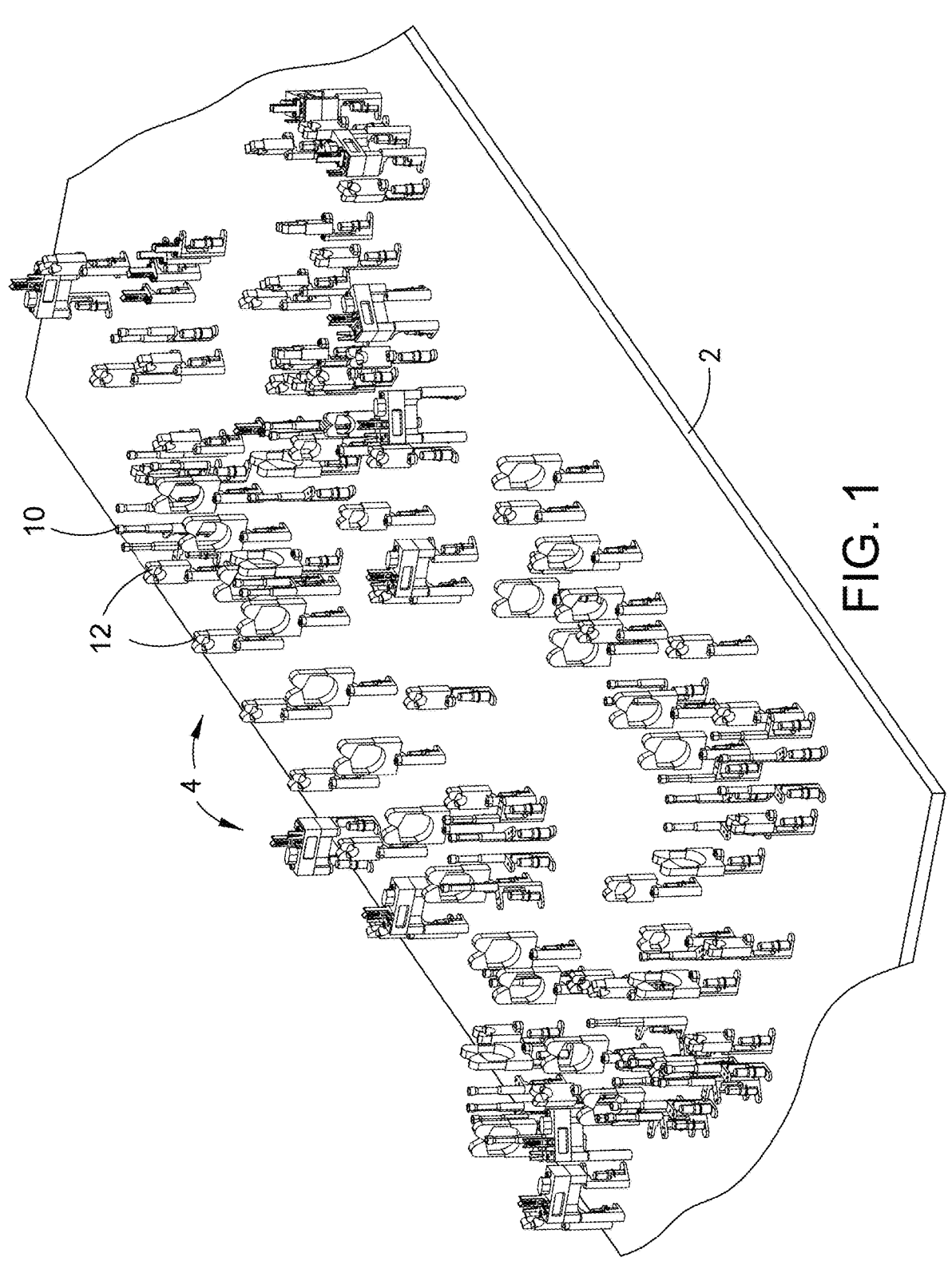
FIG. 1 is a diagram representing a view of a multiplicity of devices attached to a form board by means of temporary fasteners inserted in respective holes in the form board.

FIG. 1 is a diagram representing a three-dimensional view of a form board 2 that has a multiplicity of form board devices 4 attached thereto in a manner that reflects the configuration of a wire bundle to be assembled. As will be described in more detail below, the form board devices 4 may include a single-post wire routing device 10 and an elastic retainer wire routing device 12, both of which are described in detail below. As used herein, the term "wire routing device" means a hardware tool that is configured so that, when the wire routing device is fastened to a form board, a portion of the wire routing device will limit movement of a contacting section of a wire in at least one lateral direction which is parallel to the X-Y plane of the form board to which the wire routing device is attached. The wire routing devices may include a C-frame which is fastened to the form board 2. As used herein, the term "C-frame" means a relatively stiff channel-shaped bracket having mutually parallel upper and lower arms and does not mean a frame having a C-shaped profile. In accordance with the embodiments disclosed herein, the C-frame further includes a member that connects the upper arm to the lower arm.

In accordance with one proposed implementation, the form board 2 is made from a rectangular ⅛-inch-thick perforated sheet with ⅛-inch-diameter holes spaced approximately 3/16 inch (4.7625 mm) apart in a hexagonal pattern. Thus, the vertical spacing between rows is approximately 3/16 (inch)× sin 60°=0.1623798a inch or 4.124446 mm. The sheet is made of aluminum and optionally is coated with a high-friction material. The perforated sheet may be bonded to the top face of a honeycomb core while a second sheet is bonded to the bottom face of the honeycomb core to form a stiff panel.

The form board 2 is typically mounted to or forms part of a support frame (not shown in FIG. 1). The form board devices 4 are attached to the form board 2 by means of temporary fasteners (not shown in FIG. 1) which are inserted in respective holes (also not shown in FIG. 1) in the form board 2. The form board assembly illustrated in FIG. 1 is universal in its application, i.e., the form board assembly can be employed to fabricate wire bundles of different designs requiring different deployment of a set of form board devices 4 mounted to the form board 2. In alternative situations, two or more form board assemblies may be placed adjacent to each other for the purpose of assembling a wire bundle in accordance with various alternative configurations.

Figure 2:
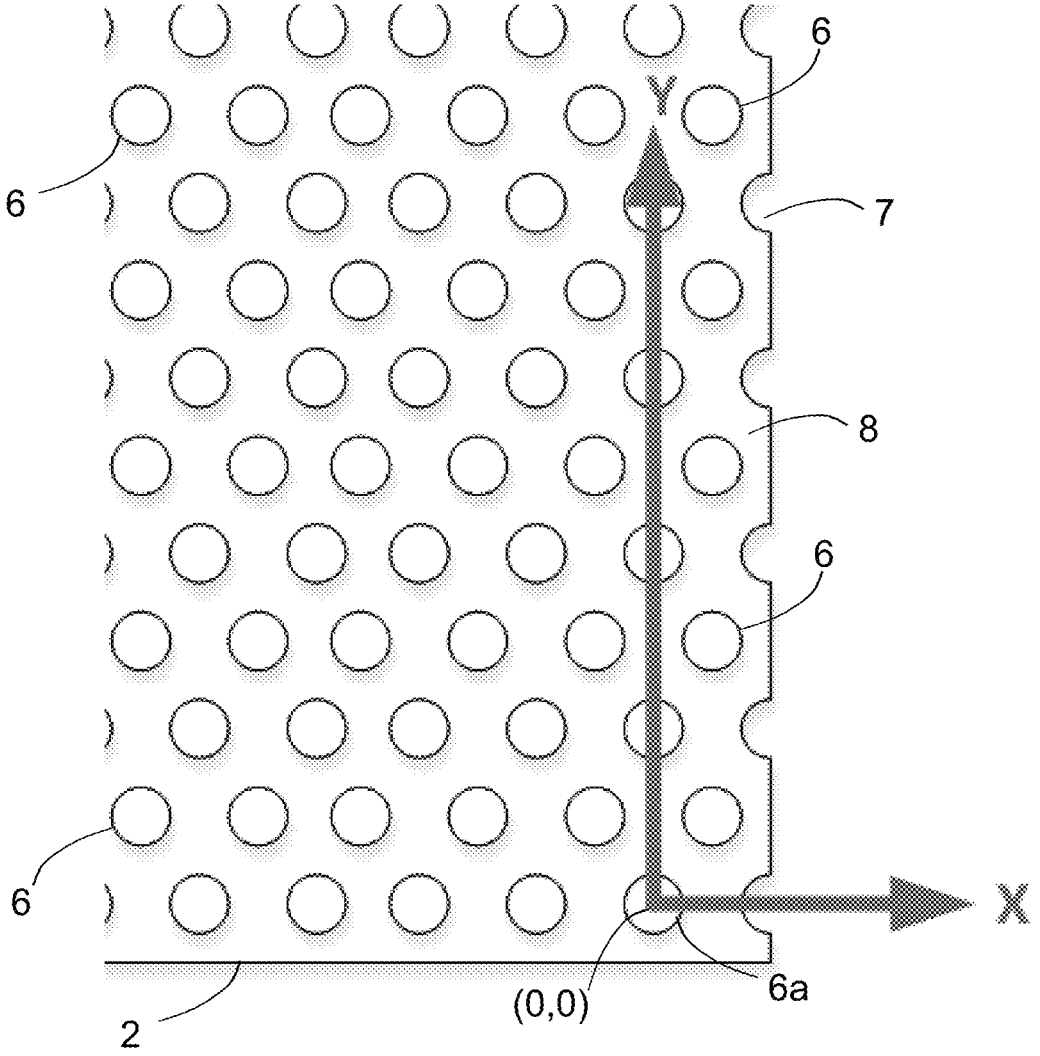
FIG. 2 is a diagram showing one example orientation of a form-board coordinate system.

FIG. 2 is a diagram showing one example orientation of a coordinate system for a form board 2 in accordance with one embodiment. The form board 2 has a multiplicity of holes 6 arranged in a hexagonal pattern. As seen in FIG. 2, the form board 2 may have incomplete holes 7. The form board 2 is preferably rectangular in shape and is constructed to include four edge beams (not shown in FIG. 2) to which a planar plate is secured, for example, by bolts. The plate has a multiplicity of substantially parallel holes 6 formed therein. The holes 6 are typically arranged to form a plurality of parallel rows. In the coordinate system of the form board 2, each hole has a respective position indicated by X and Y coordinates. The edge beams and plate can be made of any structural-type material, either metallic or non-metallic.

As depicted in FIG. 2, the X-axis of the form board coordinate system is parallel to one side of the form board 2, whereas the Y-axis is perpendicular to the X-axis. The origin of the coordinate system is consistently defined across all form boards in the system. The origin point can be located anywhere on the form board. In the example depicted in FIG. 2, the origin of the form board coordinate system is at the center of the lower-rightmost hole 6a that has a complete row of complete holes 6 to its left and a complete column of complete holes 6 above it. The X-axis extends to the right from hole 6a (as indicated by arrow X in FIG. 2), whereas the Y-axis extends upward from hole 6a (as indicated by arrow Y in FIG. 2). Thus, the coordinate position of the center of each hole 6 (in the frame of reference of the form board coordinate system) is known. Such hole coordinates are stored as digital data in a non-transitory tangible computer-readable storage medium. The actual coordinate positions of the form board devices 4 (see FIG. 1) physically attached to the form board 2 correspond to the coordinate positions of the respective holes 6 in which the form board devices 4 are inserted.

Figure 3:
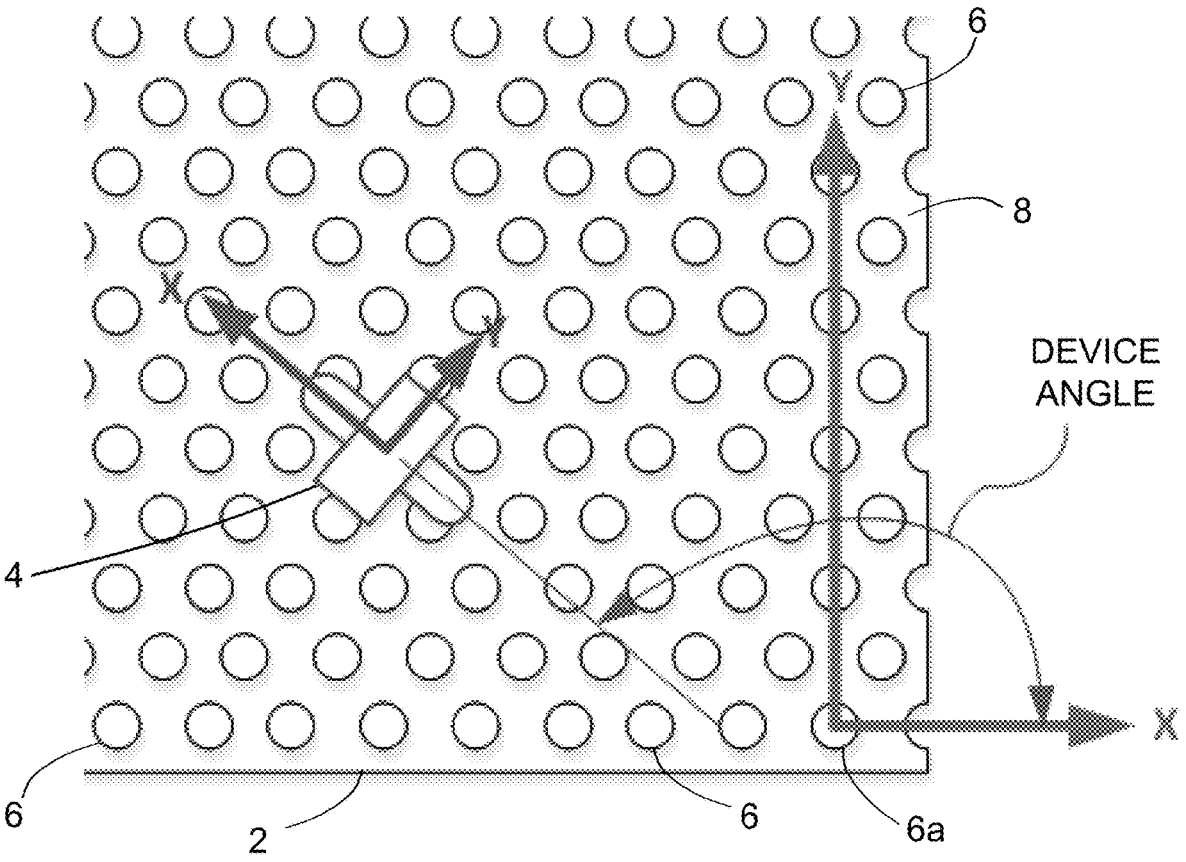
FIG. 3 is a diagram representing a plan view of a form board having a form board device placed thereon with a device angle measured with respect to an X-axis of the form board coordinate system.

Each form board device 4 has its own coordinate system and orientation information. Each wire routing device 4, when placed in the coordinate system of the form board 2 at a coordinate position, also has an orientation, referred to hereinafter as the "device angle". The device angle is defined as the angle from the X-axis of a wire routing device 30 to the X-axis of the form board 2, as shown in FIG. 3.

Figure 4:
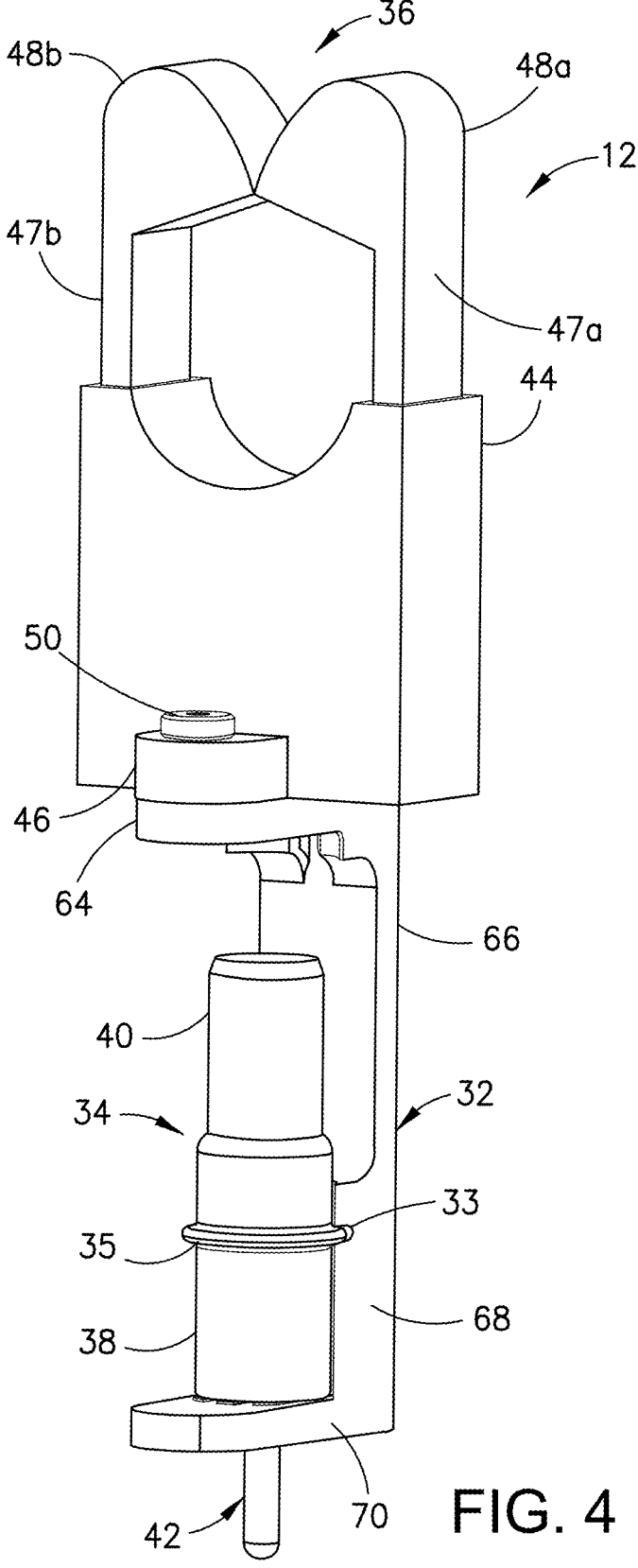
FIG. 4 is a diagram representing a view of an elastic retainer wire routing device that includes a C-frame, a temporary fastener, and a routing clip in accordance with one embodiment.

For example, the coordinate system of the wire routing device 12 depicted in FIG. 4 is centered at the centerline of the temporary fastener 34. More specifically, the Z-axis of the coordinate system of the wire routing device 12 depicted in FIG. 4 is coaxial with the centerline of the temporary fastener 34. The X-axis of the coordinate system of the wire routing device 12 is perpendicular to the Z-axis and aligned with the centerline of the lower arm of a C-frame 32. The Y-axis of the coordinate system of the wire routing device 12 is perpendicular to both the Z-axis and X-axis.

FIG. 4 is a diagram representing a three-dimensional view of an elastic retainer wire routing device 12 that includes a C-frame 32 made of rigid material (e.g., aluminum), a temporary fastener 34 fastened to the C-frame 32 and a routing clip 36 (also known as an "elastic retainer"). The temporary fastener 34 is configured to initially fasten to the lower arm 70 of the C-frame 32 and later fasten the C-frame 32 to a form board 2 by interacting with a hole 6 in the form board 2. The routing clip 36 is attached to the upper arm 64 of the C-frame 32. The C-frame 32 further includes a fastener retaining block 68 integrally formed with one end of the lower arm 70 and a vertical member 66 having one end integrally formed with one end of the upper arm 64 and another end integrally formed with the fastener retaining block 68.

The temporary fastener 34 includes a cylindrical housing 38 with an annular flange 35 extending around the housing 38. A plunger 40 is slidably coupled to the housing 38. A portion of the plunger 40 projects from one end of the housing 38. A spacer (not visible in FIG. 4, but see spacer 41 in FIG. 6A) and a pair of locking pins 42 project from the opposite end of the housing 38. A spring is contained inside the housing 38. The locking pins 42 are connected to the plunger 40 and displace with the plunger 40 when the plunger 40 is pushed further into the housing 38. The aforementioned spacer is fixed relative to the housing 38. A portion of the annular flange 35 sits in an arc-shaped groove 33 formed in the fastener retaining block 68 of the C-frame 32.

Still referring to FIG. 4, the routing clip 36 includes a base 44 having a pair of mounting flanges 46 (only one of which is visible in FIG. 4) fastened to the upper arm of the C-frame 32 by means of screws 50 (or other type of fasteners), a pair of flexible clip arms 47a and 47b configured to bend resiliently away from each other, and a pair of fingers 48a and 48b respectively connected to or integrally formed with the upper ends of the flexible clip arms 47a and 47b and in contact when the routing clip 36 is closed. The routing clip 36 may be opened to receive one or more wires by pushing down on the outer inclined surfaces of the fingers 48a and 48b, thereby causing the flexible clip arms 47a and 47b to bend outward and away from each other. The wires may then pass through the gap formed between the fingers 48a and 48b. The stressed flexible clip arms 47a and 47b bend inward when the force causing them to bend outward is removed. The routing clip 36 forms a cable bundle as the wires are inserted and gathered. A complete bundle can be easily removed from the routing clip 36 by lifting the wire bundle upward, causing the wire bundle to bear against the inner inclined surfaces of the fingers 48a and 48b, thereby again causing the flexible clip arms 47a and 47b to bend outward and away from each other.

The wire routing device 12 depicted in FIG. 4 may be placed on the form board 2 by a pick-and-place end effector (not shown in the drawings). The pick-and-place end effector picks up the wire routing device 12 at one location and then carries wire routing device 12 to a position above a target location (including a target position and a target orientation) on a form board. Then the pick-and-place end effector of the robot depresses the plunger 40 into the housing 38, causing the distal ends of locking pins 42 to extend further away from the housing 38 and beyond the spacer. As the locking pins 42 are extended beyond the spacer, the locking pins 42 come together at their distal ends. The locking pins 42 can then be inserted into the hole in a perforated plate 8 (see FIGS. 2 and 3) of the form board 2 that is nearest to the target position.

Figure 5:
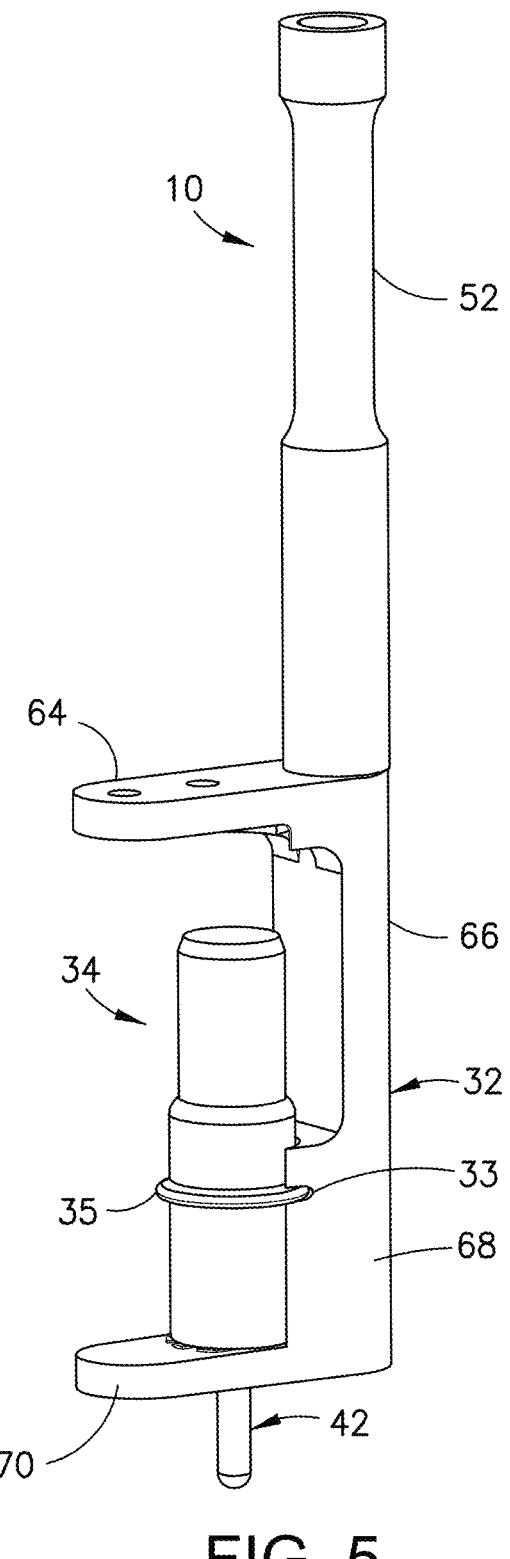
FIG. 5 is a diagram representing a view of a wire routing device that includes a C-frame, a temporary fastener, and a single post in accordance with one embodiment.

FIG. 5 is a diagram representing a three-dimensional view of a single-post wire routing device 10 in accordance with one embodiment. The single-post wire routing device 10 includes a C-frame 32, a temporary fastener 34 mounted to the lower arm 70 of the C-frame 32, and a post 52 having one end fastened to the C-frame 32 and extending vertically upward. In the example shown in FIG. 5, the post 52 has a circular cross section along its entire length with a varying diameter. The single-post wire routing device 10 may be located on a form board at a position where the planned wire bundle configuration calls for one or more wires to bend, thus changing direction. Multiple single-post wire routing devices 10 may be placed at regular angular intervals along an arc to be followed by a curved segment of the wire being routed.

Figure 6A:
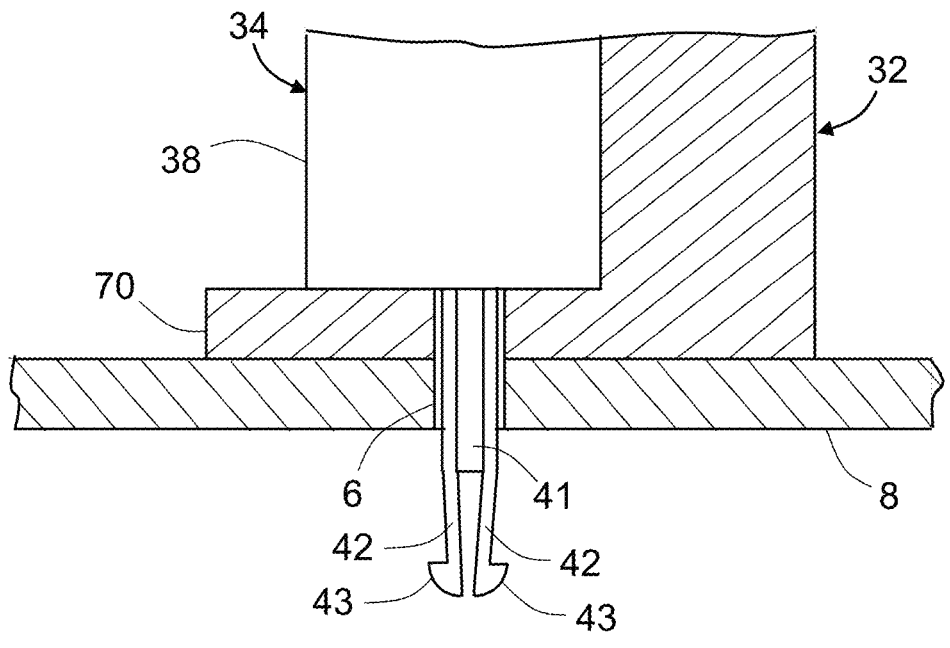
FIG. 6A is a diagram representing a fragmentary side view of the temporary fastener depicted in FIGS. 4 and 5, showing the fastening mechanism extending through a perforated plate of a form board in an unclamped position.

FIG. 6A is a diagram representing a fragmentary side view of the temporary fastener 34 depicted in FIGS. 4 and 5, showing the fastening mechanism extending through the perforated plate 8 in an unclamped position. As previously described, the plunger 40 is extended further into the housing 38 to cause the distal ends (half-heads 43) of locking pins 42 to extend further away from the housing 38 and beyond the spacer 41. As the locking pins 42 are extended beyond the spacer 41, the locking pins 42 come together at their distal ends. The locking pins 42 can then be inserted into a hole 6 in the perforated plate 8 of the form board.

Figure 6B:
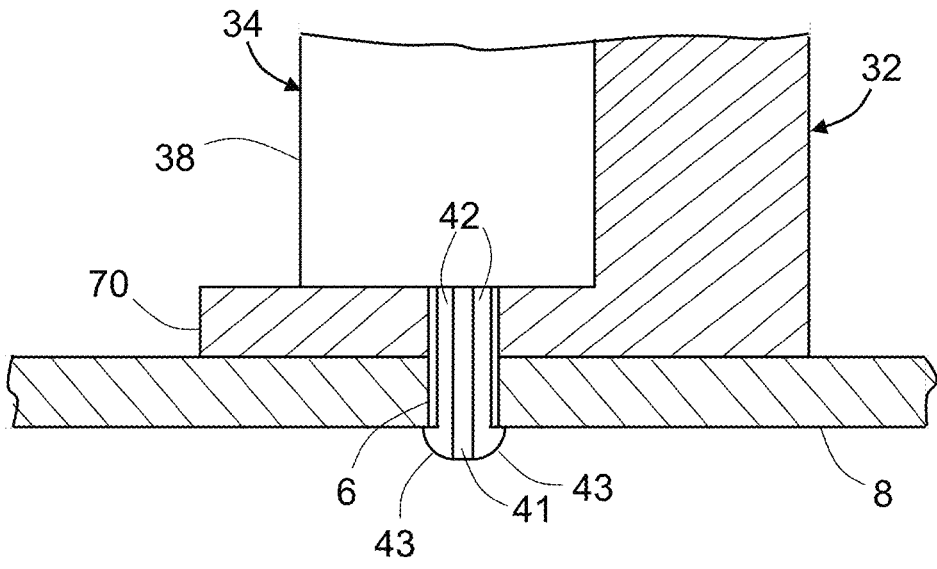
FIG. 6B is a diagram representing a fragmentary side view of the temporary fastener depicted in FIG. 6A, showing the fastening mechanism in a clamped position for securing the form board device to the form board.

FIG. 6B is a diagram representing a fragmentary side view of the temporary fastener depicted in FIG. 6A, showing the fastening mechanism in a clamped position for securing the wire routing device 30a to the perforated plate 8 of the form board. After the locking pins 42 have been inserted in the hole, the end effector releases the plunger 40, causing the half-heads 43 of locking pins 42 to retract back toward the housing 38. The half-heads 43 of the locking pins 42 are again separated from each other by the spacer 41 (which is stationary) as the locking pins 42 retract. As the distal ends of the locking pins 42 separate, the half-heads 43 of the locking pins 42 engage and latch against the opposite side of the perforated plate 8, thereby locking wire routing device 30a to the form board 2. The spring (not shown in the drawings) inside housing 38 pulls the locking pins 42 toward the housing 38, pulling the lower arm 70 of the C-frame 32 tightly against the perforated plate 8. In the state depicted in FIG. 6B, the half-heads 43 of the locking pins 42 are separated by the spacer 41 and unable to pass through the hole 6. In this way, the temporary fastener 34 depicted in FIGS. 4 and 5 functions as a temporary rivet capable of holding the wire routing device on the form board 2 during a subsequent wire routing operation.

Figure 7:
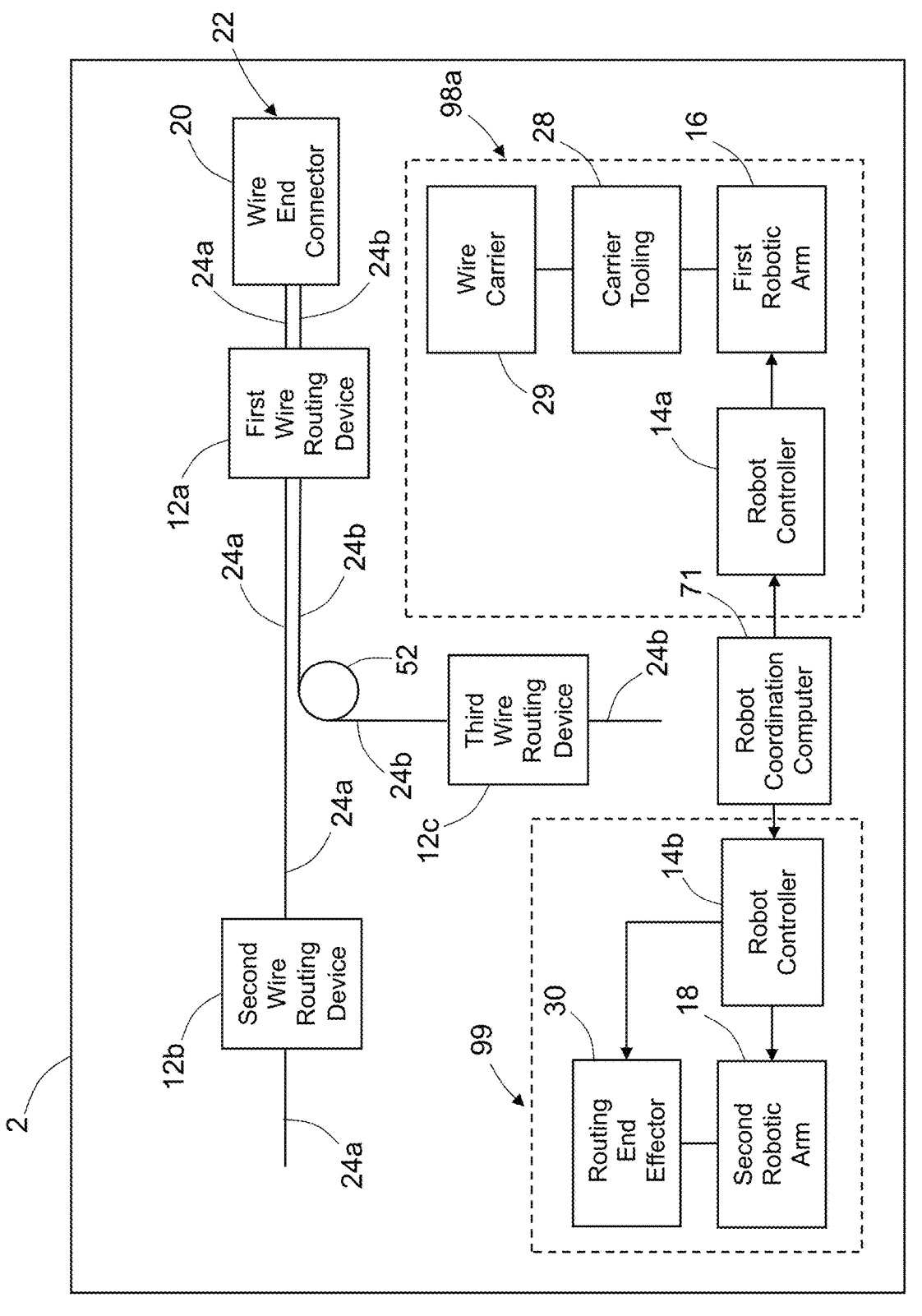
FIG. 7 is a block diagram which identifies components of a robotic system designed for routing wires of a wire harness along paths on a form board in accordance with an embodiment that includes a routing end effector mounted to the end of one robotic arm and a passive wire carrier mounted to carrier tooling at the end of another robotic arm.

FIG. 7 is a block diagram which identifies components of a computerized system designed for routing wires of a wire harness 22 along paths on a form board 2 in accordance with one embodiment. FIG. 7 depicts a simple wire harness 22 comprising a wire end connector 20, a first group of wires 24 (hereinafter "first wire group 24a") having ends inserted into the wire end connector 20, and a second group of wires 24 (hereinafter "second wire group 24b") having ends inserted into the wire end connector 20. Although automated routing of a simple wire harness 22 will be described for the purpose of illustration, a person skilled in the art will appreciate that a typical wire harness has more than two groups of wires having ends inserted in the same wire end connector.

The computerized system depicted in FIG. 7 includes a wire harness-carrying robotic system 98a and a wire-routing robotic system 99. The wire harness-carrying robotic system 98a includes a passive wire carrier 29 mounted to carrier tooling 28 at the end of a first robotic arm 16 and a robot controller 14a. The movements of the first robotic arm 16 are controlled by robot controller 14a. The robot controller 14a outputs commands to various motor controllers incorporated in the first robotic arm 16. The wire-routing robotic system 99 includes a routing end effector 30 mounted to the end of a second robotic arm 18 and a robot controller 14b. The movements of the second robotic arm 18 are controlled by robot controller 14b. The robot controller 14b outputs commands to various motor controllers incorporated in the second robotic arm 18. In addition, robot controller 14b controls the operation of the routing end effector 30.

The wire carrier 29 may consist of a plurality of plastic tubes affixed to a rigid board. When the wire carrier 29 is loaded, one tube supports the wire end connector 20 and the other tubes contain hanging portions of the wires of respective wire groups having ends inserted in the wire end connector 20. In addition, the carrier tooling 28 may consist of a pair of clamps or grippers mounted to a distal end of the first robotic arm 16, wherein the clamps or grippers hold the rigid board of wire carrier 29 securely during movements of the first robotic arm 16. The routing end effector 30 includes a wire gripper (not shown in FIG. 7) that is configured to open to enable capture of one or more wire groups of the wire harness being supported by the wire carrier 29.

The respective movements of the robotic arms are coordinated by a robot coordination computer 71 which is communicatively coupled (by wires or wireless) to the robot controllers 14a and 14b. For example, the robot coordination computer 71 can be programmed to send commands to the robot controllers 14a and 14b which cause the wire carrier 29 to be moved to a location (including position and orientation) whereat a particular group of wires is readily accessible to the routing end effector 30, which routing end effector 30 in turn is moved to a location whereat a wire gripper incorporated in the routing end effector 30 is able to grip a portion of that particular group of wires. The movements of the wire gripper (not shown in FIG. 7) and the wire carrier 29 may be coordinated so that the particular group of wires arrives at a specified location prior to the approach of the wire gripper to that same location.

For the purpose of illustration, FIG. 7 depicts only a simplified arrangement of form board devices affixed to a form board 2. A first wire routing device 12a is shown affixed to the form board 2 at a first location. A second wire routing device 12b is shown affixed to the form board 2 at a second location. A third wire routing device 12c is shown affixed to the form board 2 at a third location. More specifically, the first through third wire routing devices 12a-12c are elastic retainer wire routing devices. In addition, a post 52 is affixed to the form board 2 at a fourth location. In practice, many more form board devices would be affixed to the form board, but the few board devices depicted in FIG. 7 are sufficient to for the purpose of explanation of the principle of automated operation proposed herein. Thus, the first and second locations only partly define the planned wire path for first wire group 24a, while the first, third, and fourth locations only partly define the planned wire path for second wire group 24b.

FIG. 7 depicts an exemplary state of a form board 2 following placement of portions of the wire harness 22 wherein: (a) respective second portions of the wires of first wire group 24a and second wire group 24b have been placed in the first wire routing device 12a; (b) respective fourth portions of the wires of first wire group 24a have been placed in a second wire routing device 12b; and (c) respective fourth portions of the wires of second wire group 24b have been placed in a third wire routing device 12c. This situation is partly depicted in FIG. 8, which shows second portions of the wires of first wire group 24a placed in the first wire routing device 12a and fourth portions of the wires of first wire group 24a placed in the second wire routing device 12b. Referring to FIG. 7, during the automated wire routing process, the routing end effector 30 also partially wraps the second wire group 24b around a portion of the outer circumferential surface of the post 52.

Figure 8:
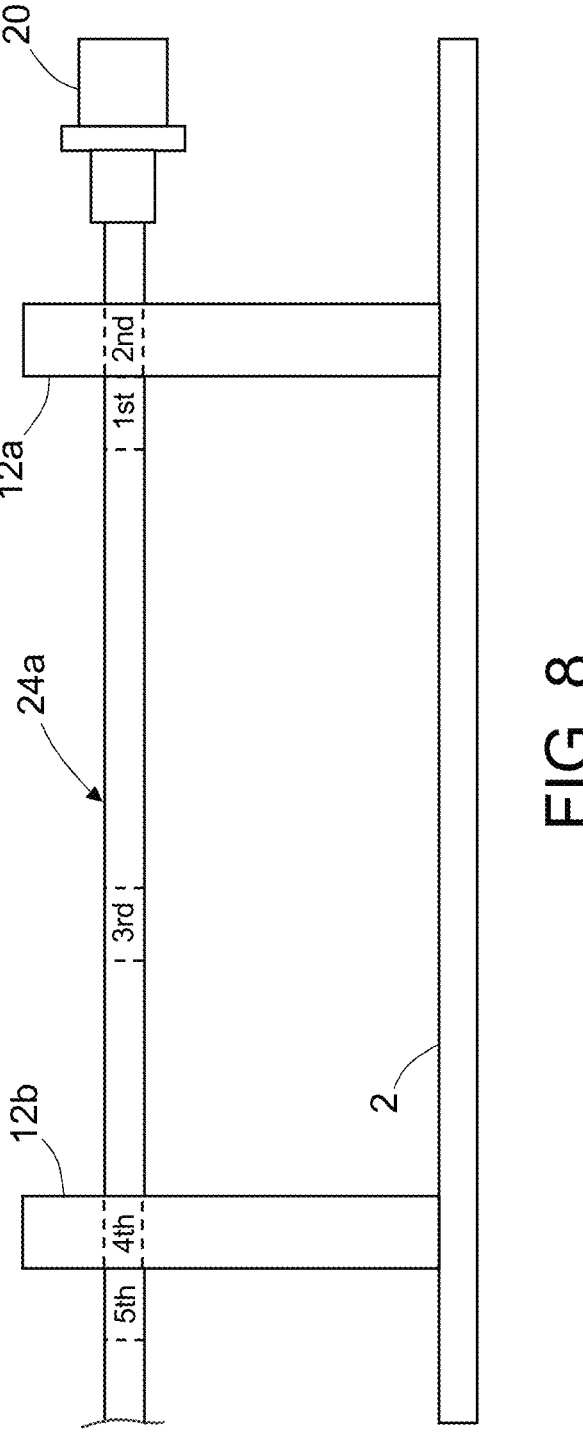
FIG. 8 is a diagram showing the convention adopted in claim 1 appended hereto, which claim refers to first through fifth portions of a group of wires which terminate at a wire end connector, wherein the second portions are placed robotically in a first wire routing device and the fourth portions are placed robotically in a second wire routing device.

FIG. 8 is a diagram showing the convention adopted in independent claim 1 appended hereto, which claim refers to first through fifth portions of the wires of a first wire group 24a which terminate at a wire end connector 20. The second portions of the wires of first wire group 24a are placed robotically in a first wire routing device 12a and the fourth portions of the wires of first wire group 24a are placed robotically in a second wire routing device 12b. (Note: The convention adopted in independent claim 8, which recites first through sixth portions of the wires, differs from the convention depicted in FIG. 8.)

In order to place the second portions of the wires of first wire group 24a in the first wire routing device 12a, the routing end effector 30 grips the first portions of the wires of first wire group 24a, carries the first portions of the wires of first wire group 24a (and the first portions of the wires of other wire groups not shown in FIG. 8) to a location whereat the second portions of the wires of first wire group 24a overlie the first wire routing device 12a. Then the routing end effector 30 pries open the first wire routing device 12a and places the second portions of the wires of first wire group 24a inside the first wire routing device 12a. Thereafter, the routing end effector 30 releases the first portions of the wires of first wire group 24a and returns to the wire carrier 29 (see FIG. 7). The routing end effector 30 then: captures (i.e., contains) third portions of the wires of first wire group 24a; guides the first wire group 24a to a position whereat fourth portions of the wires of first wire group 24a overlie the second wire routing device 12b; grips fifth portions of the wires of first wire group 24a; and places the fourth portions of the wires of first wire group 24a inside the second wire routing device 12b.

Figure 9A:
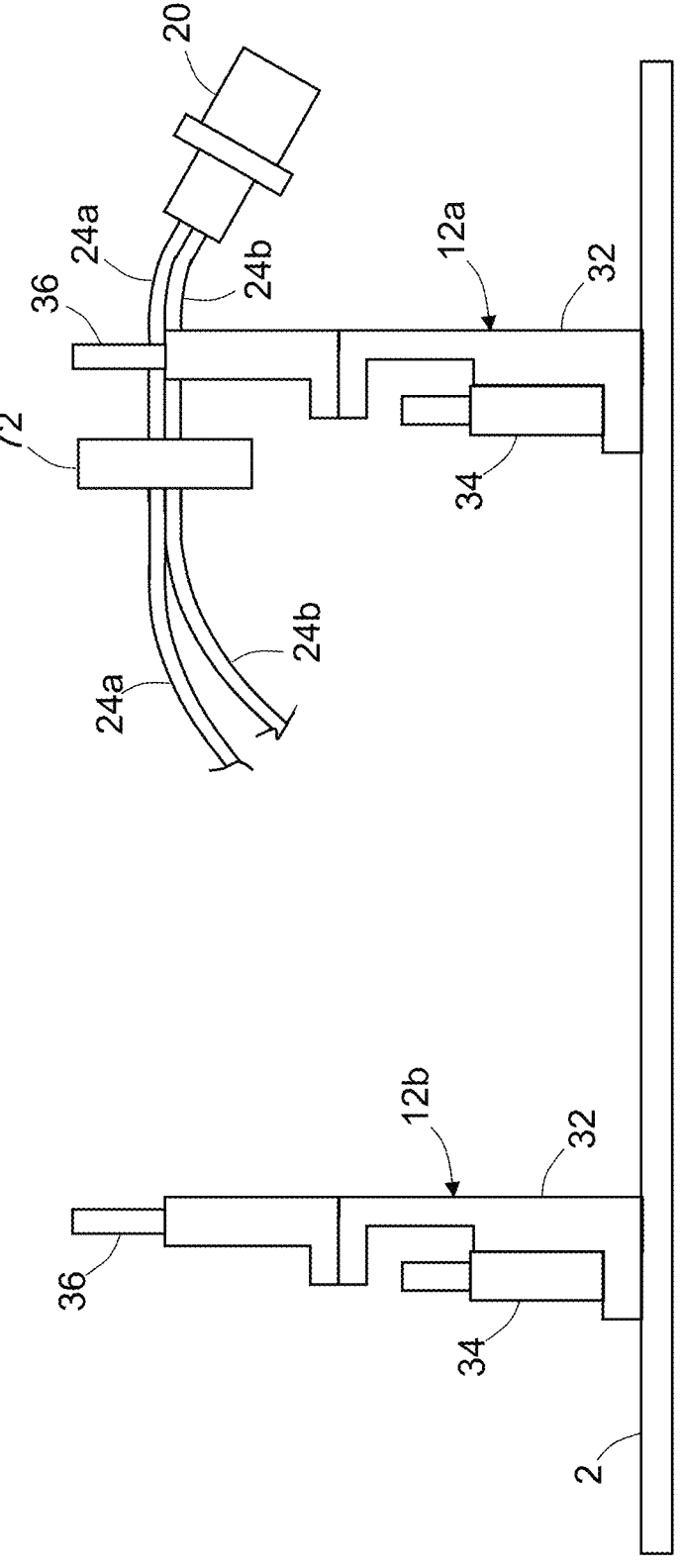
FIG. 9A is a diagram representing a side view of the first stage of an automated method for routing a wire harness on a form board in which portions of first and second groups of wires proximate to a wire end connector are placed robotically in a first wire routing device which is attached to the form board.

FIG. 9A is a diagram representing a side view of the first stage of an automated method for routing the wire harness 22 on the form board 2 in which second portions of the wires of the first and second wire groups 24a and 24b proximate to wire end connector 20 are placed robotically in the first wire routing device 12a by a wire gripper 72. The wire gripper 72 shown in FIG. 9A is gripping first portions of the wires of the first and second wire groups 24a and 24b. The first wire routing device 12a comprises a C-frame 32, a temporary fastener 34 which fastens the C-frame 32 to the form board 2, and a routing clip 36 which is mounted to the C-frame 32. (The second wire routing device 12b has a similar structure.) The second portions of the wires of the first and second wire groups are contained by the wire clip 36 of the first wire routing device 12a. The portions of the first and second wire groups 24a and 24b which are contained by the wire carrier 29 are not shown in FIG. 9A.

Figure 9B:
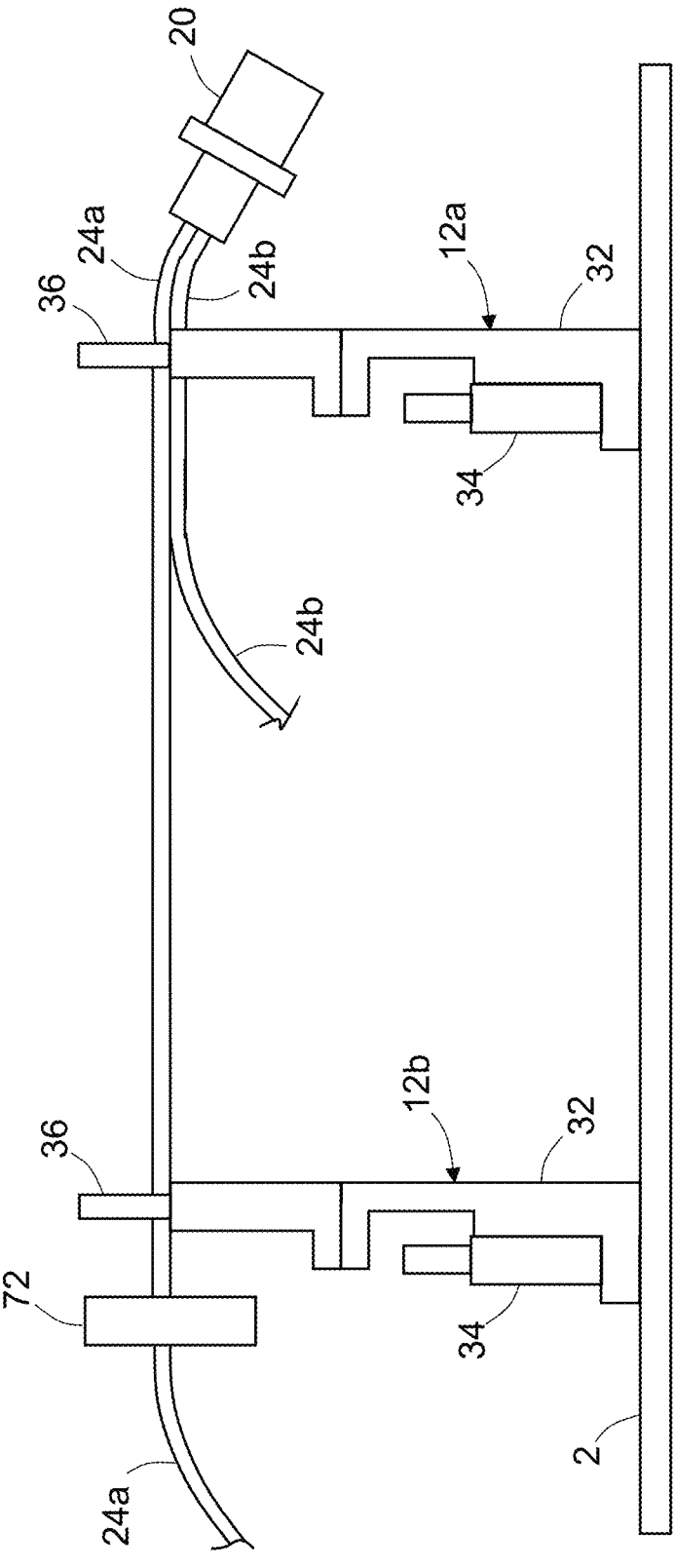
FIG. 9B is a diagram representing a side view of the second stage of the automated method partly depicted in FIG. 9A in which portions of the first group of wires are placed robotically in a second wire routing device which is attached to the form board.

FIG. 9B is a diagram representing a side view of the second stage of the automated method partly depicted in FIG. 9A in which fourth portions of the wires of the first wire group 24a are placed robotically in the second wire routing device 12b by the wire gripper 72. The wire gripper 72 shown in FIG. 9B is gripping fifth portions of the wires of the first wire group 24a. The fourth portions of the wires of the first wire group are contained by the wire clip 36 of the second wire routing device 12b. The portions of the first and second wire groups 24a and 24b which are contained by the wire carrier 29 are not shown in FIG. 9B.

Figure 10:
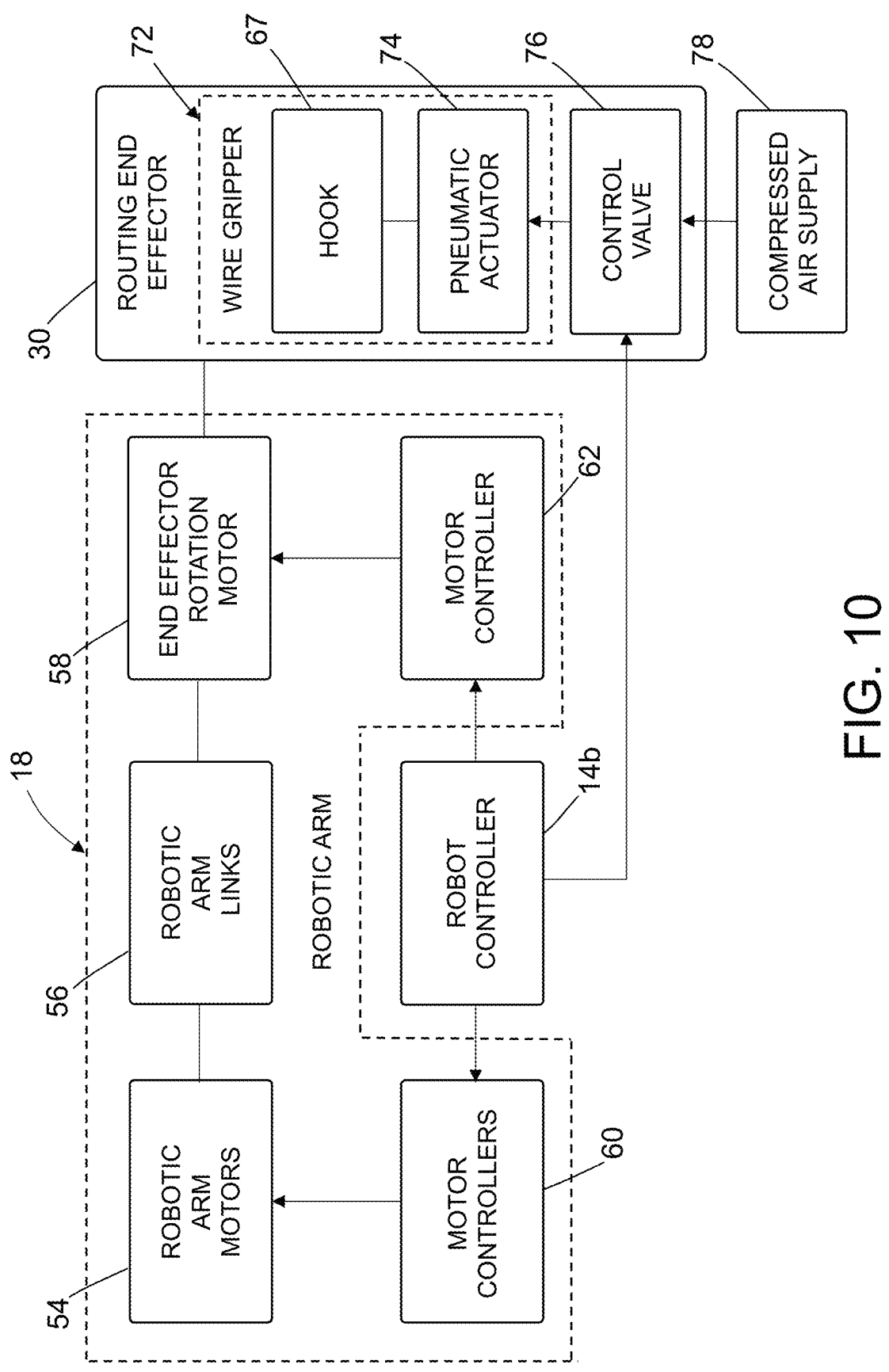
FIG. 10 is a block diagram which identifies components of a robotic system in which the routing end effector includes a wire gripper comprising a linearly displaceable hook coupled to a pneumatic linear actuator.

FIG. 10 is a block diagram which identifies components of a robotic system in which the routing end effector 30 includes a wire gripper 72. In one proposed implementation, the wire gripper 72 comprises a hook 67 which is affixed to a distal end of a piston rod of a pneumatic linear actuator 74 (hereinafter "pneumatic actuator 74"). The hook 67 translates (displaces) linearly during extension or retraction of the piston rod of pneumatic actuator 74. In the fully extended (open) position, the hook 67 projects out of a hook housing. The hook housing forms part of a housing assembly (not shown in FIG. 10) in which the pneumatic actuator 74 resides. The routing end effector 30 further comprises a control valve 76 (e.g., a solenoid valve) that is configured to control the flow of compressed air from the compressed air supply 78 to the pneumatic actuator 74 in response to control signals received from robot controller 14b.

The automated system depicted in FIG. 10 includes a robot controller 14b (e.g., a computer or processor) that is configured (e.g., programmed) to coordinate the operation of all electric motors and pneumatic actuators. The robot system further includes robotic arm 18. The routing end effector 30 is rotatably coupled to the distal end of the robot arm 18. The routing end effector 30 is rotated relative to the distal end of the robotic arm 18 by an end effector rotation motor 58. The robotic arm 18 further includes a plurality of robotic arm links 56 coupled by joints. The distal end of robotic arm 18 may be moved by activating one or more of a plurality of robotic arm motors 54. For example, a robotic arm motor 54 is configured to cause one robotic arm link 56 to rotate about an axis of the joint that couples the one robotic arm link to another robotic arm link 56. The robot controller 14b sends commands to motor controllers 60, which in turn control operation of the robotic arm motors 54. Similarly, the robot controller 14b sends commands to motor controller 62, which in turn controls operation of the end effector rotation motor 58.

The robot system may be in the form of a pedestal robot or a gantry robot. A gantry robot consists of a manipulator arm mounted onto an overhead system that allows movement across a horizontal plane. Gantry robots are also called Cartesian or linear robots. The pedestal robot may have multi-axis movement capabilities. An example of a robot that could be employed with the routing end effector 30 is robot Model KR-150 manufactured by Kuka Roboter GmbH (Augsburg, Germany), although any robot or other manipulator capable of controlling the location of the hook 67 in the manner disclosed herein may be used.

Figure 11:
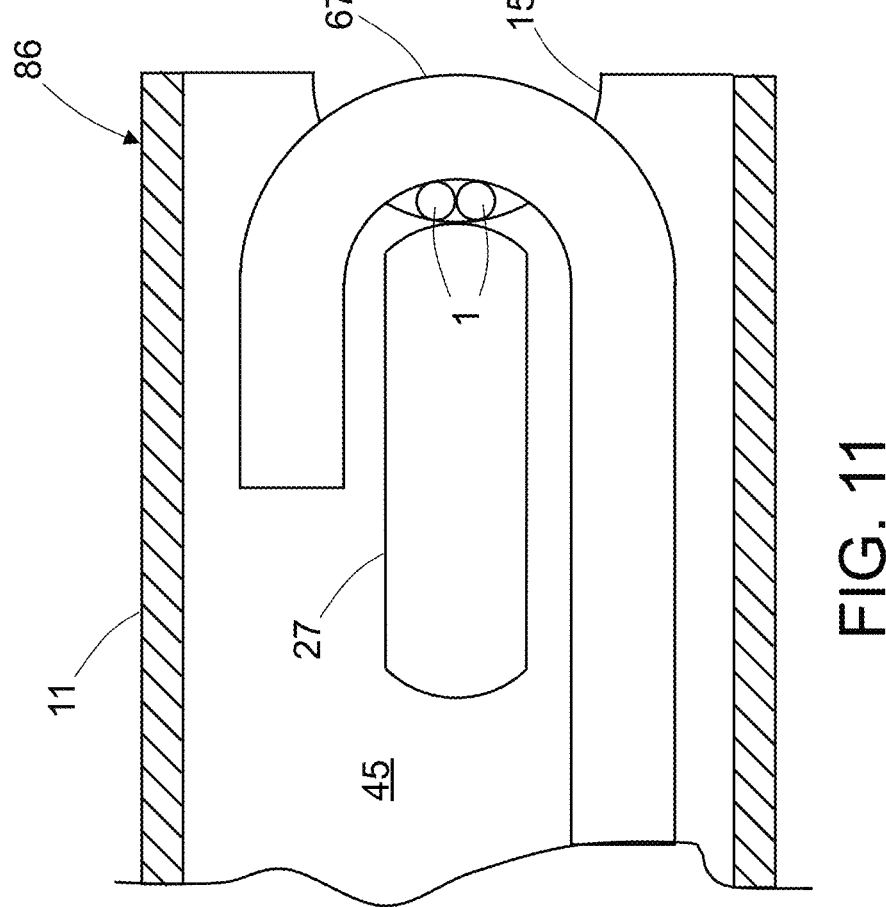
FIG. 11 is a diagram representing a sectional view of a distal portion of a hook housing comprising a cradle, wherein wires spanning the cradle are gripped between a stop block and a linearly displaceable hook.

FIG. 11 is a diagram representing a sectional view of a hook housing 86 that forms a distal end of a housing assembly. In the scenario depicted in FIG. 11, the wire gripper 67 is gripping respective portions of a pair of wires 1. More than two wires 1 may be included the group of wires being gripped. The hook housing 86 comprises internal surfaces 45 which define a channel and a pair of concave curved external surfaces which define a cradle 15 at a distal end of the hook housing 86. (Only one of the two concave curved external surfaces is shown in FIG. 11). In addition, a stop block 27 is affixed to the hook housing 86 and disposed within the channel. The stop block 27 comprises a convex curved external surface disposed adjacent to the cradle 15. The hook 67 is mechanically coupled to the linearly displaceable piston rod (not shown in FIG. 11) of the pneumatic actuator 74. The hook 67 is linearly displaceable in a range from an open position at which the hook 67 projects forward of the hook housing 86 to a closed position at which the hook 67 is disposed inside the channel of the hook housing 86. The stop block 27, cradle 15, and hook 67 are configured and arranged such that, as the hook 67 approaches the closed position, the convex curved external surface of stop block 27 and the confronting surface of the curved section of the hook 67 grip the intervening segments of wires 1 which span the cradle 15. FIG. 11 shows the hook 67 in a nearly closed position, where contact between the convex curved external surface of stop block 27 and the confronting surface of hook 67 is prevented by the intervening presence of wires 1.

Figure 12B:
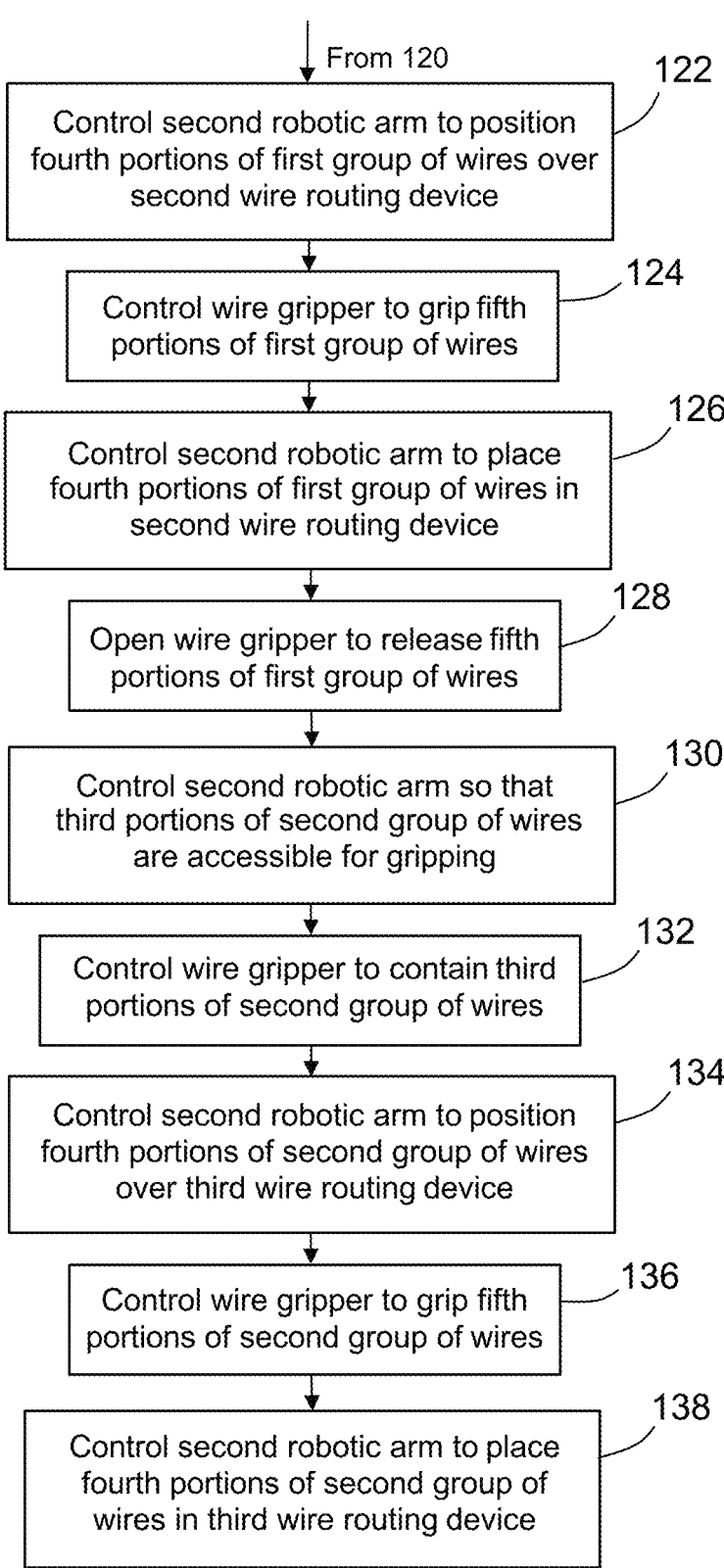

FIGS. 12A and 12B are flowcharts representing steps of an automated method 100 for routing wires of a wire harness on a form board using a robotic system comprising the components identified in FIG. 7. In some instances, the steps listed in FIGS. 12A and 12B need not be performed in the order listed. For example, the robot controllers 14a and 14b may control the end effectors concurrently instead of sequentially. Although the method is described using a wire harness having first and second groups of wires connected to a wire end connector, the robotic operations described may be repeated to route all wire groups of a wire harness having more than two wire groups.

Referring to FIG. 12A, at the start of method 100 a wire harness 22 is loaded onto the wire carrier 29 (step 102). For example, the wire end connector of the wire harness 22 may be manually seated in the open end of one vertical tube of a carrier board and then the groups of wires are manually inserted into respective other vertical tubes of the carrier board, whereby the wire harness 22 is supported with wire groups hanging inside the tubes. The loaded wire carrier is then coupled to the carrier tooling 28, for example, by clamps (step 104). Thereafter, the robot controller 14a controls the first robotic arm 16 to move the wire carrier 29 toward the form board 2 (step 106) to a location where the routing end effector 30 is able to access the wire harness 22 using wire gripper 72.

Before or after the wire carrier 29 arrives at the target location, the robot controller 14b activates the linear actuator to open the wire gripper 72 (step 108). In accordance with one proposed implementation, opening the wire gripper comprises extending a linearly displaceable member of a linear actuator to an open position. The robot controller 14b then controls the second robotic arm 18 (while the wire gripper 72 is open) to move the routing end effector 30 so that respective first portions of all wires of the wire harness 22 are accessible for gripping by the wire gripper 72 (step 110). As used herein, the term "accessible for gripping" means that the stationary wire portions to be gripped are disposed between stop block 27 and hook 67 as a result of routing end effector movements. The robot controller 14b then controls the wire gripper 72 to grip first portions of all wires 1 of the wire harness 22 (step 112). In accordance with one proposed implementation, controlling the wire gripper 72 to grip comprises retracting the linearly displaceable member of the linear actuator toward a closed position. While the wire gripper 72 is gripping the wires 1, the robot controller 14b controls the second robotic arm 18 to move the routing end effector 30 to place second portions of the wires 1 in the first wire routing device 12a (step 114). (The second portions of the wires are disposed between the wire end connector 22 and the respective first portions of the wires, as best seen in FIG. 9.)

The wire gripper 72 is then opened to release the first portions of the wires 1 of the wire harness 22 (step 116).

Following step 116, the wire end connector 22 is hanging from the first wire routing device 12*a*, while the further portions of wires 1 of the first and second wire groups 24*a* and 24*b* are still being carried by the wire carrier 29. Then the second robotic arm is controlled to move the wire gripper 72 away from the first wire routing device 12*a* and toward the wire carrier 29. In particular, while the wire gripper 72 is in an open state, the robot controller 14*b* controls the second robotic arm 18 to move the routing end effector 30 so that respective third portions of the wires 1 of first wire group 24*a* are accessible for gripping by the wire gripper 72 (step 118). But instead of gripping the wires, the wire gripper 72 is reconfigured to adopt a containment state. As used herein, the term "containment state" means that the opening in the wire gripper 72 is closed to block escape of (i.e., to contain) the portions of wires 1 which pass through the wire gripper 72 at any given moment in time. In the example being described in this flowchart, the wire gripper 72 is controlled to contain third portions of the wires of first wire group 24*a* in step 120. More specifically, movement of the third portions of the wires 1 is contained by the curved external edges of cradle 15 and by the curved inner surface of hook 27.

In accordance with one proposed implementation, the linear actuator is a pneumatic actuator 74 and the linearly displaceable member is a piston rod. In this case, controlling the wire gripper 72 to contain wires comprises moving the piston rod to an intermediate (containment) position disposed between the open and closed positions. This is accomplished by retracting the piston rod to the closed position and then pulsing air pressure and flow duration to extend the piston rod to the intermediate position.

Referring now to FIG. 12B, the description of method 100 is continued. After the third portions of first wire group 24*a* have been contained, the robot controller 14*b* controls the second robotic arm 18 to move the routing end effector 30 to position fourth portions of the wires 1 of first wire group 24*a* over a second wire routing device 12*b* (step 122). Next the wire gripper 72 is controlled to grip fifth portions of the wires of first wire group 24*a* (step 124) while the fourth portions overlie the second wire routing device 12*b*. Then the robot controller 14*b* controls the second robotic arm 18 (e.g., moves wire gripper 72 toward the form board 2) to place the fourth portions of the wires 1 of the first wire group 24*a* in the second wire routing device 12*b* (step 126).

The wire gripper 72 is then opened to release the fifth portions of the wires 1 of the first wire group 24*a* (step 128). In addition, the second robotic arm 18 is controlled to move the wire gripper 72 away from the second wire routing device 12*b* and toward the wire carrier 29. More specifically, while the wire gripper 72 is in an open state, the robot controller 14*b* controls the second robotic arm 18 to move the routing end effector 30 so that respective third portions of the wires 1 of second wire group 24*b* are accessible for gripping by the wire gripper 72 (step 130). The wire gripper 72 is controlled to contain the third portions of the wires 1 of second wire group 24*b* (step 132) by moving the linearly displaceable member to the intermediate position.

After the third portions of second wire group 24*b* have been contained, the robot controller 14*b* controls the second robotic arm 18 to move the routing end effector 30 to position fourth portions of the wires 1 of second wire group 24*b* over a third wire routing device 12*c* (step 134). Next the wire gripper 29 is controlled to grip fifth portions of the wires of second wire group 24*b* (step 136). Then the robot controller 14*b* controls the second robotic arm 18 to place the fourth portions of the wires 1 of second wire group 24*b* in the third wire routing device 12*c* (step 138) (e.g., by moving wire gripper 72 toward form board 2).

Optionally, step 134 comprises moving the routing end effector 30 to position sixth portions of the wires 1 of second wire group 24*b* into contact with a post 52 (see FIG. 7) of a fourth wire routing device attached to the form board 2, at which post 52 the second wire group 24*b* changes direction. More specifically, the wire gripper 72 guides the second wire group 24*b* to pass around the post 52 and then extend to the third wire routing device 12*c*. In this case, upon completion of step 138, a length of the second wire group 24*b* extends from the first wire routing device 12*a* toward post 52, turns at post 52, and then extends from post 52 to a position overlying the third wiring routing device 12*c*.

Figure 13:
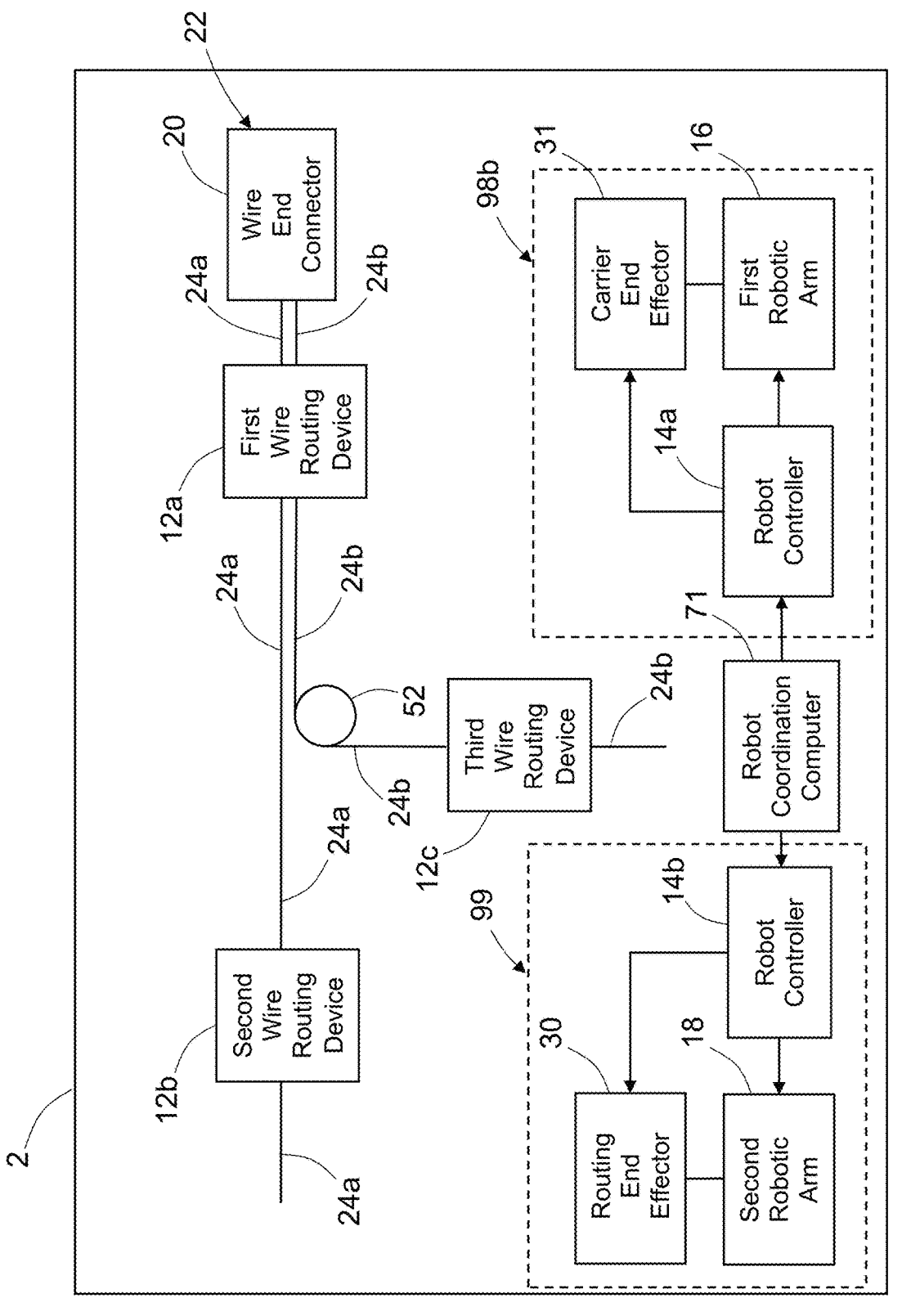
FIG. 13 is a block diagram which identifies components of a robotic system designed for routing wires of a wire harness along paths on a form board in accordance with an embodiment that includes a routing end effector mounted to the end of one robotic arm and a wire-carrying end effector mounted to the end of another robotic arm.

FIG. 13 is a block diagram which identifies components of a computerized system designed for routing wires of a wire harness 22 along paths on a form board 2 in accordance with an alternative embodiment. FIG. 13 depicts a simple wire harness 22 comprising a wire end connector 20, a first wire group 24*a*, and a second wire group 24*b*. The computerized system depicted in FIG. 13 includes a wire-routing robotic system 99 that is the same as the wire-routing robotic system previously described with reference to FIG. 7, but includes a wire harness-carrying robotic system 98*b* which differs from the wire harness-carrying robotic system 98*a* depicted in FIG. 7. The wire harness-carrying robotic system 98*b* includes a carrier end effector 31 which is mounted to the end of the first robotic arm 16 and a robot controller 14*a*. The movements of the first robotic arm 16 are controlled by robot controller 14*a*.

The carrier end effector 31 supports a wire harness at points near to the wire end connector, with the wire end connector 30 and associated groups of wires depending from the points of support. More specifically, the carrier end effector 31 comprises mechanisms for wire end connector staging and mechanisms for wire group release. The mechanisms for wire end connector staging grip all the wires of a wire harness at two points in proximity to the wire end connector 30. The mechanisms for wire group release include a wire group containment device that releases one wire group at a time. The carrier end effector 31 will be described in more detail later with reference to FIGS. 15-18.

The routing end effector 30 interfaces with the carrier end effector 31 to pick up wire groups in a predetermined order. The movements of the first robotic arm 16 and the operations of the carrier end effector 31 are controlled by robot controller 14*a*. The movements of the second robotic arm 18 and the operations of the routing end effector 30 are controlled by robot controller 14*b*. The control signals output by the robot controllers 14*a* and 14*b* are coordinated by the robot coordination computer 71.

Figure 14:
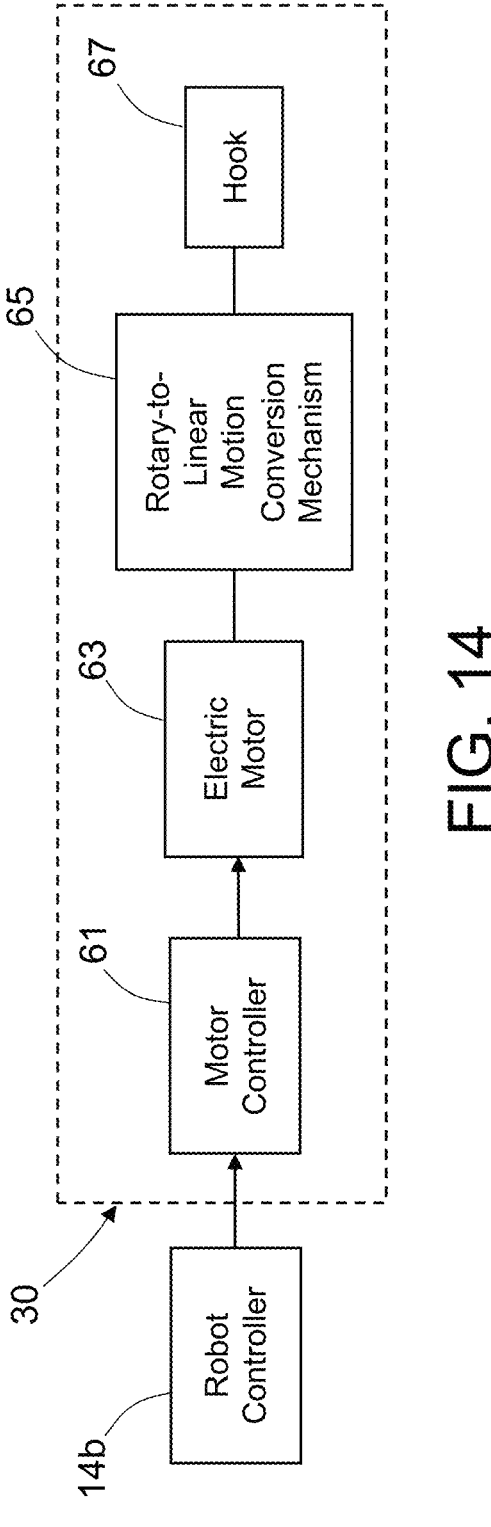
FIG. 14 is a block diagram which identifies components of a robotic apparatus comprising a routing end effector controlled by a robot controller, wherein the routing end effector comprises a linear actuator that converts rotary motion of an electric motor into linear displacement of a hook.

FIG. 14 is a block diagram which identifies components of a robotic apparatus comprising a routing end effector 30 controlled by a robot controller 14*b*, wherein the routing end effector 30 comprises an electric linear actuator instead of a pneumatic linear actuator. In accordance with one proposed implementation, the electric linear actuator comprises a mechanism 65 (e.g., a rack and pinion mechanism or a lead screw and nut mechanism) that converts rotary motion of an electric motor 63 into linear displacement of a hook 67. The electric motor 63 is controlled by a motor controller 61, which in turn receives control signals from the robot controller 14*b*.

For the purpose of illustration, various end effectors of a robotic system for routing groups of wires of a pre-assembled wire harness on a form board will now be described in detail with reference to the drawings. One example of a carrier end effector will be described with reference to FIGS. 15-18 and 19A-19D. In addition, two examples of a routing end effector will be described. The first routing end effector (comprising a wire gripper having a single pneumatic actuator for driving linear displacement of a hook) will be described with reference to FIGS. 20, 21, and 22A-22C. The second routing end effector (comprising a wire gripper having a two pneumatic actuators coupled in series for driving linear displacement of a hook) will be described with reference to FIGS. 23, 24, and 25A-25C.

Figure 15:
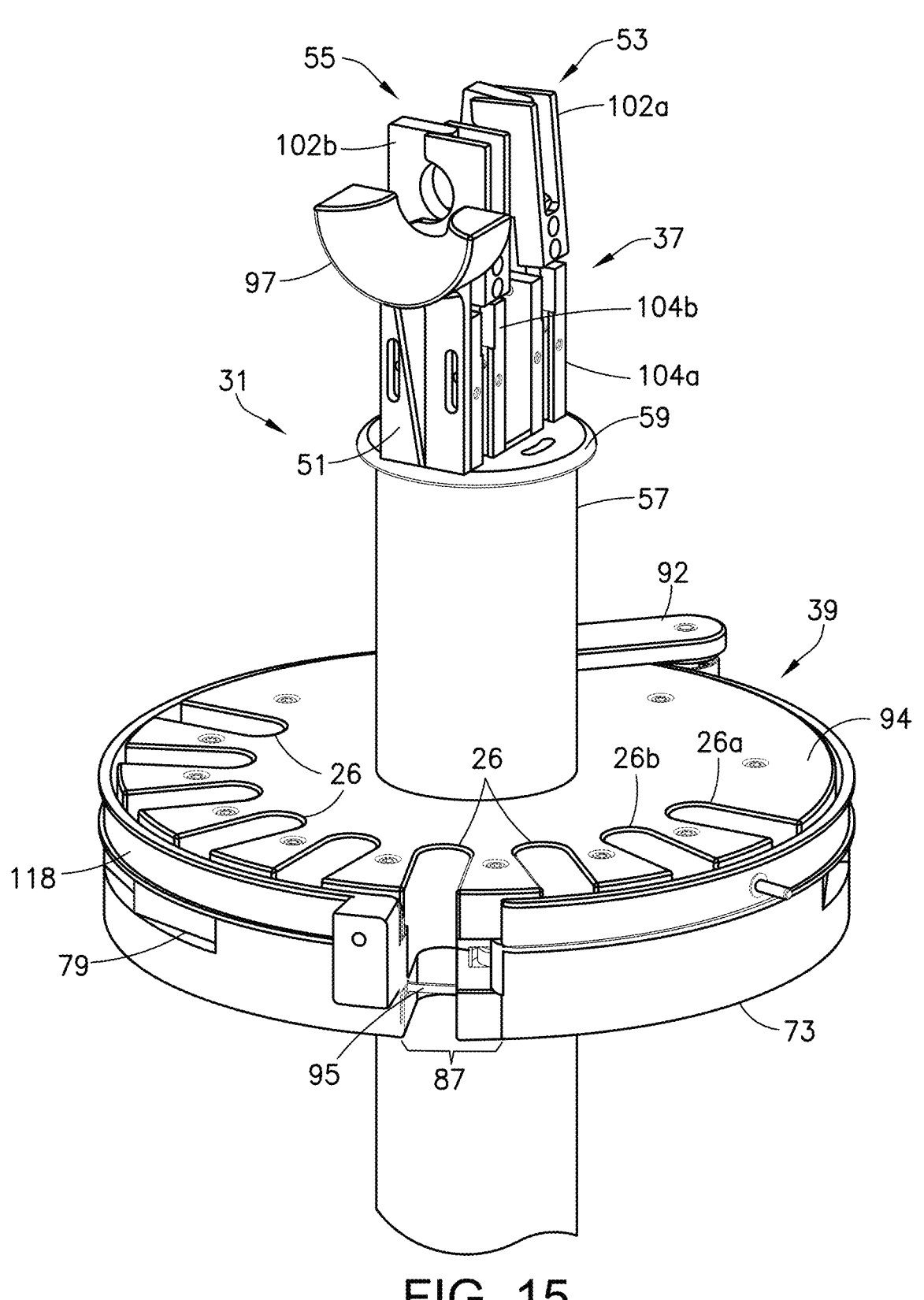
FIG. 15 is a diagram representing a view (from a relatively high vantage point) of a carrier end effector in an unloaded state.
Figure 16:
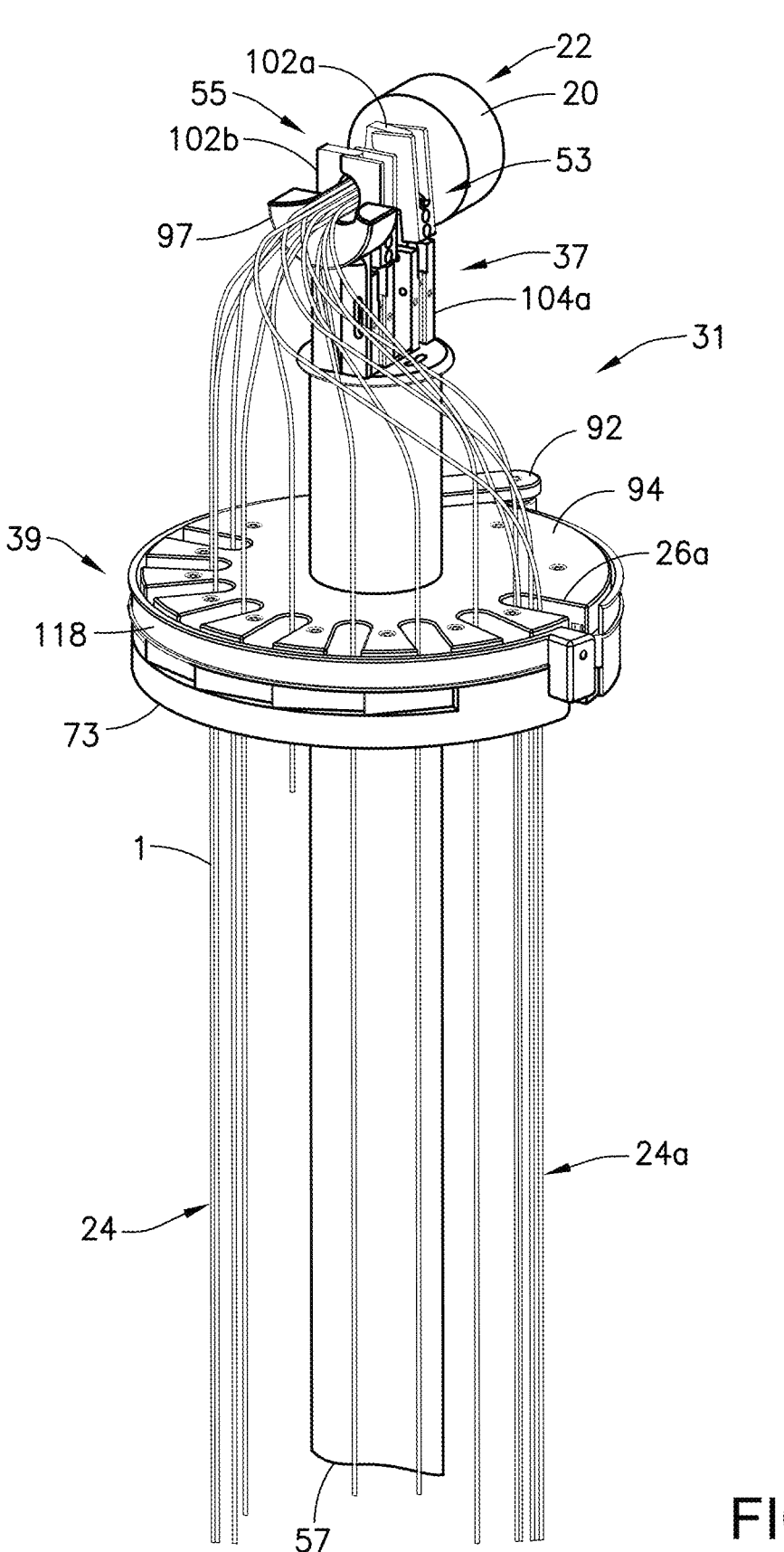
FIG. 16 is a diagram representing a view of the carrier end effector depicted in FIG. 15 after the carrier end effector has been loaded with a wire harness.

FIG. 15 is a diagram depicting a carrier end effector 31 in an unloaded (not supporting a wire harness) state. FIG. 16 is a diagram representing a view of the carrier end effector 31 depicted in FIG. 15 after the carrier end effector 31 has been loaded with a wire harness 22 comprising a wire end connector 20 and a multiplicity of wire groups 24 having wires whose ends are inserted in the wire end connector 20.

As seen in FIG. 15, the carrier end effector 31 includes a wire end connector staging device 37 and a wire group containment device 39. The wire end connector staging device 37 comprises a pair of pneumatic grippers, referred to herein as first pneumatic gripper 53 and second pneumatic gripper 55. These grippers are mounted to a platform 59 that sits on the top of a shaft 57. The bottom end of shaft 57 is rotatably coupled to the distal end of a robotic arm (not shown in FIG. 15). Shaft 57 is rotatable about its axis. The wire group containment device 39 comprises a lane housing 94 that is clamped to an intermediate portion of shaft 57 and further comprises a containment fence 73 that is pivotable relative to the lane housing 94 about the shaft axis.

Referring to FIG. 15, the first pneumatic gripper 53 comprises a first pneumatic actuator 104*a* mounted to platform 59 and a first pair of wire gripper fingers 102*a* which are coupled to the first pneumatic actuator 104*a*. The state (i.e., open or closed) of the wire gripper formed by the first pair of wire gripper fingers 102*a* is dependent on whether the first pneumatic actuator 104*a* is in an extended state or a retracted state. Similarly, the second pneumatic gripper 55 comprises a second pneumatic actuator 104*b* mounted to platform 59 and a second pair of wire gripper fingers 102*b* which are coupled to the second pneumatic actuator 104*b*. The state of the wire gripper formed by the second pair of wire gripper fingers 102*b* is dependent on whether the second pneumatic actuator 104*b* is extended or retracted. More specifically, the wire gripper opens when a piston rod (not visible in FIG. 15) of the pneumatic actuator is extended and closes when the piston rod is retracted.

A wire harness 22 may be manually loaded onto the carrier end effector 31 by a human operator. Initially the first and second pneumatic grippers 53 and 55 are open. The human operator arranges the wire harness 22 so that the wire end connector 20 is in the position seen in FIG. 16 and at the same time the proximal segments of the wires 1 of wire harness 22 are placed into the open pairs of wire gripper fingers 102*a* and 102*b*. Then the pneumatic actuators 104*a* and 104*b* are retracted to close the wire gripper fingers 102*a* and 102*b*, thereby gripping the intervening portions of the wires 1 of all wire groups of the wire harness 22. The wire gripper fingers grip the wires 1 at respective loci near the wire end connector 20. The wire end connector staging device 37 does not contact the wire end connector 20, but rather the wire end connector 20 hangs from the first pneumatic gripper 53, as seen in FIG. 16.

Referring to FIG. 16, the pneumatic grippers 53 and 55 grip the wires 1 just before the face of the wire end connector 20. More specifically, the first pair of wire gripper fingers 102*a* grip respective first portions of the wires 1 of wire harness 22; the second pair of wire gripper fingers 102*b* grip respective second portions of the wires 1. The first portions of the wires 1 are respectively disposed between wire end connector 22 and the second portions of wires 1. During a subsequent automated wire routing process, a wire gripper of a routing end effector will grip third portions of the wires 1 which are between the first and second portions of wires 1 and then the pneumatic actuators 104*a* and 104*b* are extended to open the pairs of wire gripper fingers 102*a* and 102*b*, thereby releasing the first and second portions of the wires 1 of all wire groups 24 of the wire harness 22 so that the wire end connector 20 can be carried by the routing end effector toward a wire routing device on a form board. The gripping operation of the routing end effector and subsequent release of the wire harness 22 by the pneumatic grippers 53 and 55 are coordinated under the control of the robot coordination computer 71 identified in FIG. 13.

Referring again to FIG. 15, the wire end connector staging device 37 further comprises a saddle 97 which is supported at a height above the platform 59 by a stanchion 51. More specifically, the lower end of stanchion 59 is attached (e.g., fastened) to the platform 59, while the saddle 97 is attached to the upper end of stanchion 51. The saddle 97 has a concave curved contoured surface which is disposed at an elevation below the elevation of the wire portions being gripped by the second pair of wire gripper fingers 102*b*. The contoured surface of saddle 97 supports contacting portions of the wires 1 when the portions of the wires exiting the second pneumatic gripper 55 are draped over the saddle 97. The remainders of the wires 1 hang from the saddle 97 under the influence of gravity.

The wire group containment device 39 is designed to keep the hanging portions of the wires 1 of wire groups 24 properly separated, but also is designed to protect the wires 1 and associated wire end connector 20 as the wire harness 22 is moved throughout the production process. Referring to FIG. 15, the wire group containment device 39 comprises a lane housing 94 which is mounted to shaft 57 and a containment fence 73 which circumscribes the lane housing except at a slot 87 in containment fence 73. The lane housing 94 is mounted to an intermediate portion of the shaft 57 by means of a shaft clamp 63 (shown in FIG. 18).

The lane housing 94 has a multiplicity of lanes 26 which terminate to form openings on the outer periphery of lane housing 94 (hereinafter "circumferential openings"). In accordance with one proposed implementation, the lane housing 94 has a multiplicity of lanes 26 which start at the outer periphery of lane housing 94 and extend radially inward (e.g., at equiangular intervals). Two of the lanes 24 depicted in FIG. 15 are identified by reference numerals 26*a* and 26*b* respectively to provide support for the terms "first lane" and "second lane" recited in the claims.

The containment fence 73 is slidably coupled to the outer periphery of lane housing 94 in a configuration that enables pivoting of containment fence 73 about the shaft axis while the lane housing 94 remains affixed to shaft 57. The containment fence 73 is pivotable about the axis of shaft 57 in one direction through a predetermined angle when the containment fence 73 is not latched to prevent pivoting. In accordance with one proposed implementation, the wire group containment device 39 is configured such that containment fence 73 is pivotable relative to lane housing 94 through incremental angles totaling no more than 180 degrees, which is reflected by the fact that the circumferential openings of lanes 26 are arranged along an arc that is no more than 180 degrees.

After the wires 1 have been draped over the saddle 97, the human operator manually places the remainder of each wire group 24 in a respective lane 26 of lane housing 94. The wire groups 24 are arranged in the order in which they are to be routed on the form board. Each wire group 24 may be separated and then contained in a respective closed lane 26 as depicted in FIG. 16. To avoid clutter in the drawing, FIG. 16 depicts a wire harness 22 in which only one of the wire groups 24 includes more than one wire. However, it should be appreciated that each lane 26 of lane housing 94 may contain a respective wire group 24 consisting of two or more wires.

The containment fence 73 is not a closed ring, but rather has a slot 87. The circumferential openings of the lanes 26 are closed by the containment fence 73 except when the containment fence 73 is pivoted to an angular position whereat the slot 87 is aligned with one of the lanes 26, thereby opening that lane to enable release of the wire group contained therein. During transport of the carrier end effector 31, the circumferential openings of the lane housing 94 are maintained in a closed state by the containment fence 73. Later, after a selected wire group has been gripped or captured and then transported by the wire gripper of the routing end effector, the closed end of the lane 26 containing the selected wire group 24 is opened by rotating the containment fence 73 to align slot 87 with the circumferential opening of the lane 26, thereby releasing the selected wire group 24 for routing on the form board. The gripping and capturing operations of the routing end effector and the releases of successive wire groups 24 in order by sequential pivoting advancement of the containment fence 73 are coordinated under the control of the robot coordination computer 71 identified in FIG. 13.

In accordance with one embodiment, the carrier end effector 31 further comprises a ratchet and pawl mechanism that allows only incremental advancement of the pivoting containment fence 73. Pivoting of containment fence 73 is driven by a constant force spring 118 seen in FIGS. 15 and 16. One end of the constant force spring 118 is affixed to the containment fence 73; the other end of the constant force spring 118 is affixed to a portion of the pawl mechanism which in turn is affixed to the lane housing 94. The constant force spring 118 urges the containment fence 73 to pivot in one direction relative to lane housing 94, but such pivoting occurs only when the containment fence 73 is not latched in place by the ratchet and pawl mechanism.

Figure 17:
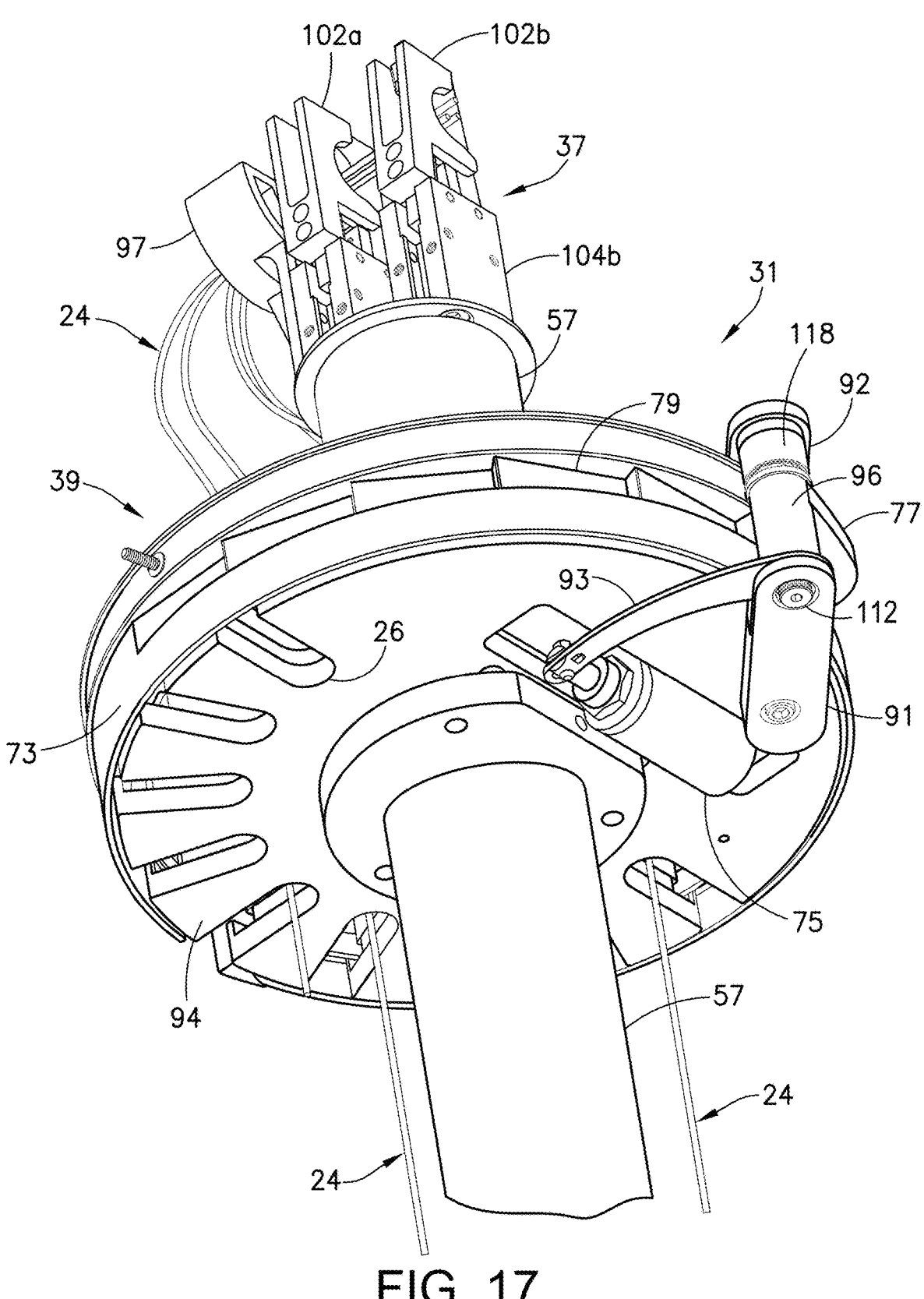
FIG. 17 is a diagram representing a view (from a relatively low vantage point) of the loaded carrier end effector depicted in FIG. 16 after the carrier end effector has been loaded with a wire harness.

FIG. 17 is a diagram representing a view of the loaded carrier end effector depicted in FIG. 16, but from a different vantage point. More components of the ratchet and pawl mechanism are visible in FIG. 17 than are visible in FIGS. 15 and 16. The ratchet comprises a multiplicity of ratchet steps 79 which are incorporated in the containment fence 73. The pawl mechanism comprises a release pawl 77 in the form of a pivotable tongue having a tip that latches in a ratchet step 79 to prevent further pivoting of containment fence 73 after each incremental advance. The pawl mechanism further comprises a lever 93 and a plain bearing 96 which connects lever 93 to release pawl 77. For example, one end of plain bearing 96 may be integrally formed with one end of lever 93 and the other end of plain bearing 96 may be integrally formed with one end of release pawl 77. The pawl mechanism is mounted to the lane housing 94 by means of a lower beam 91 and an upper beam 92. First ends of the beams are coupled to each other by means of a bolt 112 and a nut. The plain bearing 96 surrounds and is rotatably coupled to bolt 112. Second ends of lower beam 91 and upper beam 92 are respectively coupled to upper and lower components of the lane housing 94 (namely, outer upper lane housing 94*a* and outer lower lane housing 94*d* seen in FIG. 18). One end of the constant force spring 118 is wound on a spool which is rotatably coupled to bolt 112 by a ball bearing assembly (the spool and bearing assembly are not shown in the drawings).

The pawl mechanism further comprises a solenoid 75. The other end of lever 93 has a slot which is coupled to the distal end of a plunger of solenoid 75. The solenoid 75 is mounted under the lane housing 94, as seen in FIG. 17. When the solenoid 75 is activated to retract the plunger, the lever 93 and release pawl 77 pivot in tandem. The release pawl 77 is pivoted out of the ratchet step 79 in which the tip of release pawl 77 had been sitting, thereby unlatching the containment fence 73 and enabling the constant force spring 118 to pivot the containment fence one incremental angle. The magnitude of the incremental angle is dictated by the pitch of the ratchet steps 79.

Figure 18:
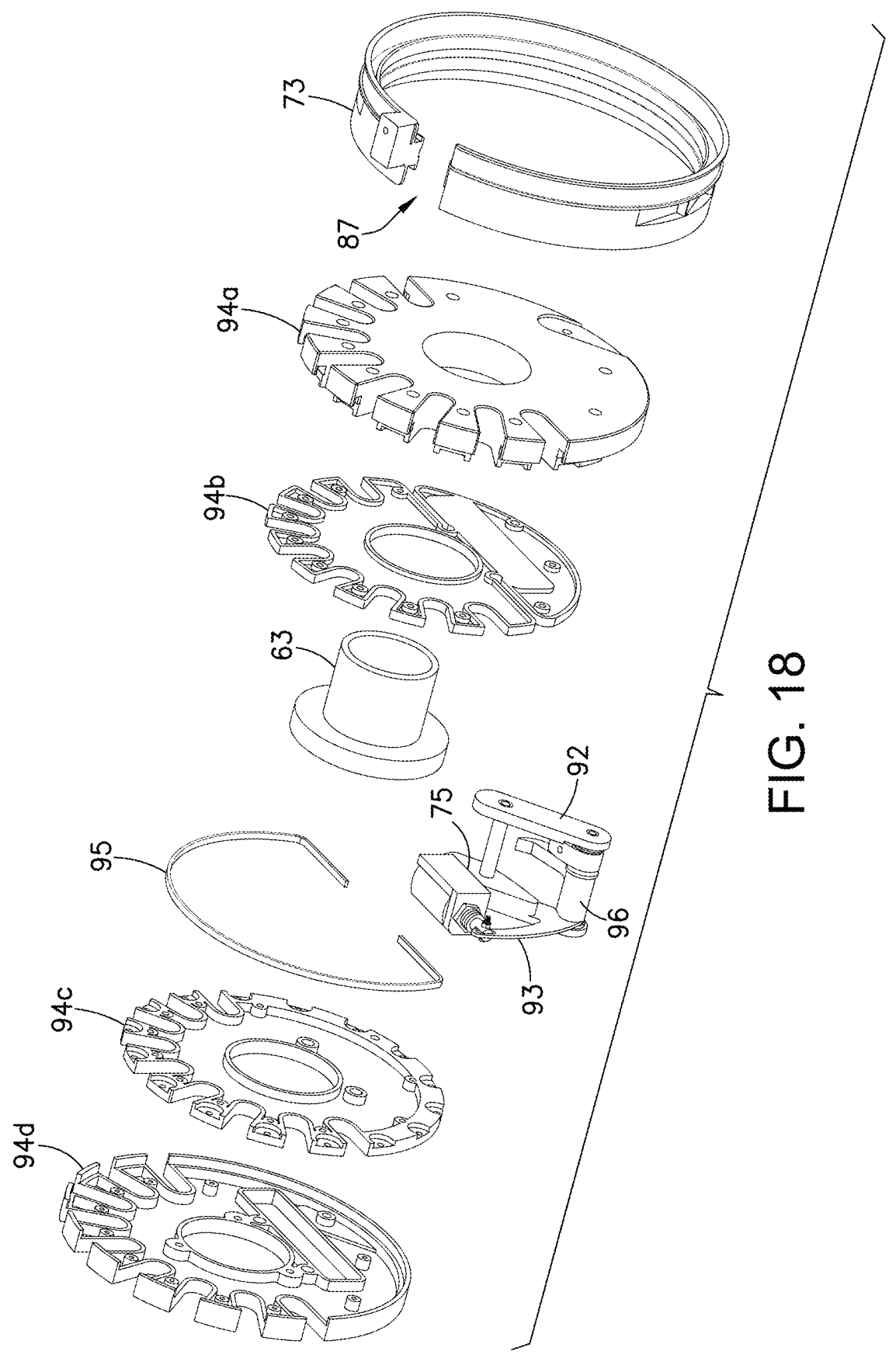
FIG. 18 is a diagram representing an exploded view of the components of the carrier end effector depicted in FIG. 15.

FIG. 18 is a diagram representing an exploded view of the components of the wire group containment device 39 depicted in FIG. 15. The lane housing 94 consists of four parts which are stacked together: outer upper lane housing 94*a*, inner upper lane housing 94*b*, inner lower lane housing 94*c*, and outer lower lane housing 94*d*. The lane housing 94 is surrounded by the containment fence 73 having a slot 87. The curved portion of the elastic band 95 is fitted between lane housing 94 and containment fence 73. The lane housing 94 is mounted to an intermediate portion of the shaft 57 by means of a shaft clamp 63. The pawl mechanism (comprising solenoid 75, pawl 77, lever 93, bearing 96, lower beam 91, and upper beam 92) is shown in an assembled state in the exploded view of FIG. 18.

Figure 29A:
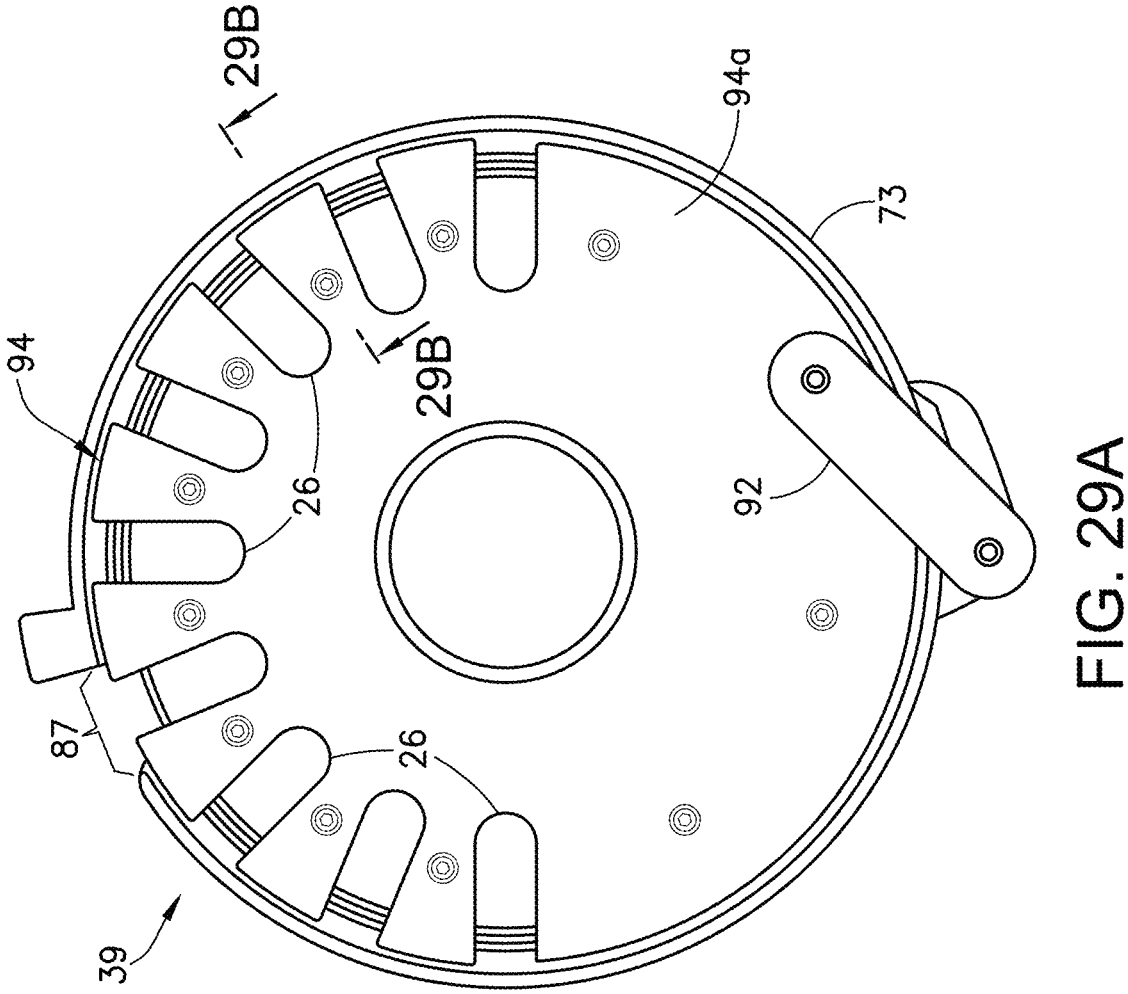
FIG. 29A is a top view of a wire group containment device in accordance with one proposed implementation.
Figure 29B:
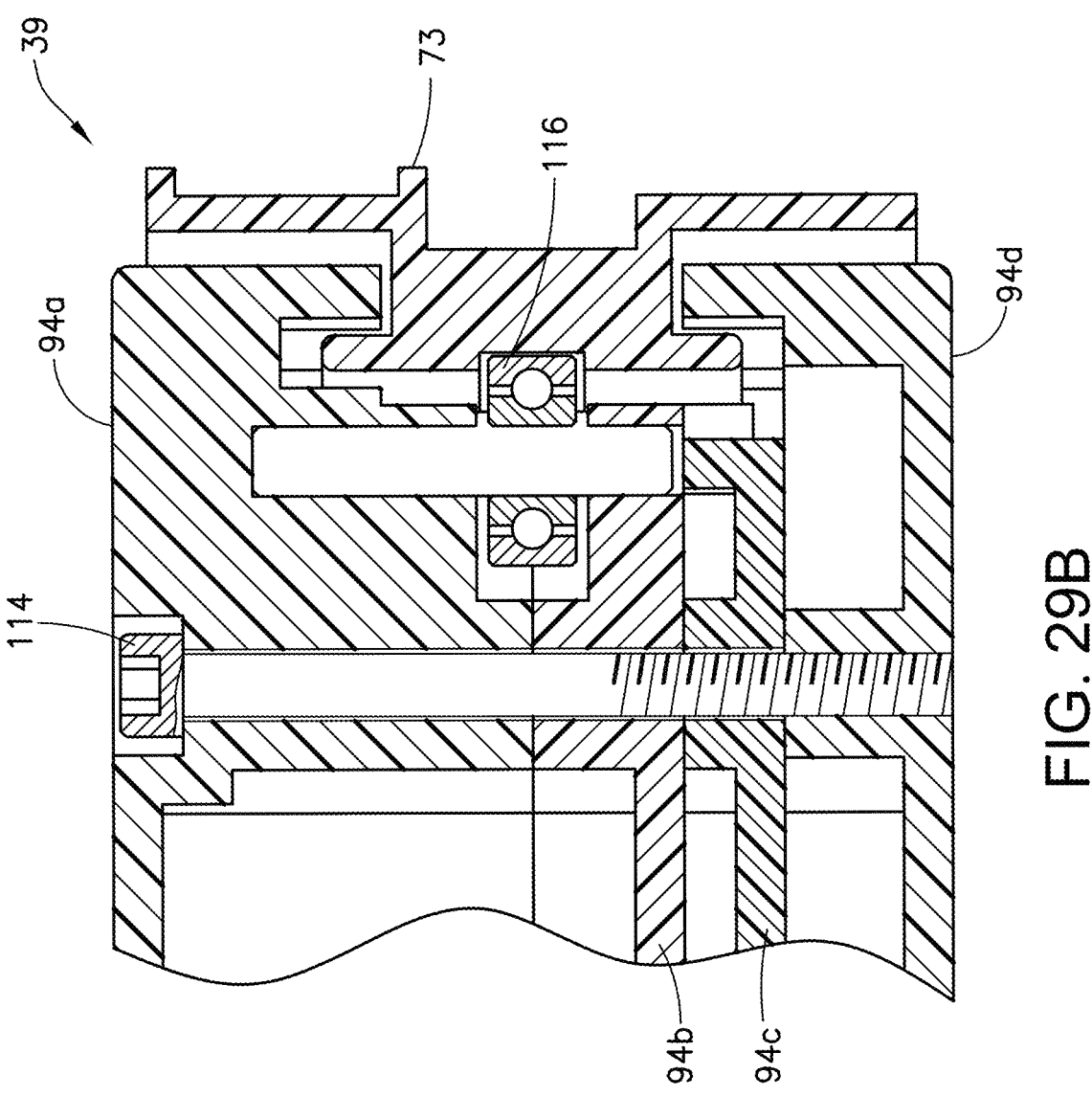
FIG. 29B is a sectional view of a portion of the wire group containment device depicted in FIG. 29A, the section being taken along section line 29B-29B indicated in FIG. 29A.

FIG. 29A is a top view of the assembled wire group containment device 39 showing the slot 87 aligned with a lane 26. FIG. 29B is a sectional view of a portion of the wire group containment device depicted in FIG. 29A. The lane housings 94*a*-94*d* are fastened to form the stack by means of a plurality of bolts 114, only one of which is shown in FIG. 29B. As seen in FIG. 29B, the containment fence 73 is pivotably coupled to lane housing 94 by means of a plurality of ball bearings 116, only one of which is shown in FIG. 29B.

Figure 19A:
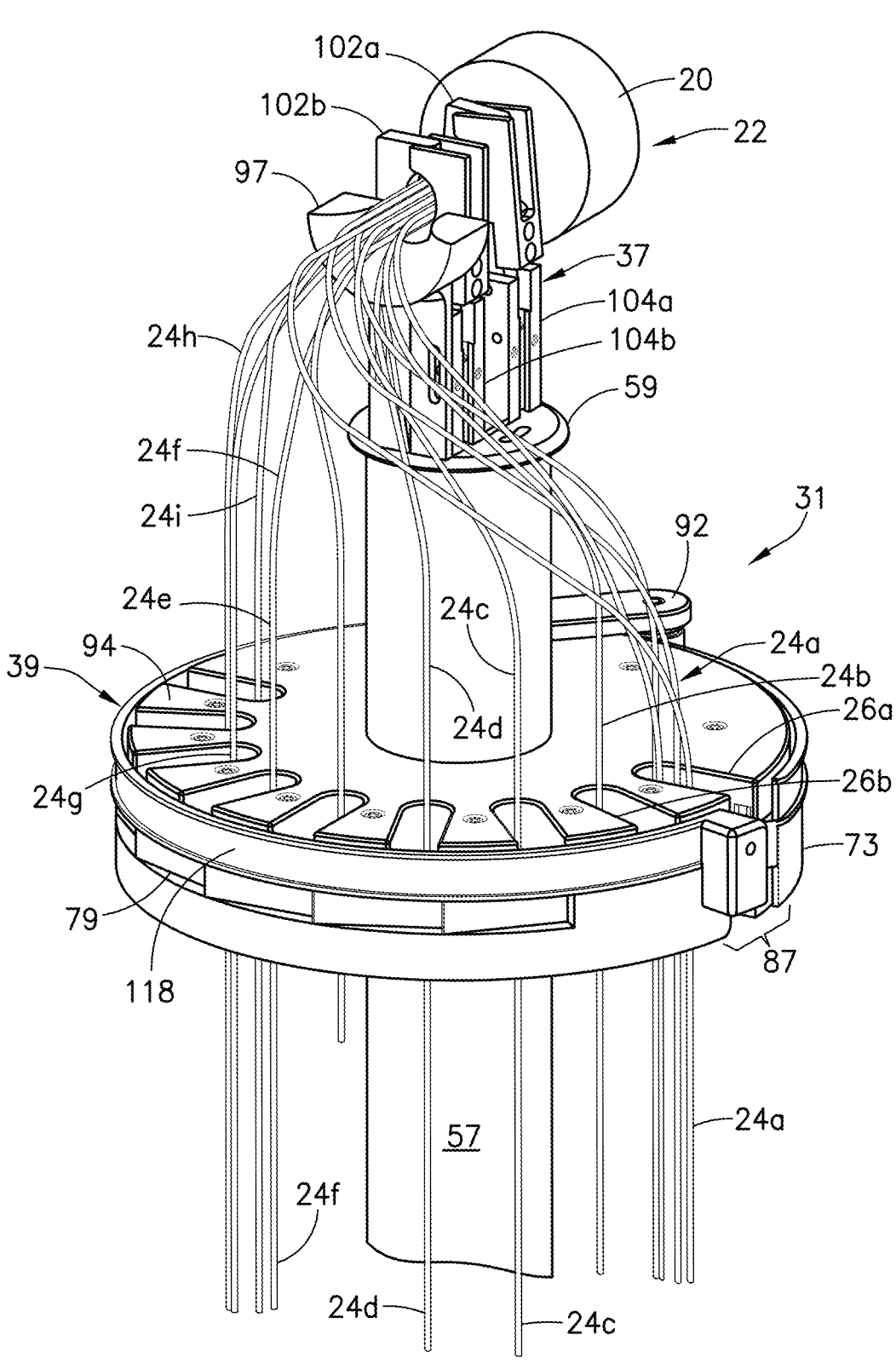
FIGS. 19A-19D are diagrams representing respective views of the carrier end effector depicted in FIG. 16 at four stages during sequential release of groups of wires from notches in a wire containment device of the carrier end effector.
Figure 19B:
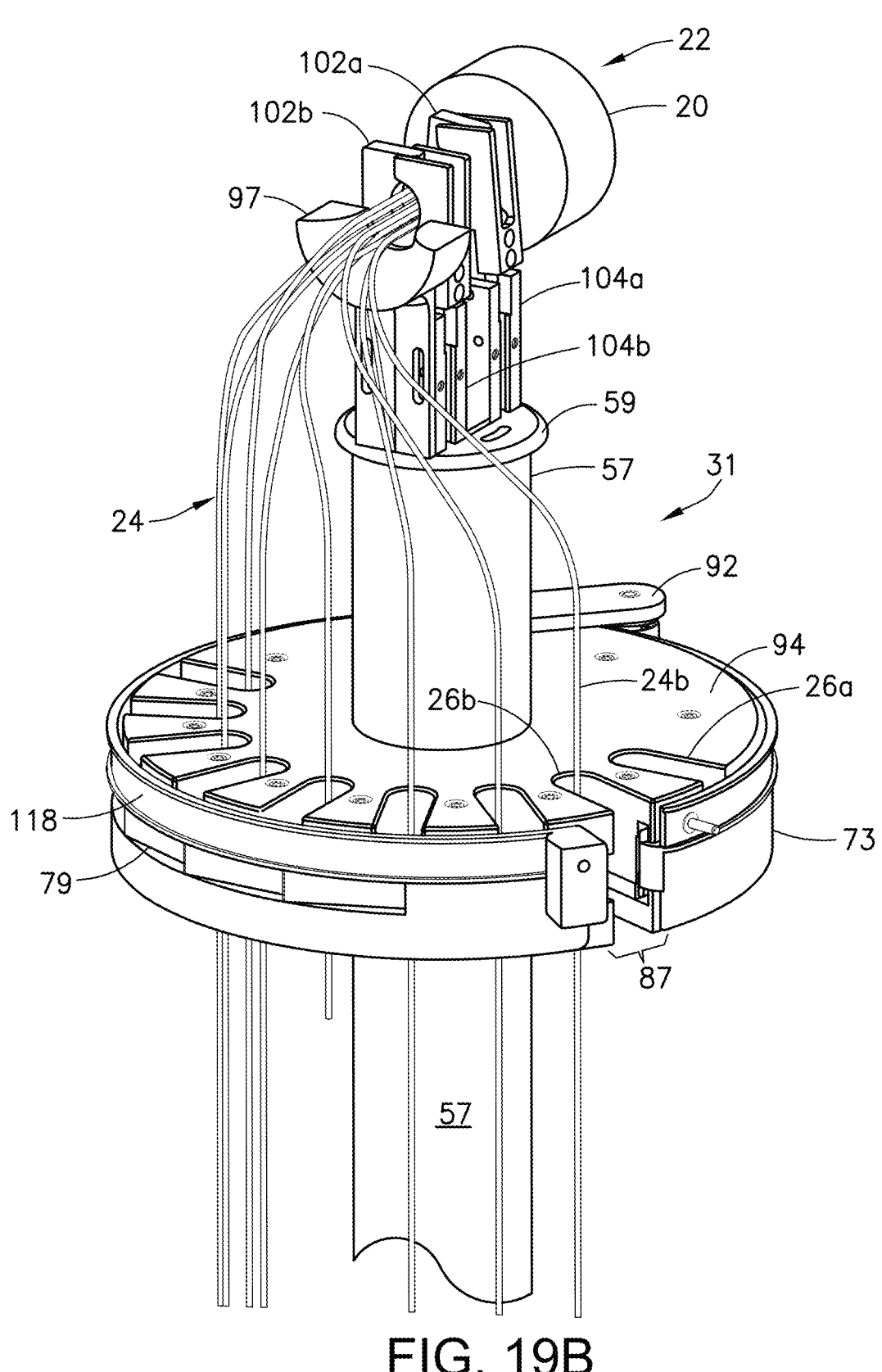
Figure 19C:
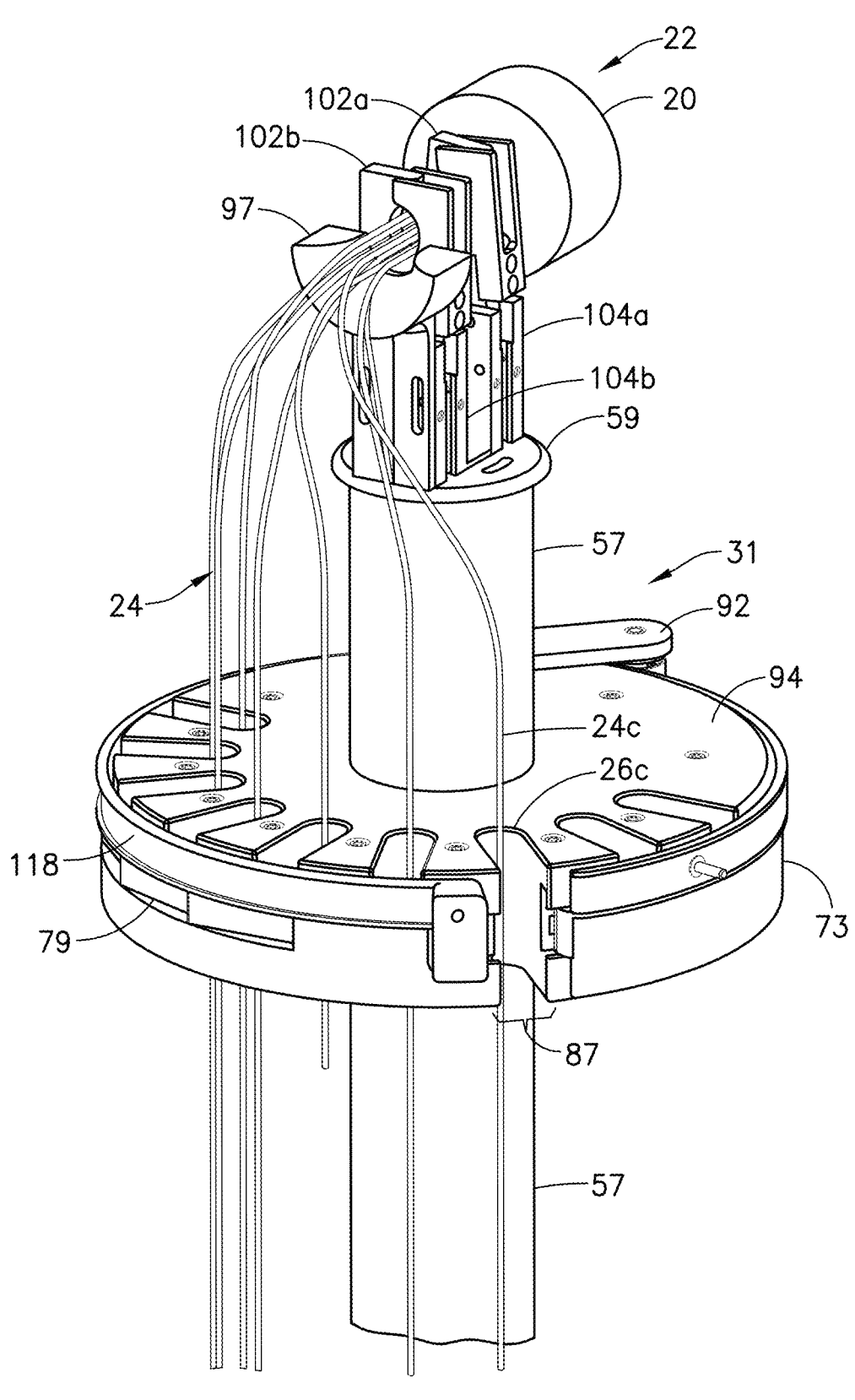
Figure 19D:
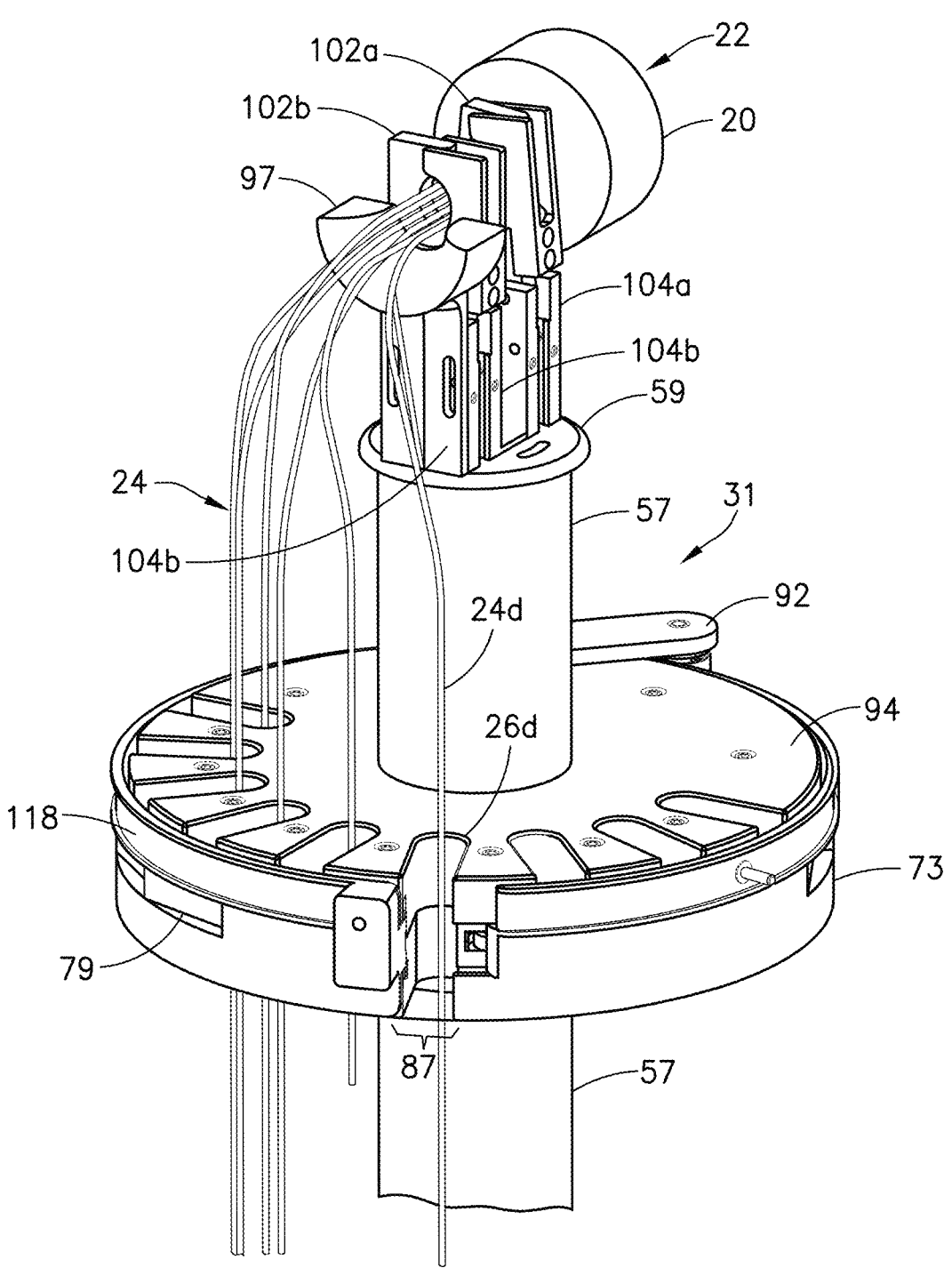

FIGS. 19A-19D are diagrams representing respective views of the carrier end effector 31 depicted in FIG. 16 at four stages during sequential release of wire groups 24 from lanes 26 in lane housing 94. As seen in FIG. 19A, the wire groups are respectively identified by reference numerals 24*a* through 24*i*, including first wire group 24*a* which is contained within a first lane 26*a* and second wire group 24*b* which is contained within a second lane 26*b*. The other lanes are not identified alphabetically in FIG. 19A to avoid clutter in the drawing. Also, FIGS. 19A-19D depict a wire harness 22 in which only one of the wire groups 24 includes more than one wire. However, it should be appreciated that each wire group 24 may consist of two or more wires.

In the scenario depicted in FIG. 19A, the slot 87 is aligned with the first lane 26*a* and the first wire group 24*a* is accessible for gripping by the wire gripper of a routing end effector. After the first wire group 24*a* has been removed from the first lane 26*a* by the routing end effector, the containment fence 73 is pivoted one increment to arrive at the state depicted in FIG. 19B. In the scenario depicted in FIG. 19B, slot 87 is aligned with the second lane 26*b* and the second wire group 24*b* contained in the second lane 26*b* is accessible for gripping by the wire gripper of the routing end effector. After the second wire group 24*b* has been removed from the second lane 26*b* by the routing end effector, the containment fence 73 is pivoted another increment to arrive at the state depicted in FIG. 19C. In the scenario depicted in FIG. 19C, slot 87 is aligned with a third lane 26c and a third wire group 24c contained in the third lane 26c is accessible for gripping by the wire gripper of the routing end effector. After the third wire group 24c has been removed from the third lane 26c by the routing end effector, the containment fence 73 is pivoted another increment to arrive at the state depicted in FIG. 19D. In the scenario depicted in FIG. 19D, slot 87 is aligned with a fourth lane 26d and a fourth wire group 24d contained in the fourth lane 26d is accessible for gripping by the wire gripper of the routing end effector.

Figure 20:
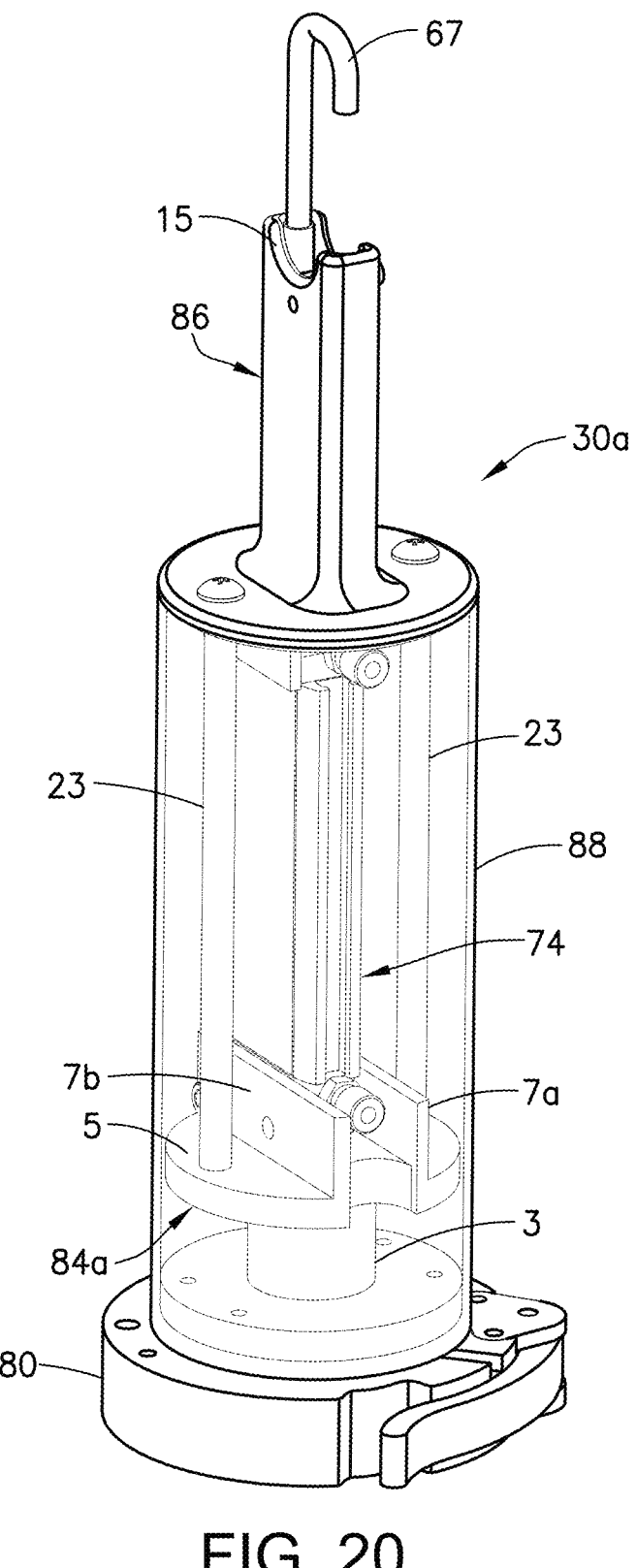
FIG. 20 is a diagram representing a view of a single-cylinder routing end effector in accordance with one embodiment.
Figure 21:
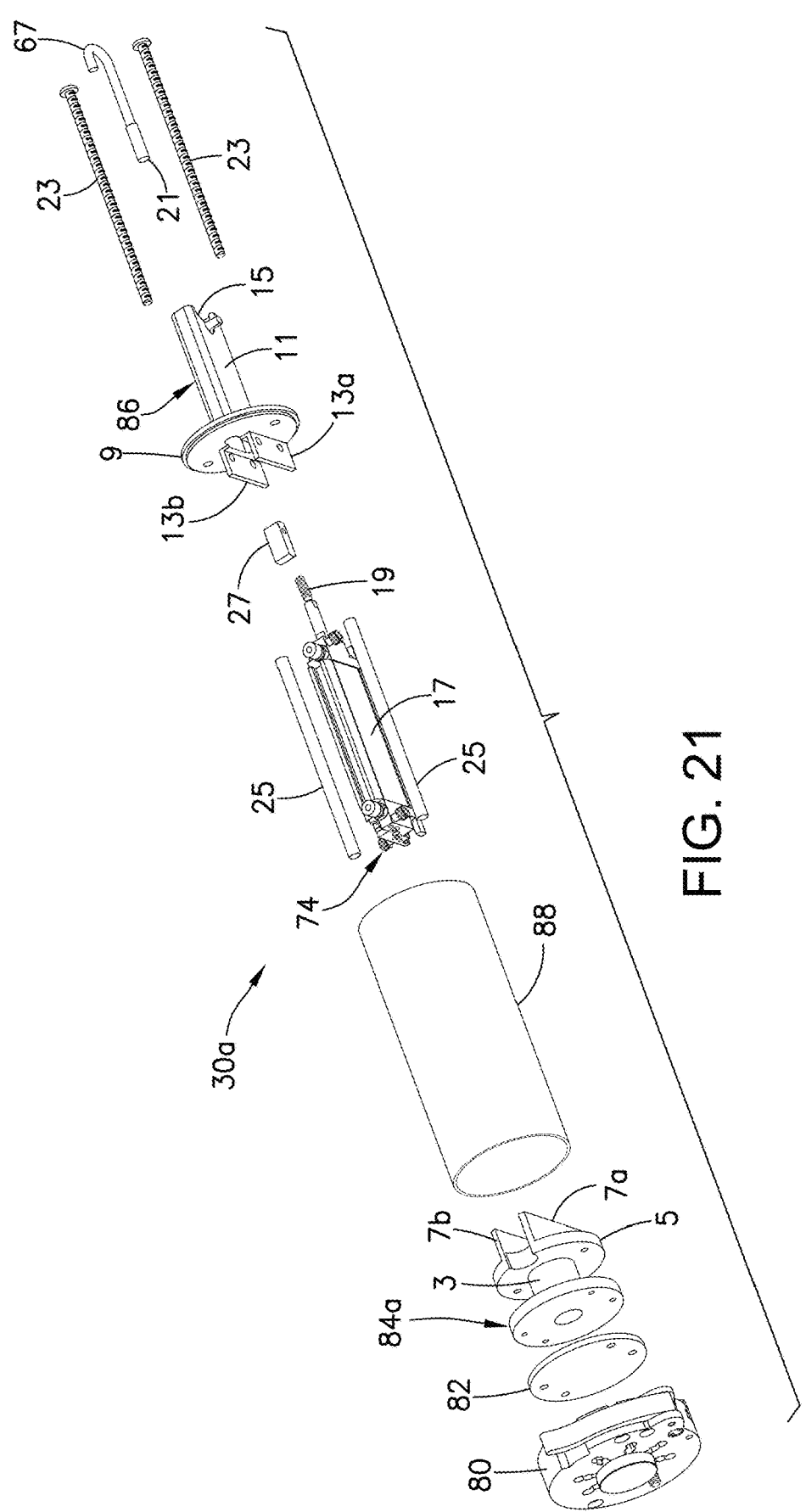
FIG. 21 is a diagram representing an exploded view of the components of the single-cylinder routing end effector depicted in FIG. 20.

FIGS. 20 and 21 respectively present three-dimensional and exploded views of the components of a single-cylinder routing end effector 30a (hereinafter "routing end effector 30a") in accordance with one embodiment. The routing end effector 30a includes a housing assembly that comprises an outer cover lower cap 82, an outer cover 88, and a hook housing 86. The hook housing 86 includes channel-defining walls 11, a circular disk 9 having an opening, and a pair of mutually parallel mounting flanges 13a/13b which project from a bottom of the circular disk 9. The channel-defining walls 11 and the mounting flanges 13a/13b may be integrally formed with the circular disk 9. The circular disk 9 functions as an outer cover upper cap. The outer cover 88 is held securely between the upper and lower caps by means of a pair of cover compression screws 23 housed inside respective screw spacers 25. The housing assembly of routing end effector 30a can be coupled to a rotatable distal end of a robotic arm by means of an end effector-to-arm quick-release mount 80.

Still referring to FIGS. 20 and 21, the routing end effector 30a further includes a pneumatic actuator 74 which is supported by an actuator lower mount 84a inside the housing assembly. More specifically, the lower end of pneumatic actuator 74 is fastened to mounting flanges 7a/7b which extend from a circular disk 5 of actuator lower mount 84a, while the upper end of pneumatic actuator 74 is fastened to mounting flanges 13a/13b which extend from circular disk 9 of hook housing 86. In an assembled state, the outer cover lower cap 82 is sandwiched between the end effector-to-arm quick-release mount 80 and a pedestal 3 of the actuator lower mount 84a.

The pneumatic actuator 74 comprises a cylinder 17, a piston inside the cylinder 17, and a screwed piston rod 19 which projects forward and out of the cylinder 17. The piston rod 19 is linearly displaceable from a retracted position to an extended position in response to the supply of compressed air to cylinder 17, which compressed air drives the piston and piston rod 19 forward.

Referring to FIG. 21, the hook housing 86 forms a distal end of the housing assembly. The channel-defining walls 11 of hook housing 86 include a pair of side walls having internal surfaces which partly define a channel and having a pair of concave curved external surfaces which define the cradle 15 at the distal edges of the side walls. A stop block 27 is affixed to one side wall and disposed within the channel defined by walls 11. The stop block 27 has a convex curved external surface disposed adjacent to the cradle 15. More specifically, a peak of the convex curved external surface of stop block 27 is level with respective troughs of the concave curved external surfaces which define the cradle 15, as seen in FIG. 22A.

Figure 22A:
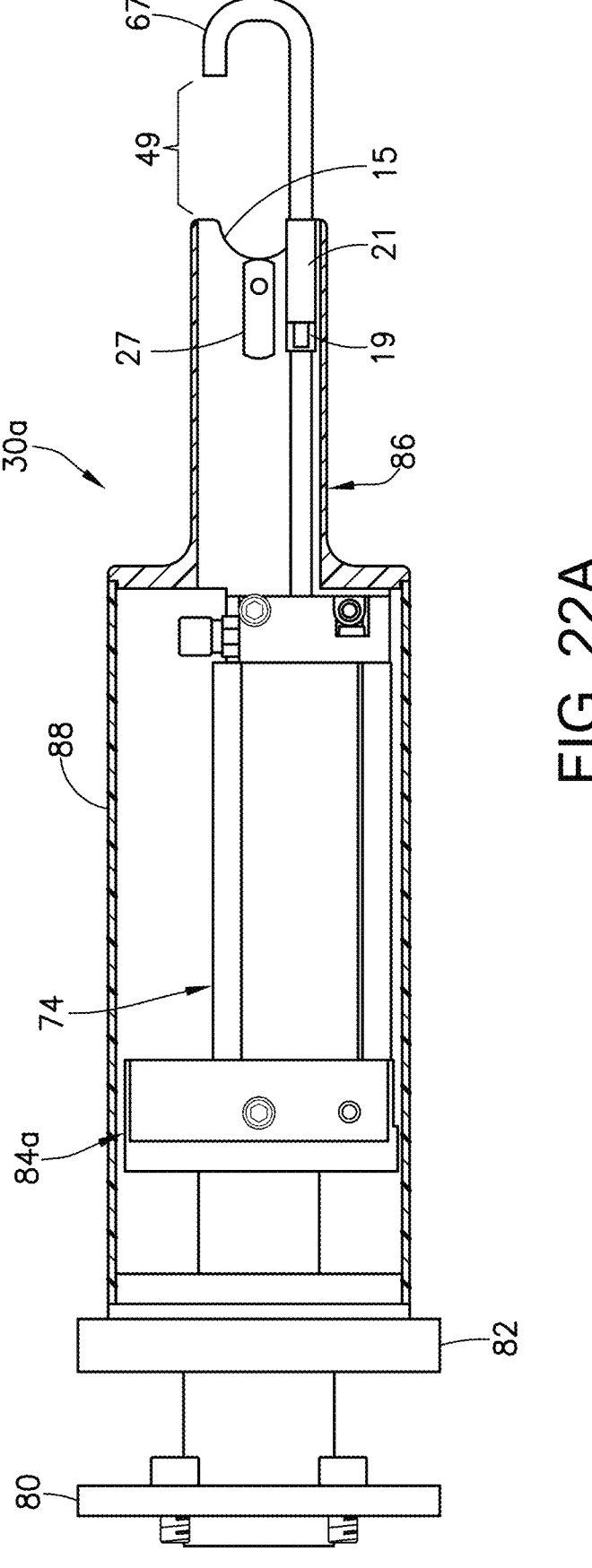
FIG. 22A is a diagram representing a partially sectioned view of the single-cylinder routing end effector in an open state.
Figures 22B, 22C:
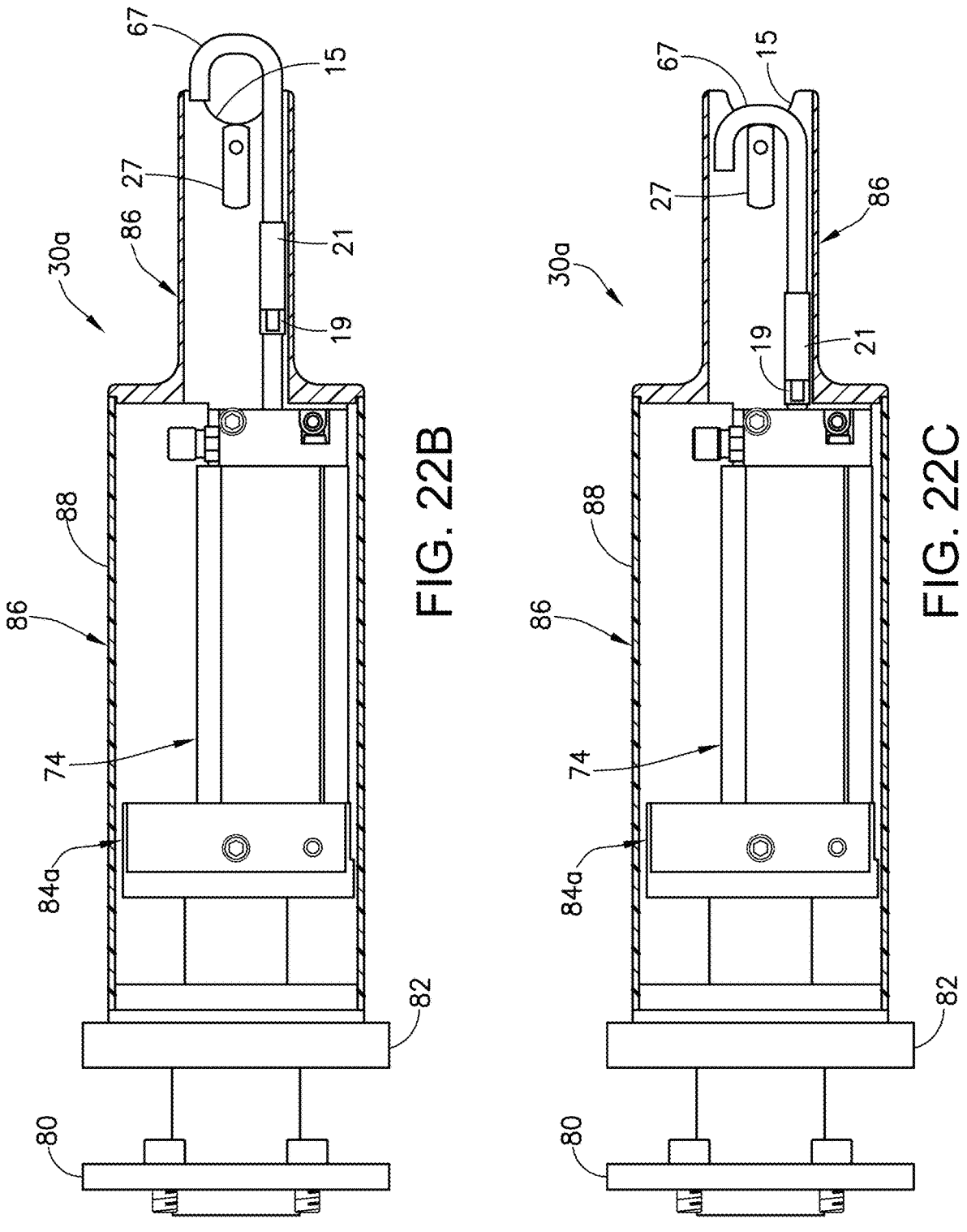
FIG. 22B is a diagram representing a partially sectioned view of the single-cylinder routing end effector in a containment state.
FIG. 22C is a diagram representing a partially sectioned view of the single-cylinder routing end effector in a closed state.

FIGS. 22A-22C are diagrams representing partially sectioned views of routing end effector 30a in an open state (FIG. 22A), in a containment state (FIG. 22B), and in a closed state (FIG. 22C). As seen in FIGS. 22A-22C, the routing end effector 30a further includes a hook 67 which is fixedly coupled to the screwed piston rod 19 of pneumatic actuator 74 by means of an extension rod 21. The hook 67 is linearly displaceable in tandem with screwed piston rod 19 in a range from an open position at which a curved section of the hook 67 projects forward of cradle 15 (as seen in FIG. 22A) to a closed position at which the curved section of the hook 67 does not project forward of cradle 15 (as seen in FIG. 22C). The stop block 27, cradle 15, and hook 67 are configured and arranged such that, as the hook 67 approaches the closed position depicted in FIG. 22C, the convex curved external surface of the stop block 27 and the curved section of the hook 67 grip any intervening segments of wires which are spanning the cradle 15.

As seen in FIG. 22C, the hook 67 further comprises a free end which overlies or underlies the stop block 27 when the hook 67 is in the closed position. In contrast, the free end of hook 67 and the distal end of the hook housing 86 define an opening 49 when the hook 67 is in the open position depicted in FIG. 22A. The opening 49 is closed when the hook 67 is disposed at the containment position depicted in FIG. 22B. The containment position is between the open position and the closed position.

Figure 23:
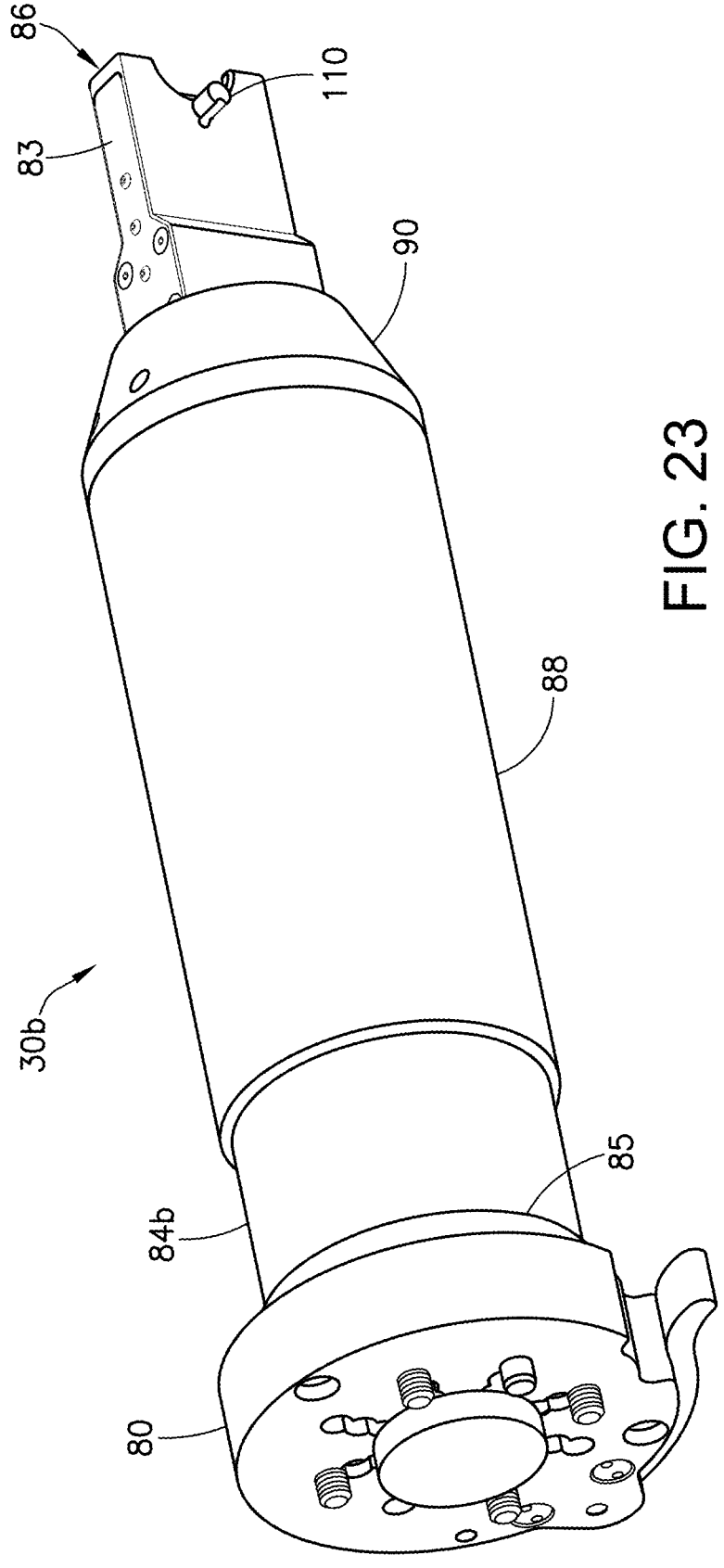
FIG. 23 is a diagram representing a view of a double-cylinder routing end effector in accordance with another embodiment.
Figure 24:
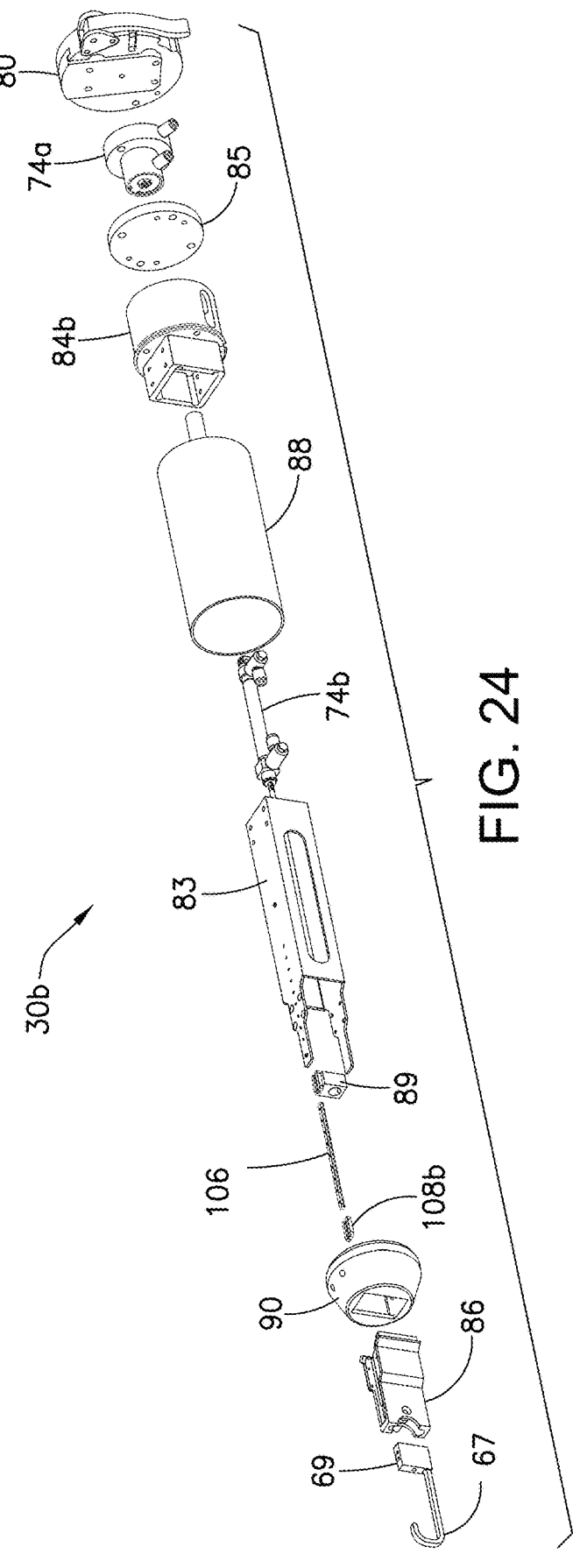
FIG. 24 is a diagram representing an exploded view of the components of the double-cylinder routing end effector depicted in FIG. 23.

FIGS. 23 and 24 respectively present three-dimensional and exploded views of the components of a double-cylinder routing end effector 30b (hereinafter "routing end effector 30b") in accordance with another embodiment. The routing end effector 30b includes a housing assembly that comprises a mount coupling plate 85, an outer cover 88, a main body tube 83 disposed inside outer cover 88, a hook housing 86 partially disposed inside main body tube 83, and an outer upper cap 90. The hook housing 86 is fastened to the main body tube 83. A linear guide 106 of a linear bearing assembly 101 is fastened to hook housing 86 and main body tube 83. As will be described in more detail below with reference to FIGS. 25A-25C, a hook 67 of the wire gripper is coupled to the linear guide 106 to enable linear displacement of the hook 67 during opening and closing.

The housing assembly of routing end effector 30b can be coupled to a rotatable distal end of a robotic arm (not shown in FIGS. 23 and 24) by means of an end effector-to-arm quick-release mount 80. As seen in FIG. 23, a wedge feature 110 projects from an external surface of the hook housing 86. The wedge feature 110 has a cylindrical contact surface with a convex curved profile that is suitable for pushing a pair of inclined surfaces apart. The procedure for using wedge feature 110 to pry open a wire clip will be described in detail hereinafter with reference to FIGS. 27A-27G and 28A-28G.

In contrast to routing end effector 30a depicted in FIGS. 20 and 21, the routing end effector 30b depicted in FIGS. 23 and 24 includes two pneumatic actuators connected in series rather than a single pneumatic actuator. As seen in FIG. 24, the routing end effector 30b includes a first pneumatic actuator 74a which is supported by an actuator lower mount 84b inside the housing assembly and a second pneumatic actuator 74b which is supported at the forward end thereof by an actuator front mount block 89 which is slidably coupled to the linear guide 106. Each of the first and second pneumatic actuators 74a/74b comprises a cylinder affixed to the housing assembly and a piston rod which is linearly displaceable relative to the cylinder. The rearward end of the cylinder of the second pneumatic actuator 74b is coupled to a distal end of the piston rod of the first pneumatic actuator 74a by means of an actuator coupler 81, which may be a simple rod or tube with threads at both ends. Thus, when the piston rod of the first pneumatic actuator 74a is extended, the cylinder of the second pneumatic actuator 74*b* is linearly displaced in a forward direction; and when the piston rod of the second pneumatic actuator 74*b* is extended, the actuator front mount block 89 is linearly displaced in a forward direction.

Referring to FIG. 24, the hook housing 86 forms a distal end of the housing assembly. As previously described, the channel-defining walls of hook housing 86 include a pair of side walls having internal surfaces which partly define a channel and having a pair of concave curved external surfaces which define a cradle 15 at the distal edges of the side walls. As previously described, a stop block 27 is affixed to the hook housing 86 and disposed within the channel. The stop block 27 comprises a convex curved external surface disposed adjacent to the cradle 15 (as best seen in FIG. 25A).

Still referring to FIG. 24, the routing end effector 30*b* further includes a hook 67 which has a straight section and a curved section. The end of the straight section is connected to or integrally formed with a hook mount block 69. As mentioned above, the routing end effector 30*b* further includes a linear bearing assembly 101 which is affixed inside the hook housing 86. The linear bearing assembly 101 comprises a linear guide 106, an actuator carriage 108*a*, and a hook carriage 108*a*. The carriages are slidable along the linear guide 106. The actuator front mount block 89 is attached to actuator carriage 108*a*. The hook mount block 69 is attached to hook carriage 108*b*.

Thus, linear bearing assembly 101 supports the second pneumatic actuator 74*b* during extension of the piston rod of the first pneumatic actuator 74*a* and linear displacement of actuator front mount block 89 and the cylinder of the second pneumatic actuator 74*b*. Linear bearing assembly 101 also supports the hook 67 during extension of the second piston rod of the second pneumatic actuator 74*b* and linear displacement of the hook mount block 69.

Figure 25A:
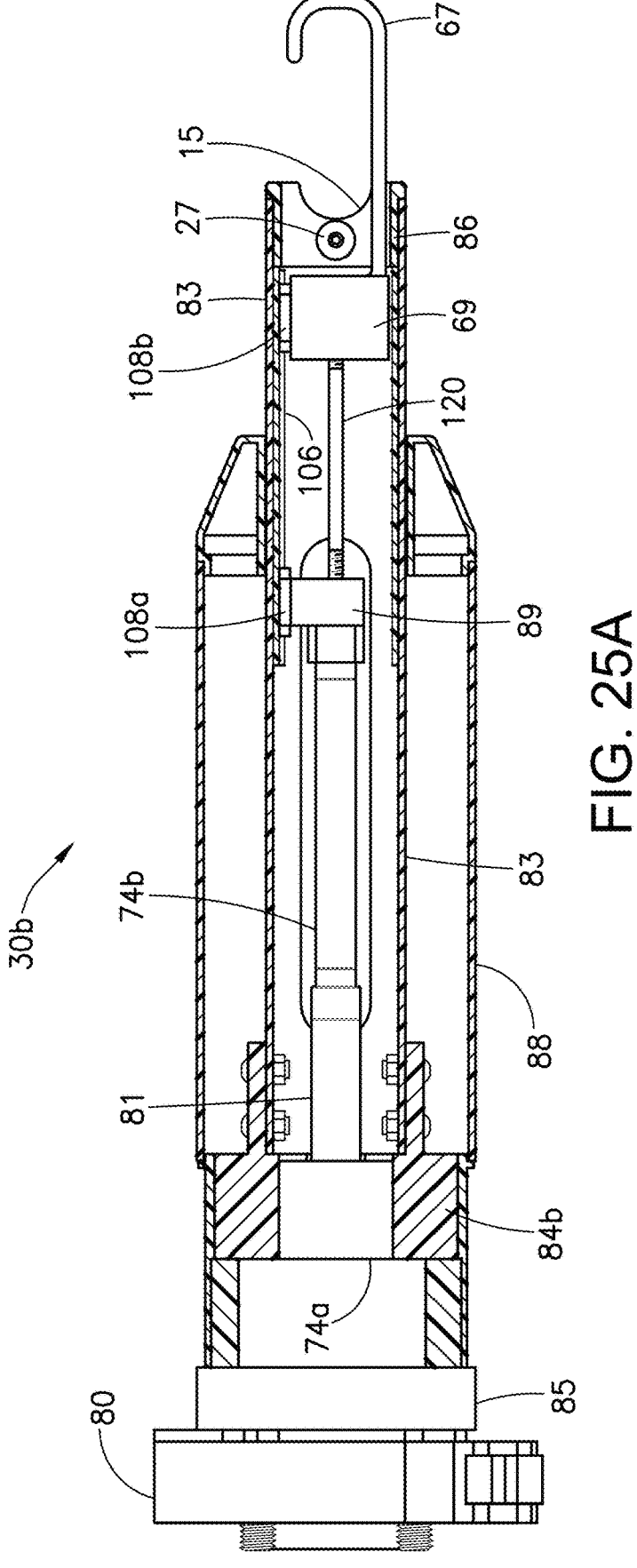
FIG. 25A is a diagram representing a partially sectioned view of the double-cylinder routing end effector in an open state.
Figure 25B:
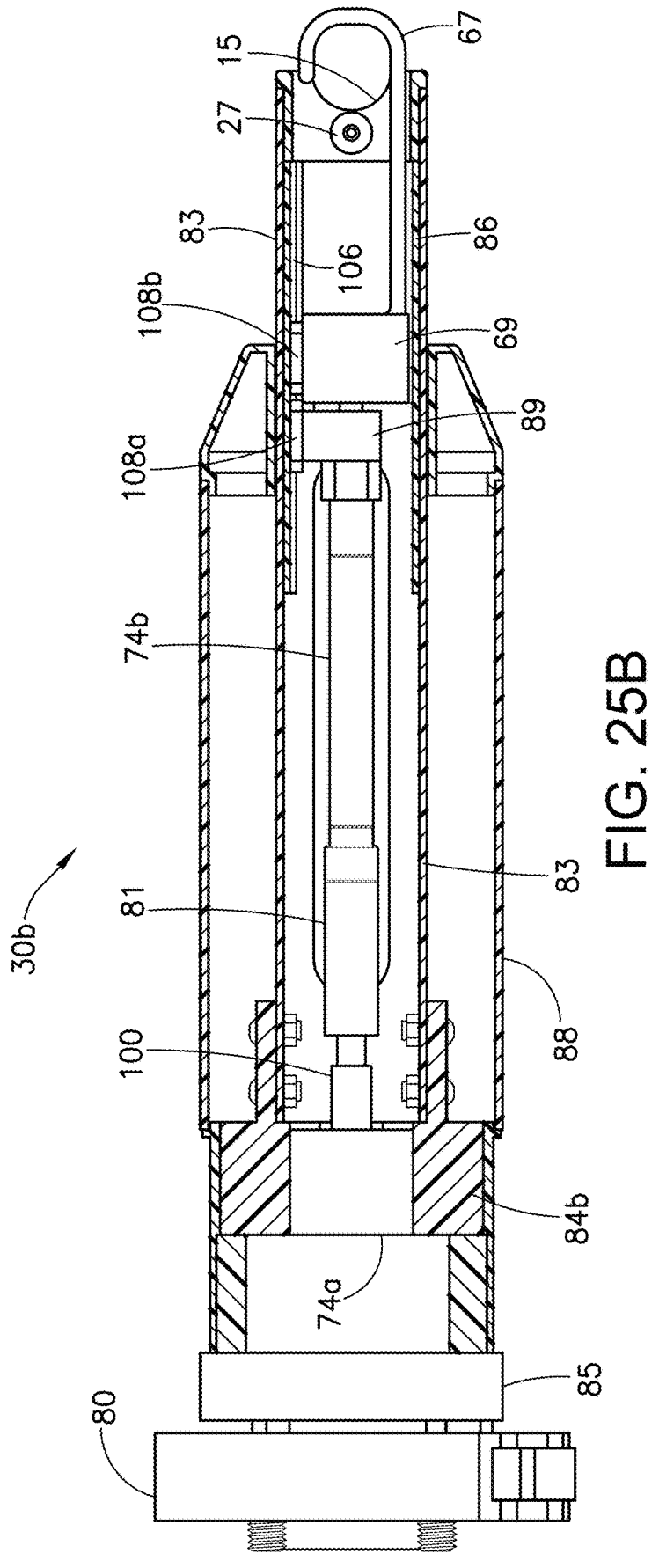
FIG. 25B is a diagram representing a partially sectioned view of the double-cylinder routing end effector in a containment state.
Figure 25C:
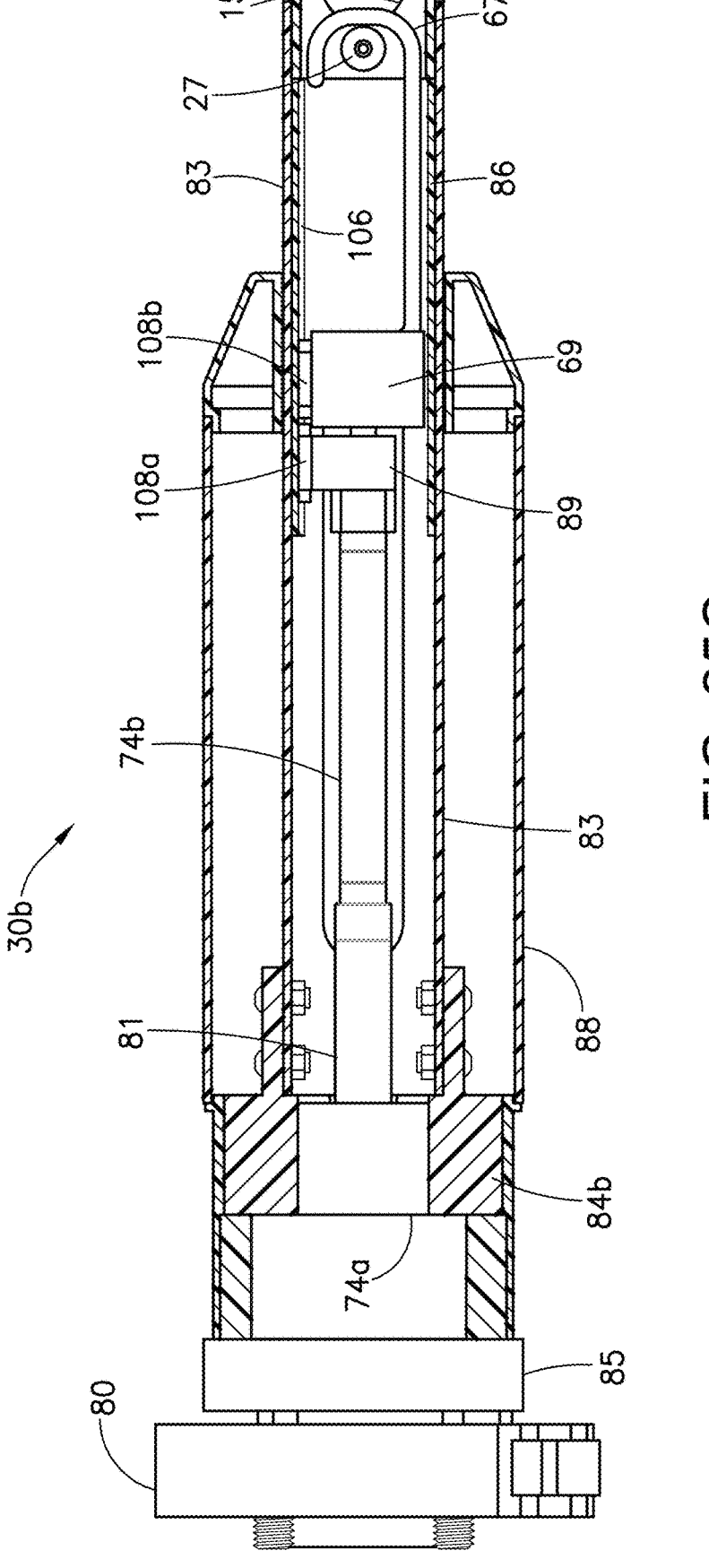
FIG. 25C is a diagram representing a partially sectioned view of the double-cylinder routing end effector in a closed state.

FIGS. 25A-25C are diagrams representing partially sectioned views of routing end effector 30*b* in an open state (FIG. 25A), in a containment state (FIG. 25B), and in a closed state (FIG. 25C). As seen in FIGS. 25A-25C, the hook mount block 69 is coupled to the distal end of a screwed piston rod 120 of pneumatic actuator 74*b*. The hook 67 is linearly displaceable in conjunction with the linearly displaceable screwed piston rod 120 in a range from an open position at which a curved section of the hook 67 projects forward of the cradle 15 (as seen in FIG. 25A) to a closed position at which the curved section of the hook 67 does not project forward of the cradle 15 (as seen in FIG. 25C). The stop block 27, cradle 15, and hook 67 are configured and arranged such that, as the hook 67 approaches the closed position depicted in FIG. 25C, the convex curved external surface of the stop block 27 and the curved section of the hook 67 grip any intervening segments of wires which are spanning the cradle 15.

The robot controller that controls routing end effector 30*b* is configured to control linear displacement of the hook 67 to adopt any one of three states: an open state, a closed state, and a containment state. In order to invoke the open state, the piston rod 120 of pneumatic actuator 74*b* is extended while the piston rod 100 of pneumatic actuator 74*b* is retracted, as seen in FIG. 25A. In order to invoke the closed state, the piston rod 120 of pneumatic actuator 74*b* and the piston rod 100 of pneumatic actuator 74*b* are retracted, as seen in FIG. 25C. In order to invoke the containment state, the piston rod 120 of pneumatic actuator 74*b* is retracted while the piston rod 100 of pneumatic actuator 74*b* is extended, as seen in FIG. 25B.

Figure 26:
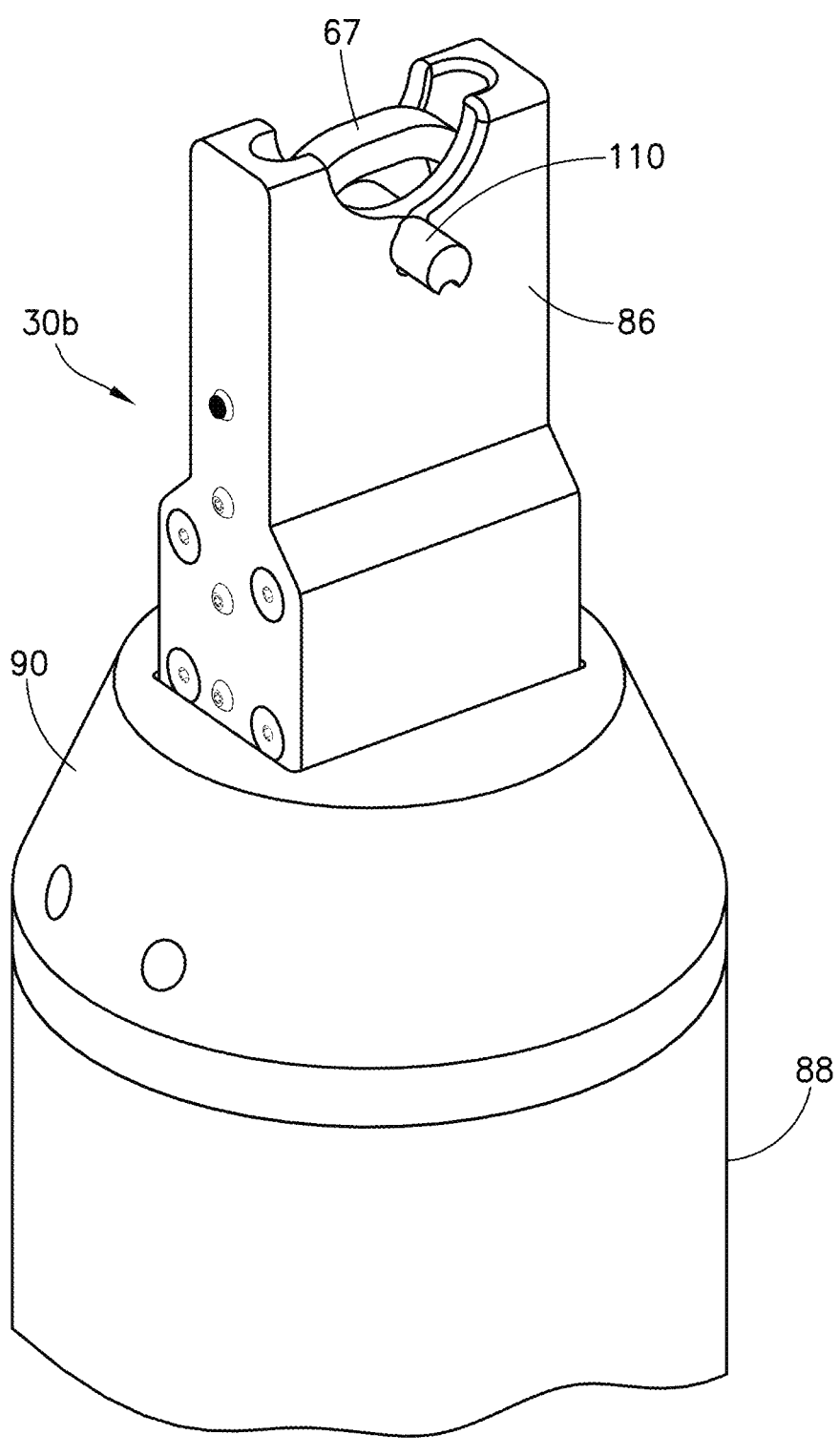
FIG. 26 is a diagram representing a view of the distal end of a hook housing having a wedge feature designed to pry open flexible arms of a wire routing device during an automated wire routing operation.

In order to place a wire group in a wire routing device of the type depicted in FIG. 4, the routing end effector 30*b* must first grip first portions of the wires of the wire group and displace those first portions toward the wire routing device in a manner that causes second portions of the wires of the wire group to enter between the flexible arms of the wire routing device. To facilitate opening of the wire routing device to receive the wire group, the distal end of hook housing 86 has a wedge feature 110 (shown in FIG. 26) which is designed to pry open the flexible arms of the wire routing device. The wedge feature 110 projects from an external surface of one of the sidewalls of hook housing 86 adjacent to the trough of one of the concave curved external surfaces which define the cradle 15. In accordance with one proposed implementation, the wedge feature 110 is a cylindrical body having a curved external surface located to contact inclined surfaces of the wire routing device.

The movements of the hook housing 86 during the wire group routing procedure will now be described with reference to FIGS. 27A-27G and 28A-28G. FIGS. 27A through 27G are diagrams representing respective front views of a routing end effector 30*b* and a wire routing device 12 during steps of an automated process involving prying open a wire clip 36 of the wire routing device 12 using the wedge feature 110 on the hook housing 86 to place a wire group 24 between the flexible clip arms 47*a* and 47*b* of the wire routing device 12. FIGS. 28A through 28G are diagrams representing respective side views of the routing end effector 30*b* and the wire routing device 12 during the steps respectively depicted in 27A through 27G.

Figure 28A:
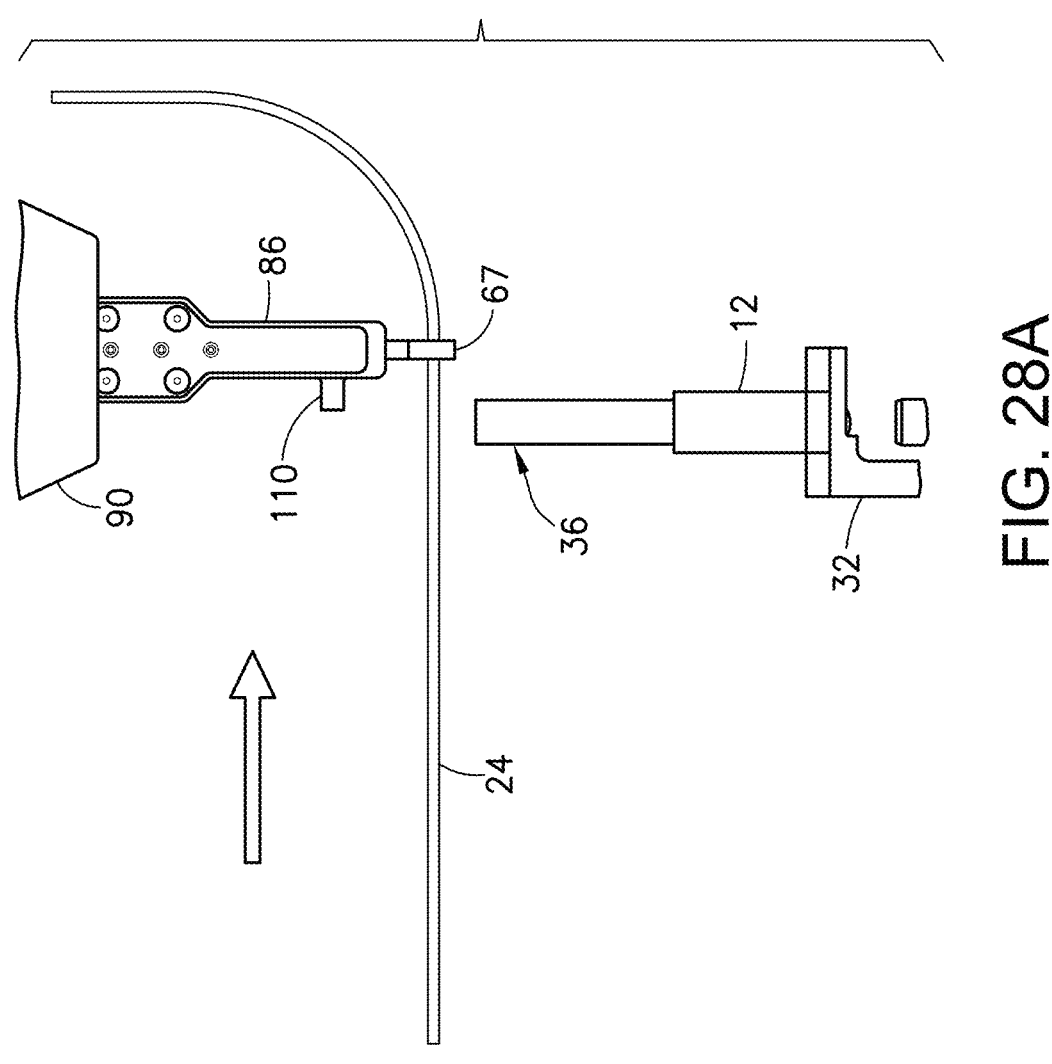
FIGS. 28A through 28G are diagrams representing respective side views of the routing end effector and the wire routing device during the steps respectively depicted in 27A through 27G.
Figure 27A:
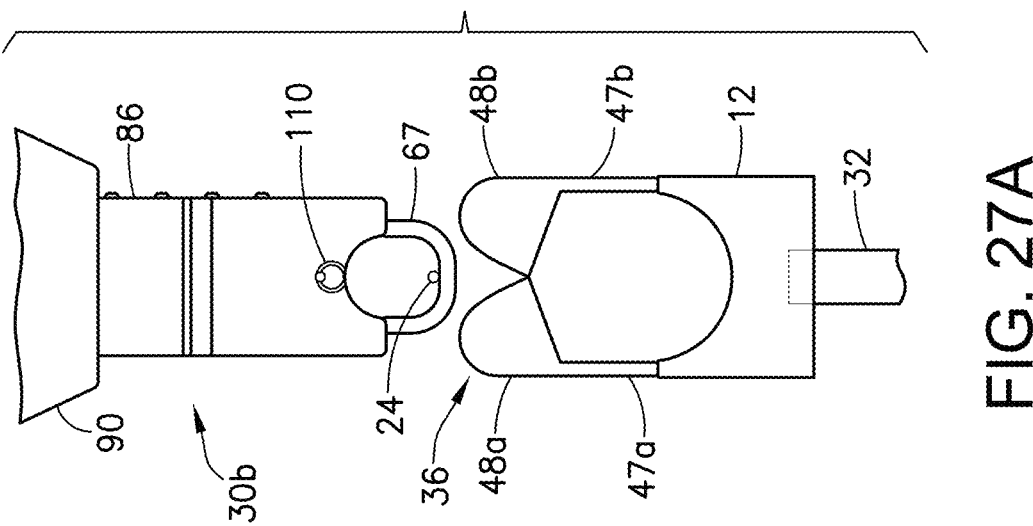
FIGS. 27A through 27G are diagrams representing respective front views of a routing end effector and a wire routing device during steps of an automated process involving prying open the wire routing device using the wedge feature on the routing end effector to place a wire group between the flexible arms of the wire routing device.

FIGS. 27A and 28A show the hook 67 and the wire clip 36 at an instant in time during which the routing end effector 30*b* moves above and to the forward side of the wire routing device 12. During this maneuver, the hook 67 guides the wire group 24 to a position overlying the flexible clip arms 47*a* and 47*b*.

Figures 27B, 28B:
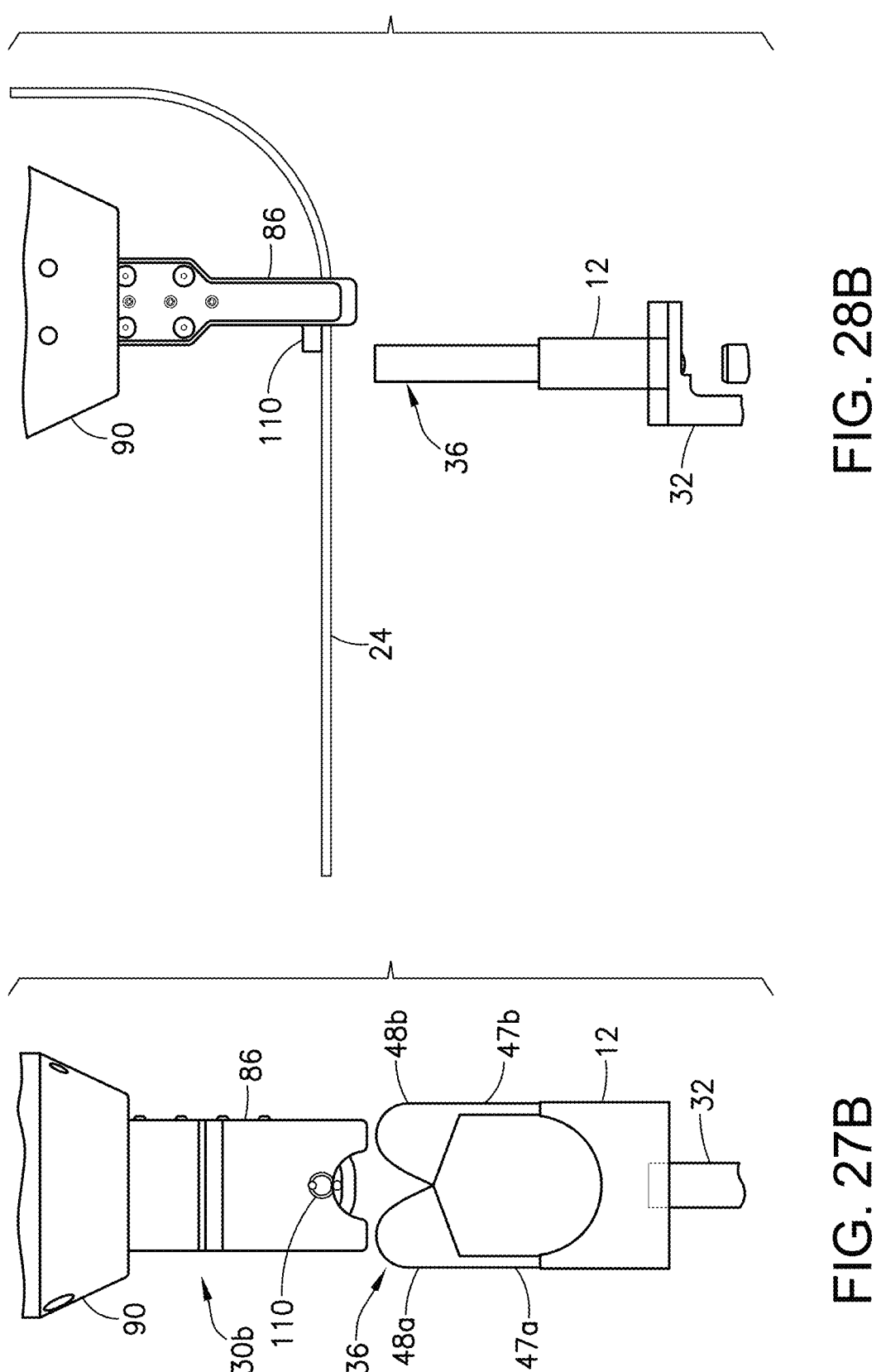

FIGS. 27B and 28B show the hook 67 and the wire clip 36 at an instant in time during which the hook is moved from the containment position to the closed position. As a result of this operation, the hook 67 grips the wire group 24.

Figure 28C:
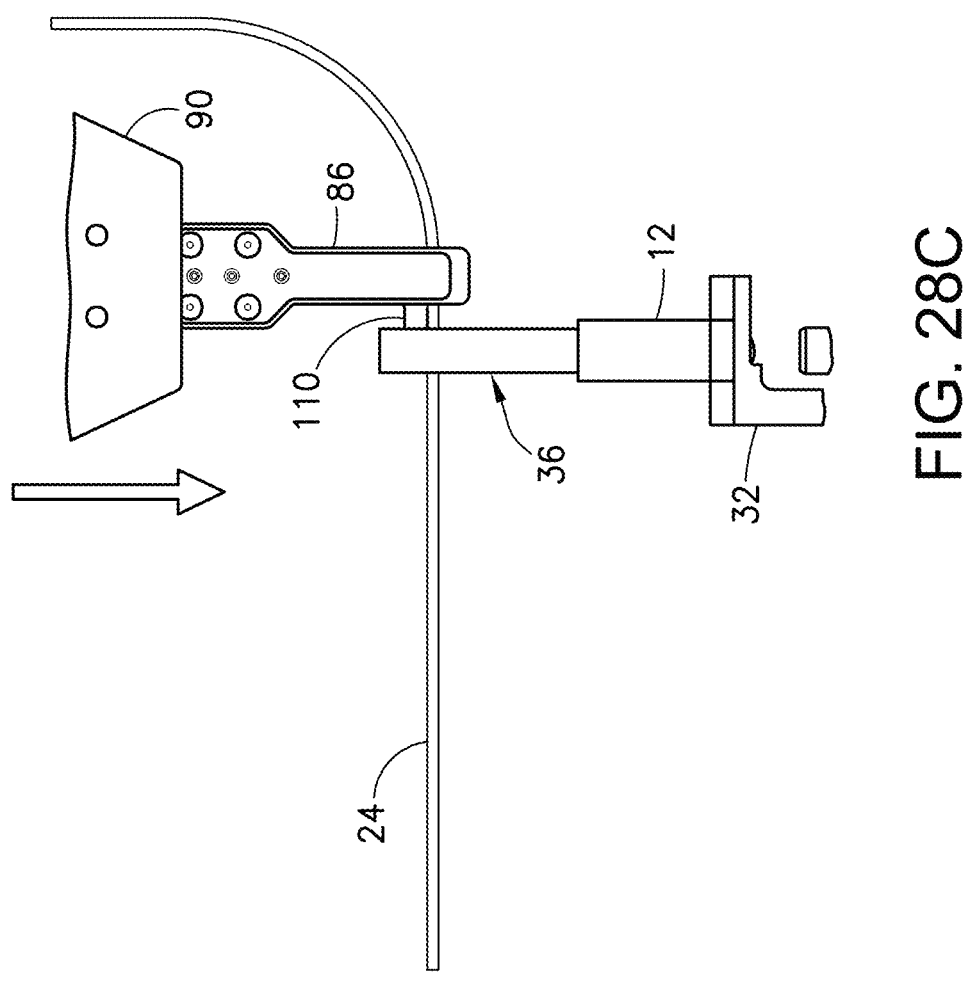
Figure 27C:
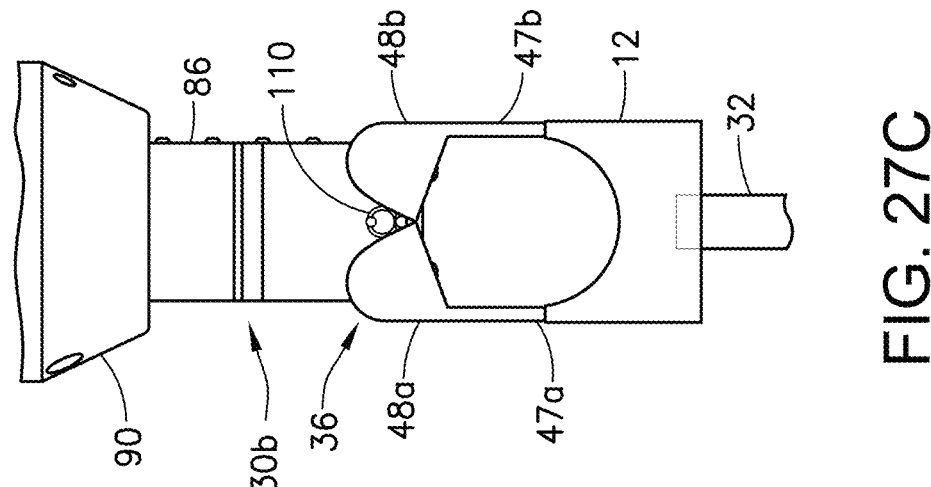

FIGS. 27C and 28C show the hook 67 and the wire clip 36 at an instant in time during which the hook housing is moved downward until the wedge feature 110 contacts inclined surfaces of a pair of fingers 48*a* and 48*b* which are respectively integrally formed with the upper ends of the flexible clip arms 47*a* and 47*b*.

Figure 28D:
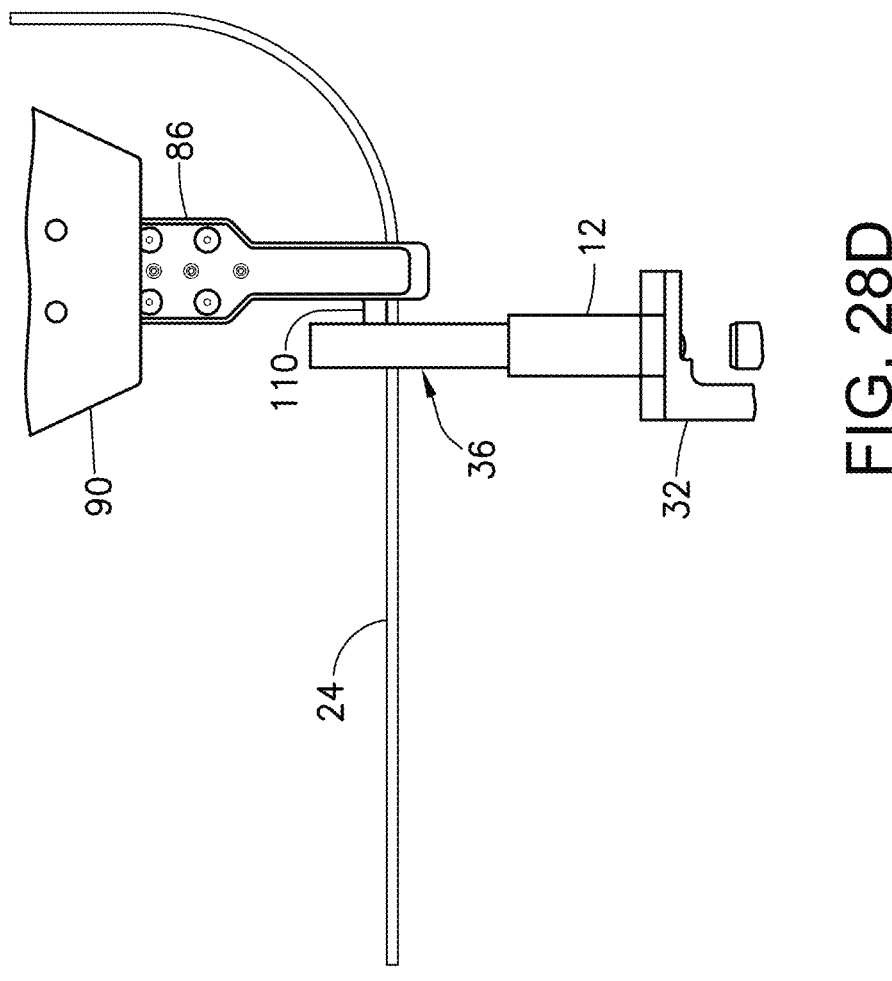
Figure 27D:
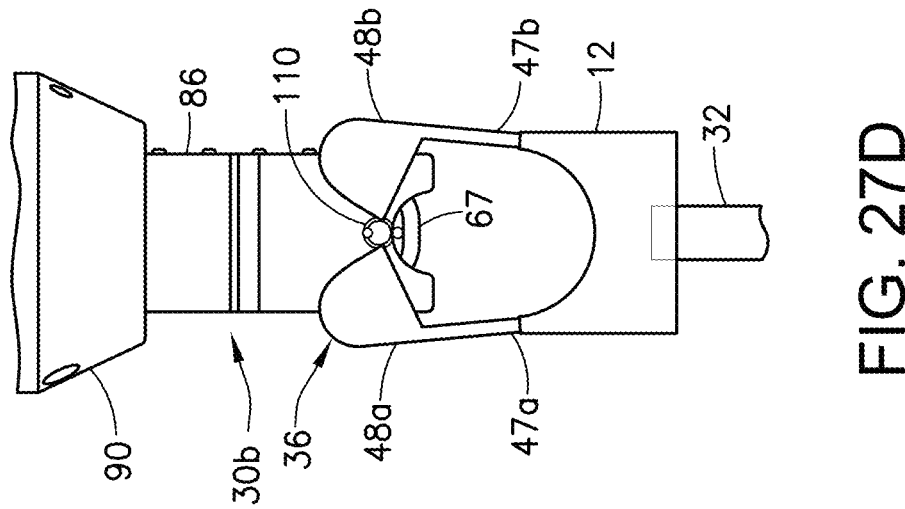

As seen in FIGS. 27D and 28D, the flexible clip arms 47*a* and 47*b* are configured to bend resiliently away from each other when fingers 48*a* and 48*b* are pushed apart. The routing clip 36 may be opened to receive a wire group by pushing down on the outer inclined surfaces of fingers 48*a* and 48*b*, thereby causing the flexible clip arms 47*a* and 47*b* to bend outward and away from each other. The wire group 24 may then pass through the gap formed between fingers 48*a* and 48*b*.

Figure 28E:
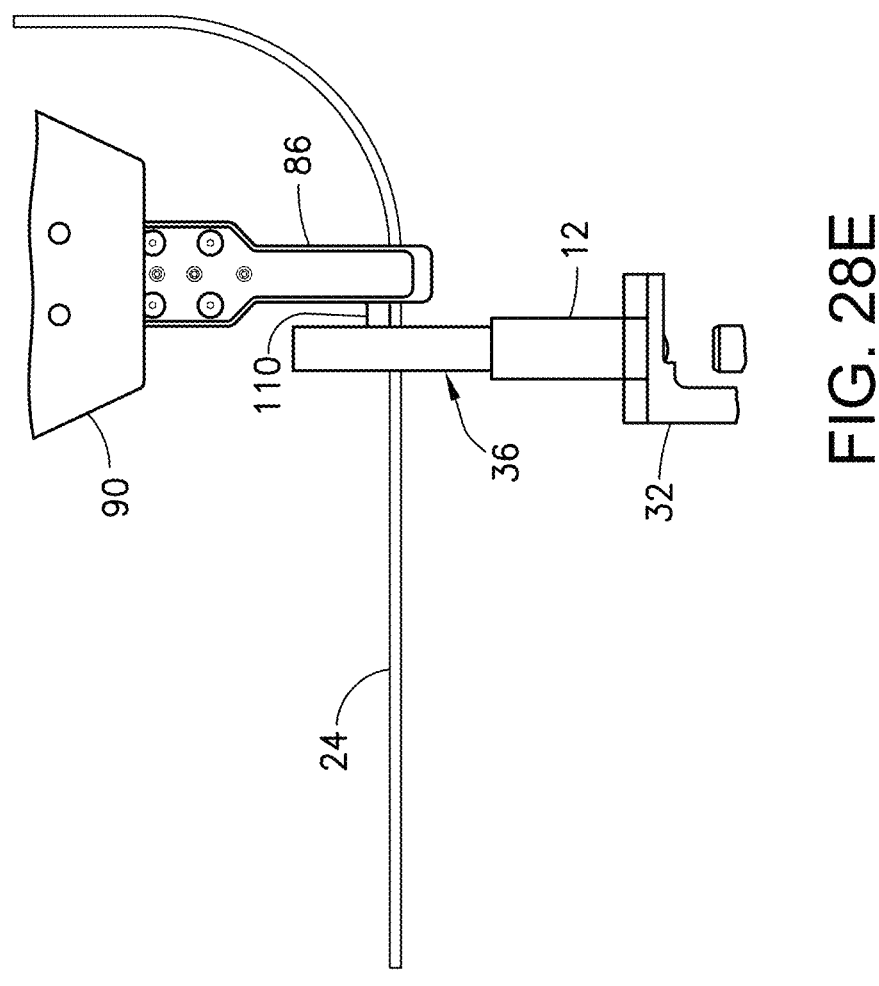
Figure 27E:
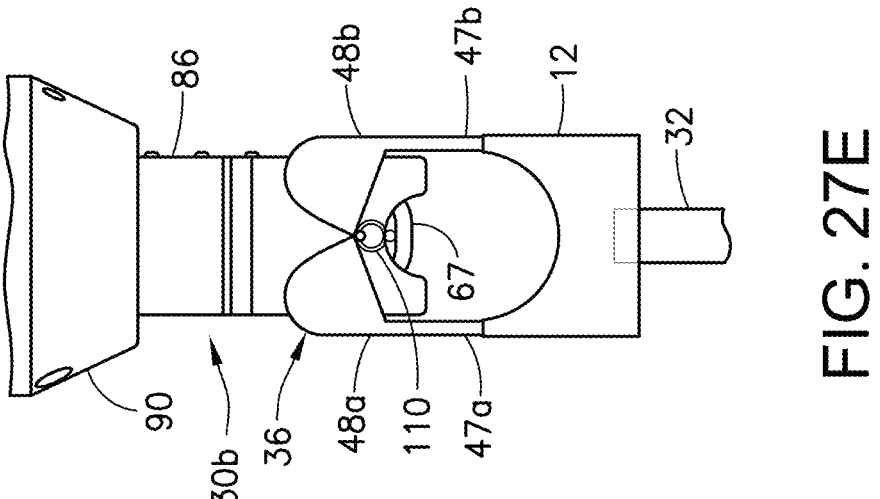

As seen in FIGS. 27E and 28E, the fingers 48*a* and 48*b* close once the wedge feature 110 has passed through. At this juncture, the wire group 24 is contained within the wire routing device 12 while still being gripped by the hook 67 of routing end effector 30*b*.

Figure 28F:
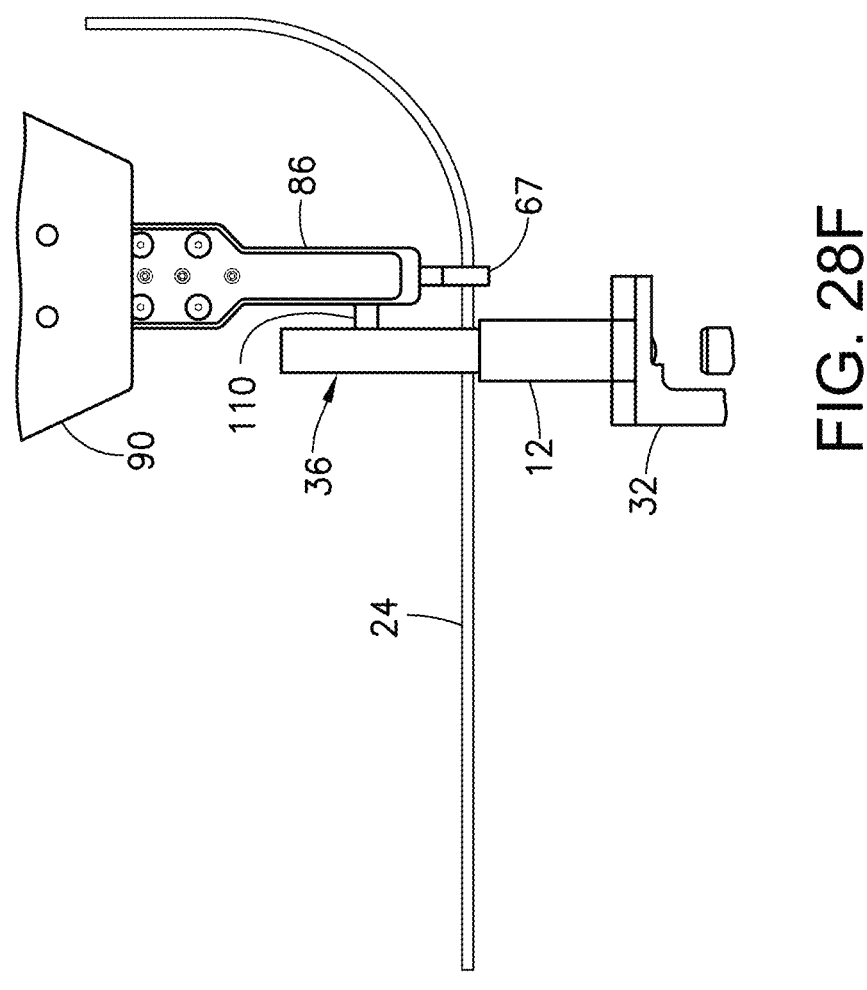
Figure 27F:
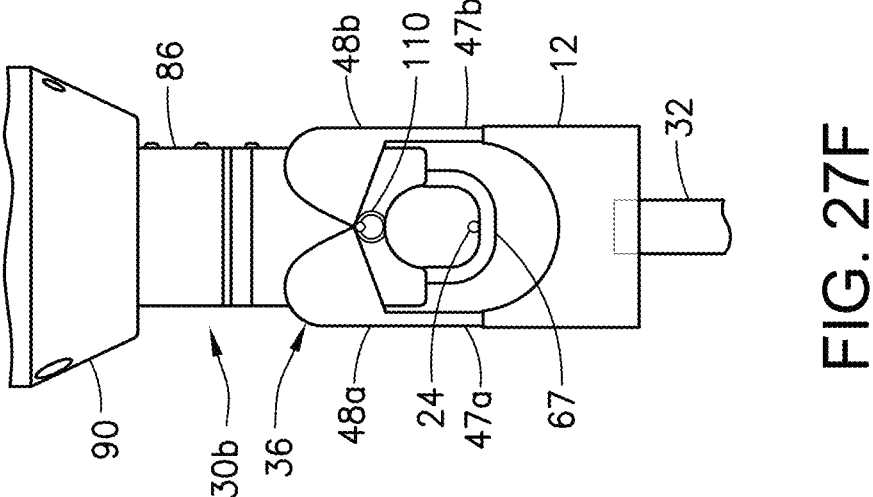

The hook 67 is then moved from the closed position to the containment position. As seen in FIGS. 27F and 28F, the wire group 24 is released from the grip applied by the hook 67 and the stop block (not visible in FIG. 27F). Thereafter, the wire group is contained in the space bounded by hook 67 and cradle 15.

Figure 28G:
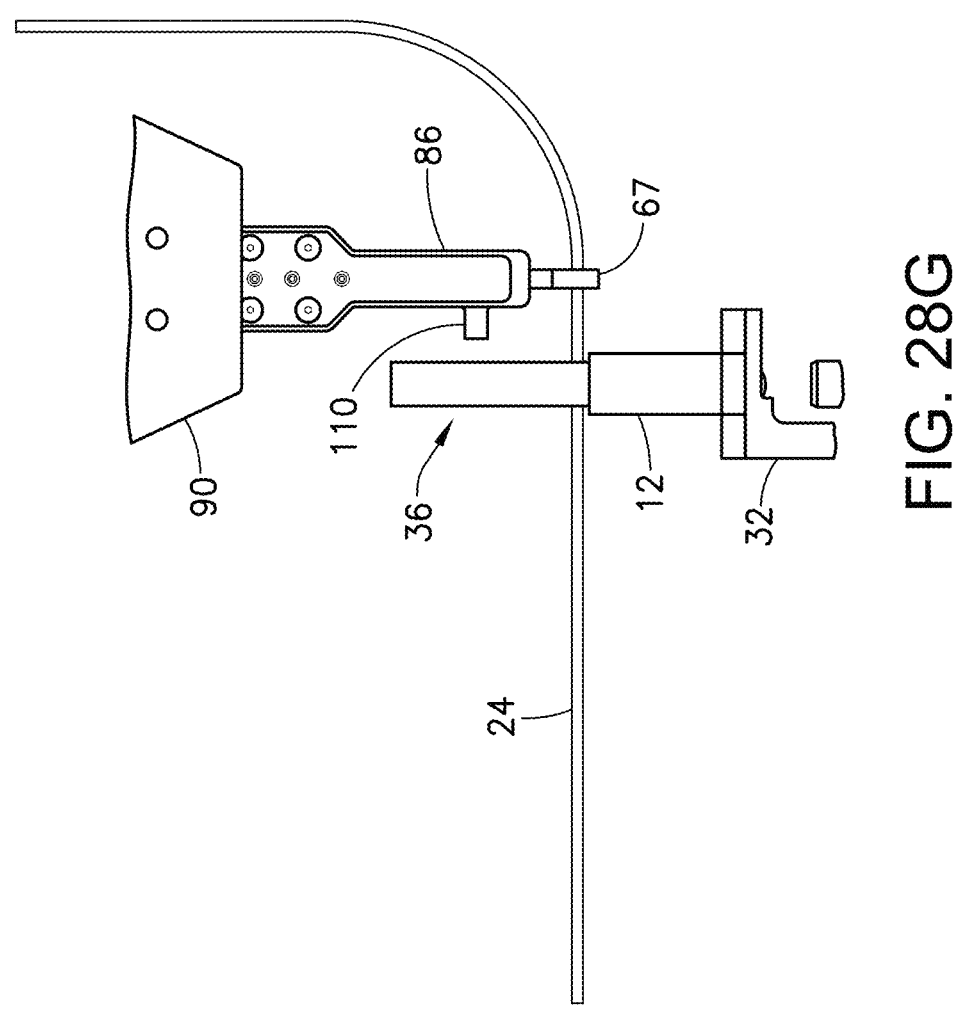
Figure 27G:
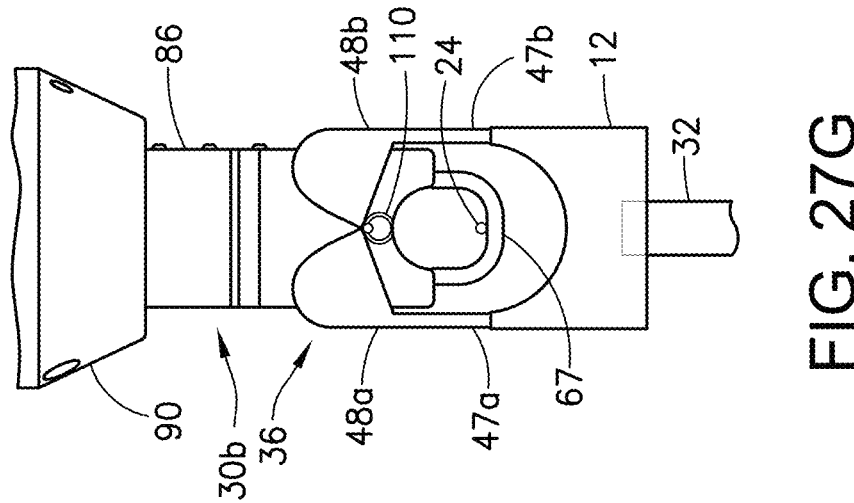

FIGS. 27G and 28G show the hook 67 and the wire clip 36 at an instant in time during which the routing end effector 30b moves the wedge feature forward and out of wire routing device 12. The hook 67 continues in the containment position while the routing end effector 30b moves and guides the remainder of wire group 24 toward the next wire routing device along the pre-planned wire path.

Figure 30C:
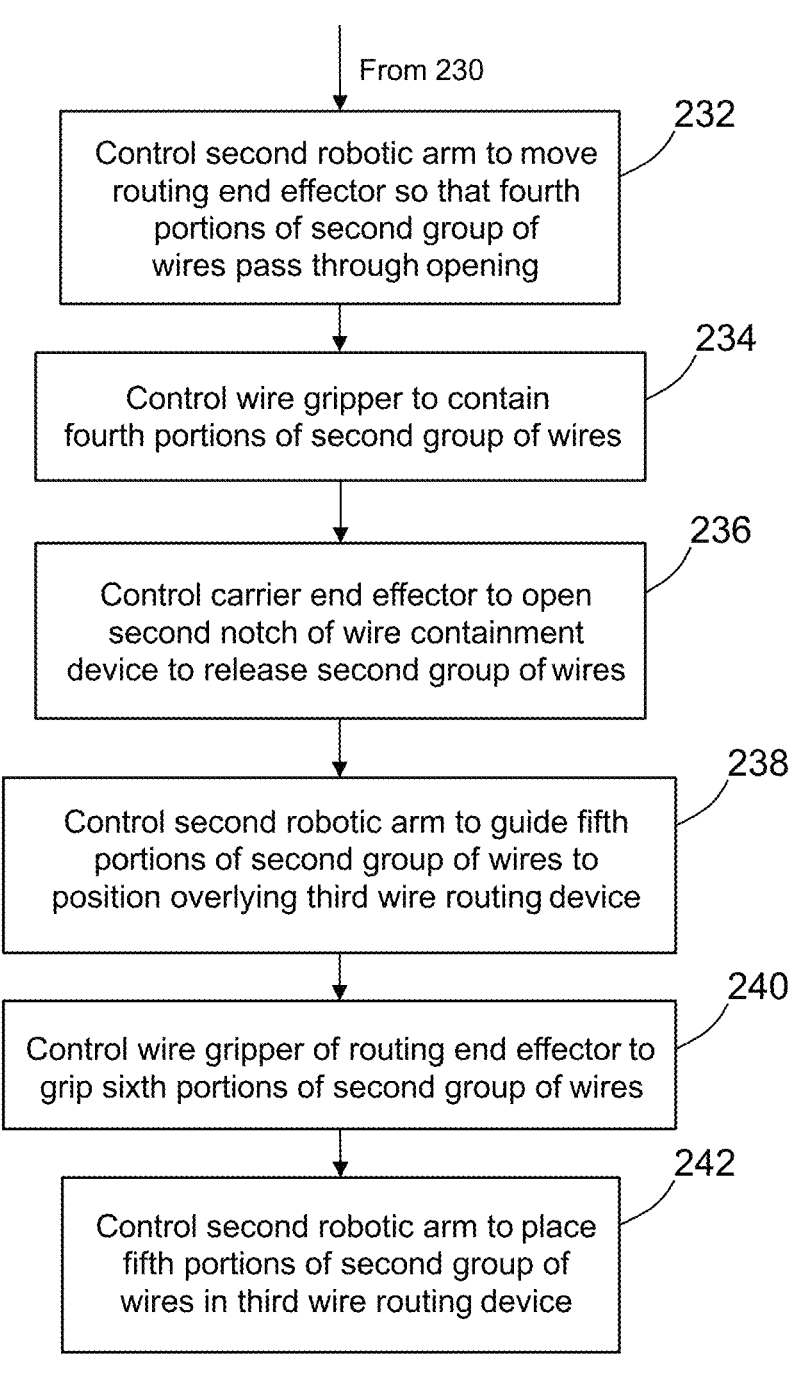

FIGS. 30A-30C are flowcharts representing steps of an automated method 200 for routing wires of a wire harness on a form board using a robotic system comprising the components identified in FIGS. 15, 20, and 23. In some instances, the steps listed in FIGS. 30A-30C need not be performed in the order listed. In addition, although the method is described using a wire harness having first and second groups of wires connected to a wire end connector, the robotic operations described may be repeated to route all wire groups of a wire harness having more than two wire groups.

Referring to FIG. 30A, at the start of method 100 a wire harness 22 is received at a robotic cell where a form board 2 resides (step 202). Then the wire end connector staging device 37 of the carrier end effector 31 (shown in FIG. 18) is controlled to grip first and second portions of the wires 1 of first and second wire groups 24a and 24b (step 204). More specifically, pneumatic grippers 53 and 55 are opened, wires 1 are placed manually into the open pneumatic grippers, and then pneumatic grippers 53 and 55 are closed. As a result, pneumatic gripper 53 grips the first portions of wires 1 and pneumatic gripper 55 grips the second portions of wires 1, thereby providing support for the wire end connector 20. The second portions of wires 1 are disposed between the wire end connector 20 and the respective first portions of wires 1.

Following the wire end connector staging operation, the hanging portions of the wires 1 of first and second wire groups 24a and 24b are placed manually in first and second notches respectively of the wire group containment device 39 (step 206). More generally, if the wire harness 22 has more than two wire groups, then each wire group will be placed in a respective notch. Thereafter, the robot controller 14a controls the first robotic arm 16 to move the carrier end effector 31 toward the form board 2 to a location where the routing end effector 30 is able to access wire harness 22 using wire gripper 72.

Before or after the wire carrier 29 arrives at the target location, the robot controller 14b activates the linear actuator to open the wire gripper 72 (step 208). The opening 49 in wire gripper 72 is a gap between a tip of hook housing 86 and a free end of hook 67 when hook 67 is in the open (fully extended) position. The robot controller 14b then controls the second robotic arm 18 (while the wire gripper 72 is in the open state) to move the routing end effector 30 so that respective third portions of all wires 1 of wire harness 22 pass through the opening 49 in wire gripper 72 (step 210). The robot controller 14b then controls the wire gripper 72 to grip the third portions of wires 1 of wire harness 22 (step 212) by retracting the screwed piston rod 19 of pneumatic actuator 74. Then the robot controller 14a controls the carrier end effector 31 to release the first and second portions of the wires 1 of the first and second groups of wires 24a and 24b (step 213). After release of the first and second portions of the wires 1 and while the wire gripper 72 is gripping the third portions of the wires 1, the robot controller 14b controls the second robotic arm 18 to move the routing end effector 30 toward the form board 2 to place the second portions of the wires 1 of wire harness 22 in the first wire routing device 12a (step 214).

Referring now to FIG. 30B, the wire gripper 72 is then opened to release the third portions of the wires 1 of the wire harness 22 (step 216). Following step 216, the wire end connector 22 is hanging from the first wire routing device 12a, while hanging portions of the first and second wire groups 24a and 24b are still being contained by the wire group containment device 39. At this juncture, the second robotic arm 18 is controlled to move the wire gripper 72 away from the first wire routing device 12a and toward the wire carrier 29. More specifically, while the wire gripper 72 is in an open state, the robot controller 14b controls the second robotic arm 18 to move the routing end effector 30 so that respective fourth portions of the wires 1 of first wire group 24a pass through the opening 49 in wire gripper 72 (step 218).

At this juncture, the wire gripper 72 is reconfigured to adopt the containment state. In the example process being described in this flowchart, the wire gripper 72 is controlled to contain the fourth portions of the wires 1 of first wire group 24a (step 220). In accordance with one proposed implementation, controlling the wire gripper 72 to contain wires 1 comprises moving the linearly displaceable member to an intermediate position disposed between the open and closed positions. Then the robot controller 12a controls the carrier end effector 31 to release the wires 1 of first wire group 24a by opening the first notch 52a of wire group containment device 39 (step 222).

After the wires 1 of first wire group 24a have been contained by the wire gripper 72 and released by wire group containment device 39, the robot controller 14b controls the second robotic arm 18 to move the routing end effector 30 to guide fifth portions of the wires 1 of first wire group 24a to a position overlying the second wire routing device 12b (step 224). Next the wire gripper 72 is controlled to grip sixth portions of the wires 1 of first wire group 24a (step 226) while the fifth portions overlie the second wire routing device 12b. Then the robot controller 14b controls the second robotic arm 18 (e.g., moves wire gripper 72 toward the form board 2) to place the fifth portions of the wires 1 of first wire group 24a in the second wire routing device 12b (step 228). The wire gripper 72 is then opened to release the sixth portions of the wires 1 of the first wire group 24a (step 230). In addition, the second robotic arm 18 is controlled to move the wire gripper 72 away from the second wire routing device 12b and toward the wire carrier 29.

Referring now to FIG. 30C, while the wire gripper 72 is in an open state, the robot controller 14b controls the second robotic arm 18 to move the routing end effector 30 so that respective fourth portions of the wires 1 of a second wire group 24b pass through the opening 49 in wire gripper 72 (step 232). At this juncture, the wire gripper 72 is reconfigured to adopt the containment state. The wire gripper 72 is controlled to contain the fourth portions of the wires 1 of second wire group 24b (step 234). Then the robot controller 14a controls the carrier end effector 31 to release the wires 1 of second wire group 24b by opening the second notch 52b of wire group containment device 39 (step 236).

After the wires 1 of second wire group 24b have been contained by the wire gripper 72 and released by wire group containment device 39, the robot controller 14b controls the second robotic arm 18 to move the routing end effector 30 to guide fifth portions of the wires 1 of second wire group 24b to a position overlying the third wire routing device 12c (step 238). Next the wire gripper 72 is controlled to grip sixth portions of the wires 1 of second wire group 24b (step 240) while the fifth portions overlie the third wire routing device 12c. Then the robot controller 14b controls the second robotic arm 18 (e.g., moves wire gripper 72 toward the form board 2) to place the fifth portions of the wires 1 of second wire group 24*b* in the third wire routing device 12*c* (step 242). The wire gripper 72 is then opened to release the sixth portions of the wires 1 of the second wire group 24*b*. In addition, the second robotic arm 18 is controlled to move the wire gripper 72 away from the third wire routing device 12*c*.

While methods and apparatus for automated routing of wires onto harness form boards have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., a non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a computer system, cause the wire routing end effector to perform at least a portion of the methods described herein.

As used herein, the term "over a wire routing device" means that the wire would overlie the wire routing device were the form board in a horizontal angular position (orientation). In practice, the form board need not have a horizontal orientation during the automated wire routing procedure. When a wire is "over" a wire routing device attached to a vertical or inclined form board, both the wire and the wire routing device would be intersected by a hypothetical common Z-axis which is perpendicular to the plane of the form board.

As used herein, the term "a wire spanning a cradle" means that a first portion of the wire is in contact with one concave curved external surface that forms one end of the cradle while a second portion of the wire is in contact with another concave curved external surface that forms the other end of the cradle, in which case a third portion of the wire connecting the first and second portions spans the space between the two ends of the cradle.

In the method claims appended hereto, alphabetic ordering of steps is for the sole purpose of enabling subsequent short-hand references to antecedent steps and not for the purpose of limiting the scope of the claim to require that the method steps be performed in alphabetic order. In other words, the method claims recite steps of claimed methods but do not require that all of the steps occur in the order recited or listed in the claims.

The invention claimed is:

1. A routing end effector comprising:
a housing assembly comprising a hook housing that forms a distal end of the housing assembly, wherein the hook housing comprises internal surfaces which define a channel and a pair of concave curved external surfaces which define a cradle at the distal end of the housing assembly;
a stop block affixed to the hook housing and disposed within the channel, wherein the stop block comprises a convex curved external surface disposed adjacent to the cradle;
a linear actuator which is supported by the housing assembly, wherein the linear actuator comprises a linearly displaceable member; and
a hook which is coupled to the linearly displaceable member, wherein the hook is linearly displaceable in conjunction with the linearly displaceable member in a range from an open position at which a curved section of the hook projects forward of the cradle to a closed position at which the curved section of the hook does not project forward of the cradle,
wherein the stop block, cradle, and hook are configured and arranged such that, as the hook approaches the closed position, the convex curved external surface of the stop block and the curved section of the hook grip any intervening segments of wires which are spanning the cradle.

2. The routing end effector as recited in claim 1, wherein the hook further comprises a free end which overlies or underlies the stop block when the hook is in the closed position.

3. The routing end effector as recited in claim 2, wherein the free end of the hook and the distal end of the hook housing define a gap when the hook is in the open position, wherein the gap is closed when the hook is disposed at a containment position, and wherein the containment position is between the open position and the closed position.

4. The routing end effector as recited in claim 1, wherein a peak of the convex curved external surface of the stop block is level with respective troughs of the pair of concave curved external surfaces which define the cradle.

5. The routing end effector as recited in claim 1, wherein the linear actuator is a first pneumatic actuator and the linearly displaceable member is a first piston rod to which the hook is coupled.

6. The routing end effector as recited in claim 5, wherein the routing end effector further comprises a second pneumatic actuator comprising a second piston rod.

7. The routing end effector as recited in claim 6, further comprising a linear bearing assembly comprising a guide which is mounted inside the channel of the hook housing.

8. The routing end effector as recited in claim 5, wherein the hook housing further comprises:
a circular disk integrally formed with the side walls and having an opening; and
a pair of mutually parallel mounting flanges which project from a bottom of the disk,
wherein the first pneumatic actuator is fastened to the mounting flanges.

9. The routing end effector as recited in claim 5, wherein the routing end effector further comprises an actuator coupler which couples the first pneumatic actuator to the second piston rod.

10. The routing end effector as recited in claim 9, further comprising a linear bearing assembly comprising a carriage which is slidably coupled to the guide, wherein the hook is coupled to the carriage.

11. The routing end effector as recited in claim 1, wherein the linear actuator comprises an electric motor and a rotary-to-linear motion conversion mechanism, and wherein the rotary-to-linear motion conversion mechanism comprises a rotatable component which is driven to rotate by the electric motor and the linearly displaceable component to which the hook is coupled.

12. The routing end effector as recited in claim 1, wherein the hook housing comprises a pair of side walls having respective distal edges comprising the respective concave curved external surfaces which define the cradle.

13. The routing end effector as recited in claim 12, further comprising a wedge feature which projects from an external surface of one of the sidewalls adjacent to the trough of one of the concave curved external surfaces which define the cradle.

14. The routing end effector as recited in claim 13, wherein the wedge feature comprises a cylindrical body having a curved external surface.

15. A routing end effector comprising:

a housing assembly comprising a hook housing that forms a distal end of the housing assembly, wherein the hook housing comprises internal surfaces which define a channel and a pair of concave curved external surfaces which define a cradle at the distal end of the housing assembly;

a stop block affixed to the hook housing and disposed within the channel, wherein the stop block comprises a convex curved external surface disposed adjacent to the cradle;

a first pneumatic actuator comprising a first cylinder affixed to the housing assembly and a first piston rod which is linearly displaceable relative to the first cylinder;

a second pneumatic actuator comprising a second cylinder which is linearly displaceable relative to the housing assembly and a second piston rod which is linearly displaceable relative to the second cylinder;

an actuator coupler which couples the second cylinder to the first piston rod; and a hook which is coupled to the second piston rod, wherein the hook is linearly displaceable in conjunction with the second piston rod in a range from an open position at which the hook projects forward of the hook housing to a closed position at which the hook is disposed inside the channel of the hook housing; and wherein the stop block, cradle, and hook are configured and arranged such that, as the hook approaches the closed position, the convex curved external surface of the stop block and the curved section of the hook grip any intervening segments of wires which are spanning the cradle.

16. The routing end effector as recited in claim 15, wherein the hook comprises a curved section having a free end which overlies or underlies the stop block when the hook is in the closed position.

17. The routing end effector as recited in claim 16, wherein the free end of the hook and the distal end of the hook guide define a gap when the hook is in the open position, wherein the gap is closed when the hook is disposed at a containment position, and wherein the containment position is between the open position and the closed position.

18. The routing end effector as recited in claim 15, further comprising a bearing assembly disposed inside the housing assembly, wherein the bearing assembly supports the second pneumatic actuator during linear displacement of the second cylinder.

19. An apparatus for automated routing of wires of a wire harness assembly on a form board, the apparatus comprising:

a robotic arm having a distal end;

a routing end effector rotatably coupled to the distal end of the robotic arm; and a robot controller configured to control movement of the robotic arm and rotation of the routing end effector relative to the robotic arm, wherein the routing end effector comprises:

a housing assembly comprising a hook housing that forms a distal end of the housing assembly, wherein the hook housing comprises internal surfaces which define a channel and a pair of concave curved external surfaces which define a cradle at the distal end of the housing assembly;

a linear actuator which is supported by the housing assembly, wherein the linear actuator comprises a linearly displaceable member;

a stop block affixed to the hook housing and disposed within the channel, wherein the stop block comprises a convex curved external surface disposed adjacent to the cradle; and a hook which is coupled to the linearly displaceable member, wherein the hook is linearly displaceable in conjunction with the linearly displaceable member in a range from an open position at which the hook projects forward of the hook housing to a closed position at which the hook is disposed inside the channel of the hook housing;

wherein the robot controller is further configured to control linear displacement of the hook by sending activation commands to the linear actuator; and wherein the stop block, cradle, and hook are configured and arranged such that as the hook approaches the closed position, the convex curved external surface of the stop block and the curved section of the hook grip any intervening segments of wires which are spanning the cradle.

20. The apparatus as recited in claim 19, wherein the robot controller is further configured to control linear displacement of the hook to adopt any one of three states comprising:

an open state in which the linearly displaceable member of the linear actuator is extended to the open position and a gap exists between the hook housing and a free end of the hook;

a closed state in which the linearly displaceable member of the linear actuator is retracted toward the closed position so that any intervening wire segments are gripped; and a containment state in which the linearly displaceable member of the linear actuator is disposed at an intermediate position between the open and closed positions so that any captured wire segments are contained.

\* \* \* \* \*